(12) United States Patent
Holtz et al.

(10) Patent No.: US 11,109,114 B2
(45) Date of Patent: Aug. 31, 2021

(54) ADVERTISEMENT MANAGEMENT METHOD, SYSTEM, AND COMPUTER PROGRAM PRODUCT

(75) Inventors: Alex Holtz, Jacksonville, FL (US); Marcel LaRocque, Jacksonville, FL (US); John R Benson, Jacksonville, FL (US); William H Couch, Fernandina Beach, FL (US); Charles M Hoeppner, Jacksonville, FL (US); Benjamin Jay McAllister, Jacksonville, FL (US); Robert J Snyder, St. Augustine, FL (US); Keith Gregory Tingle, Neptune Beach, FL (US)

(73) Assignee: GRASS VALLEY CANADA, Montreal (CA)

( * ) Notice: Subject to any disclaimer, the term of this patent is extended or adjusted under 35 U.S.C. 154(b) by 3563 days.

(21) Appl. No.: 10/247,783

(22) Filed: Sep. 20, 2002

(65) Prior Publication Data

US 2003/0070167 A1    Apr. 10, 2003

Related U.S. Application Data

(63) Continuation-in-part of application No. 10/208,810, filed on Aug. 1, 2002, now abandoned, which is a
(Continued)

(51) Int. Cl.
*H04N 21/81* (2011.01)
*H04N 21/258* (2011.01)
(Continued)

(52) U.S. Cl.
CPC ........... *H04N 21/812* (2013.01); *G06F 16/40* (2019.01); *G06F 16/958* (2019.01); *G06Q 30/02* (2013.01);
(Continued)

(58) Field of Classification Search
CPC ........... H04N 21/812; H04N 21/25891; H04N 21/4622; H04N 21/4782; H04N 5/268;
(Continued)

(56) References Cited

U.S. PATENT DOCUMENTS

| 4,232,311 | A | 11/1980 | Agneta |
| 4,242,707 | A | 12/1980 | Budai |

(Continued)

FOREIGN PATENT DOCUMENTS

| DE | 4204689 A1 | 8/1993 | |
| EP | 0 239 884 A1 | 10/1987 | ............... G09B 5/06 |

(Continued)

OTHER PUBLICATIONS

Domino's ups NFL Sponsorship, Apr. 22, 1994, UPI Archives, https://www.upi.com/Archives/1994/04/22/Dominos-ups-NFL-sponsorship/6557766987200/.*

(Continued)

*Primary Examiner* — Arthur Duran
(74) *Attorney, Agent, or Firm* — Arent Fox LLP

(57) ABSTRACT

A method, system, and computer program product enables automation and control of the sales, management, accounting, reporting, and traffic functions necessary to manage advertisement sales, content management, and administrative processes for media production environments, including, but not limited to, broadcast television, radio and webcasting stations, and newspapers. The advertisement management and automation system operates on a PC-based platform and is networked for communications with local area networks, wide area networks, and the Internet, including both wired and wireless appliances. Distribution and tracking is enabled for both local and national advertisement and content management, whereby data, advertisements, content, and reports are pushed and pulled from individual (Continued)

nodes (e.g., television stations) to a central network hub or point that feeds and/or gathers data and communicates with the individual nodes. Traditional broadcast methods for over-the-air, DBS, terrestrial cable, wireless, and live Internet webcasting are combined with on-demand Internet and wireless appliances for monetizing and streamlining the sales, management, accounting, reporting, and traffic processes for single and multi-distribution content production environments.

63 Claims, 46 Drawing Sheets

Related U.S. Application Data continuation-in-part of application No. 09/836,239, filed on Apr. 18, 2001, now Pat. No. 6,760,916.

(60) Provisional application No. 60/323,328, filed on Sep. 20, 2001, provisional application No. 60/363,098, filed on Mar. 12, 2002.

(51) Int. Cl.
| | |
|---|---|
| G06Q 30/02 | (2012.01) |
| H04N 21/462 | (2011.01) |
| H04N 21/4782 | (2011.01) |
| H04N 5/268 | (2006.01) |
| G06Q 30/06 | (2012.01) |
| G06F 16/958 | (2019.01) |
| G06F 16/40 | (2019.01) |

(52) U.S. Cl.
CPC ..... *G06Q 30/0264* (2013.01); *G06Q 30/0273* (2013.01); *G06Q 30/0276* (2013.01); *G06Q 30/0277* (2013.01); *G06Q 30/06* (2013.01); *H04N 5/268* (2013.01); *H04N 21/25891* (2013.01); *H04N 21/4622* (2013.01); *H04N 21/4782* (2013.01)

(58) Field of Classification Search
CPC ........... G06Q 30/0273; G06Q 30/0277; G06Q 30/0276; G06Q 30/02; G06Q 30/0264; G06Q 30/06; G06F 16/958; G06F 16/40
See application file for complete search history.

(56) References Cited

U.S. PATENT DOCUMENTS

| | | | |
|---|---|---|---|
| 4,272,790 A | 6/1981 | Bates | |
| 4,283,766 A | 8/1981 | Snyder et al. | |
| 4,400,697 A | 8/1983 | Currie et al. | |
| 4,488,180 A | 12/1984 | Rabinowitz | |
| 4,559,531 A | 12/1985 | Buynak | |
| 4,631,590 A | 12/1986 | Yamada et al. | |
| 4,689,683 A | 8/1987 | Efron | |
| 4,746,994 A | 5/1988 | Ettlinger | |
| 4,768,102 A | 8/1988 | O'Gwynn | |
| 4,972,274 A | 11/1990 | Becker et al. | |
| 4,982,346 A | 1/1991 | Girouard et al. | |
| 5,001,473 A | 3/1991 | Ritter et al. | |
| 5,036,395 A | 7/1991 | Reimers | |
| 5,115,310 A | 5/1992 | Takano et al. | |
| 5,148,154 A | 9/1992 | MacKay et al. | |
| 5,166,797 A | 11/1992 | Angell | |
| 5,189,516 A | 2/1993 | Angell et al. | |
| 84,746,994 | 2/1993 | Ettlinger | |
| 5,231,499 A | 7/1993 | Trytko | |
| 5,237,648 A | 8/1993 | Mills et al. | |
| 5,262,865 A | 11/1993 | Hertz | |
| 5,274,758 A | 12/1993 | Beitel et al. | |
| 5,307,456 A | 4/1994 | MacKay | |
| 5,388,197 A | 2/1995 | Rayner | |
| 5,420,724 A | 5/1995 | Kawamura et al. | |
| 5,434,678 A | 7/1995 | Abecassis | |
| 5,442,749 A | 8/1995 | Northcutt et al. | |
| 5,450,140 A | 9/1995 | Washino | |
| 5,487,167 A | 1/1996 | Dinallo et al. | |
| 5,491,517 A | 2/1996 | Kreitman et al. | |
| 5,519,828 A | 5/1996 | Rayner | |
| 5,537,157 A | 7/1996 | Washino et al. | |
| 5,557,724 A | 9/1996 | Sampat et al. | |
| 5,559,641 A | 9/1996 | Kajimoto et al. | |
| 5,565,929 A | 10/1996 | Tanaka | |
| 5,577,190 A | 11/1996 | Peters | |
| 5,581,706 A | 12/1996 | Jessup, Jr. et al. | |
| 5,594,660 A | 1/1997 | Sung et al. | |
| 5,602,684 A | 2/1997 | Corbitt et al. | |
| 5,625,570 A | 4/1997 | Vizireanu et al. | |
| 5,641,596 A | 6/1997 | Gray et al. | |
| 5,646,997 A | 7/1997 | Barton | |
| 5,659,792 A | 8/1997 | Walmsley | |
| 5,659,793 A | 8/1997 | Escobar et al. | |
| 5,664,087 A | 9/1997 | Tani et al. | |
| 5,668,948 A | 9/1997 | Belknap et al. | |
| 5,680,639 A | 10/1997 | Milne et al. | |
| 5,682,326 A | 10/1997 | Klingler et al. | |
| 5,708,478 A | 1/1998 | Tognazzini | |
| 5,724,521 A | 3/1998 | Dedrick | |
| 5,737,011 A | 4/1998 | Lukacs | |
| 5,740,549 A | 4/1998 | Reilly et al. | |
| 5,752,238 A | 5/1998 | Dedrick | |
| 5,754,873 A | 5/1998 | Nolan | |
| 5,761,417 A | 6/1998 | Henley et al. | |
| 5,764,306 A | 6/1998 | Steffano | |
| 5,774,170 A | 6/1998 | Hite et al. | |
| 5,774,664 A | 6/1998 | Hidary et al. | |
| 5,778,181 A | 7/1998 | Hidary et al. | |
| 5,790,117 A | 8/1998 | Halviatti et al. | |
| 5,794,210 A * | 8/1998 | Goldhaber et al. | ............. 705/14 |
| 5,795,228 A | 8/1998 | Trumbull et al. | |
| 5,801,685 A | 9/1998 | Miller et al. | |
| 5,805,154 A | 9/1998 | Brown | |
| 5,809,471 A | 9/1998 | Brodsky | |
| 5,826,102 A | 10/1998 | Escobar et al. | |
| 5,833,468 A | 11/1998 | Guy et al. | |
| 5,848,396 A * | 12/1998 | Gerace | ........................... 705/10 |
| 5,852,435 A | 12/1998 | Vigneaux et al. | |
| 5,854,887 A | 12/1998 | Kindell et al. | |
| 5,872,565 A | 2/1999 | Greaves et al. | |
| 5,875,108 A | 2/1999 | Hoffberg et al. | |
| 5,880,792 A | 3/1999 | Ward et al. | |
| 5,892,507 A | 4/1999 | Moorby et al. | |
| 5,892,536 A | 4/1999 | Logan et al. | |
| 5,892,767 A | 4/1999 | Bell et al. | |
| 5,907,321 A | 5/1999 | Grossman et al. | |
| 5,918,002 A | 6/1999 | Klemets et al. | |
| 5,920,700 A | 7/1999 | Gordon et al. | |
| 5,929,849 A | 7/1999 | Kikinis | |
| 5,930,446 A | 7/1999 | Kanda | |
| 5,931,901 A | 8/1999 | Wolfe et al. | |
| 5,946,664 A | 8/1999 | Ebisawa | |
| 5,953,506 A | 9/1999 | Kalra et al. | |
| 5,966,120 A | 10/1999 | Arazi et al. | |
| 5,987,501 A | 11/1999 | Hamilton et al. | |
| 5,996,015 A | 11/1999 | Day et al. | |
| 5,999,912 A | 12/1999 | Wodarz et al. | |
| 6,002,393 A | 12/1999 | Hite et al. | |
| 6,006,241 A | 12/1999 | Purnaveja et al. | |
| 6,006,265 A | 12/1999 | Rangan et al. | |
| 6,011,537 A | 1/2000 | Slotznick | |
| 6,018,768 A | 1/2000 | Ullman et al. | |
| 6,026,368 A | 2/2000 | Brown et al. | |
| 6,029,045 A | 2/2000 | Picco et al. | |
| 6,029,194 A | 2/2000 | Tilt | |
| 6,035,304 A | 3/2000 | Machida et al. | |
| 6,038,573 A | 3/2000 | Parks | |
| 6,061,719 A | 5/2000 | Bendinelli et al. | |
| 6,064,967 A | 5/2000 | Speicher | |
| 6,084,581 A | 7/2000 | Hunt | |
| 6,084,628 A | 7/2000 | Sawyer | |

(56) References Cited

U.S. PATENT DOCUMENTS

| | | |
|---|---|---|
| 6,119,098 A | 9/2000 | Guyot et al. |
| 6,133,909 A | 10/2000 | Schein et al. |
| 6,134,380 A | 10/2000 | Kushizaki |
| 6,141,007 A | 10/2000 | Lebling et al. |
| 6,144,375 A | 11/2000 | Jain et al. |
| 6,146,148 A | 11/2000 | Stuppy |
| 6,157,929 A | 12/2000 | Zamiska et al. |
| 6,160,570 A | 12/2000 | Sitnik |
| 6,182,050 B1 | 1/2001 | Ballard |
| 6,185,538 B1 | 2/2001 | Schulz |
| 6,188,396 B1 | 2/2001 | Boezeman et al. |
| 6,198,477 B1 | 3/2001 | Kurtze et al. |
| 6,198,906 B1 | 3/2001 | Boetje et al. |
| 6,204,840 B1 | 3/2001 | Petelycky et al. |
| 6,211,869 B1 | 4/2001 | Loveman et al. |
| 6,216,112 B1 | 4/2001 | Fuller et al. |
| 6,223,211 B1 | 4/2001 | Hamilton et al. |
| 6,262,721 B1 | 7/2001 | Tsukidate et al. |
| RE37,342 E | 8/2001 | Washino et al. |
| 6,289,378 B1 * | 9/2001 | Meyer et al. .......... 709/223 |
| 6,315,572 B1 | 11/2001 | Owens et al. |
| 6,398,556 B1 | 6/2002 | Ho et al. |
| 6,404,978 B1 | 6/2002 | Abe |
| 6,437,802 B1 | 8/2002 | Kenny |
| 6,441,832 B1 | 8/2002 | Tao et al. |
| 6,442,529 B1 | 8/2002 | Krishan et al. |
| 6,452,612 B1 | 9/2002 | Holtz et al. |
| 6,458,060 B1 | 10/2002 | Watterson et al. |
| 6,460,018 B1 | 10/2002 | Kasai et al. |
| 6,469,711 B2 | 10/2002 | Foreman et al. |
| 6,490,725 B2 | 12/2002 | Kikinis |
| 6,542,620 B1 | 4/2003 | Rhoads |
| 6,546,427 B1 * | 4/2003 | Ehrlich ............... G06Q 30/02 |
| | | 370/299 |
| 6,604,242 B1 | 8/2003 | Weinstein et al. |
| 6,668,377 B1 | 12/2003 | Dunn |
| 6,718,551 B1 | 4/2004 | Swix et al. |
| 6,763,523 B1 | 7/2004 | Sacilotto, Jr. et al. |
| 6,832,388 B1 * | 12/2004 | Du Val ............... H04N 7/17318 |
| | | 348/E7.071 |
| 6,904,408 B1 * | 6/2005 | McCarthy ............ A61B 5/6815 |
| | | 705/2 |
| 6,952,688 B1 * | 10/2005 | Goldman ............. G06N 5/022 |
| | | 706/45 |
| 7,024,677 B1 | 4/2006 | Snyder et al. |
| 7,181,523 B2 | 2/2007 | Sim |
| 7,424,439 B1 * | 9/2008 | Fayyad ............ G06Q 30/0204 |
| | | 705/7.33 |
| 7,549,128 B2 | 6/2009 | Snyder et al. |
| 7,684,681 B1 | 3/2010 | Bodkin et al. |
| 2001/0018771 A1 * | 8/2001 | Walker ............... H04N 7/17318 |
| | | 725/91 |
| 2001/0032333 A1 * | 10/2001 | Flickinger .................. 725/39 |
| 2001/0049824 A1 * | 12/2001 | Baker .................. G06Q 30/02 |
| | | 725/109 |
| 2002/0059094 A1 * | 5/2002 | Hosea ............... H04N 21/25891 |
| | | 725/10 |
| 2002/0067730 A1 * | 6/2002 | Hinderks et al. ........ 370/395.52 |
| 2002/0165781 A1 * | 11/2002 | McKay ............... G06Q 10/087 |
| | | 705/22 |
| 2002/0170068 A1 | 11/2002 | Rafey et al. |
| 2002/0171649 A1 | 11/2002 | Fogg |
| 2003/0066070 A1 | 4/2003 | Houston |
| 2003/0070167 A1 | 4/2003 | Holtz et al. |
| 2003/0141665 A1 | 7/2003 | Li |
| 2003/0206662 A1 | 11/2003 | Avinash et al. |
| 2003/0206720 A1 | 11/2003 | Abecassis |
| 2004/0005004 A1 | 1/2004 | Demos |
| 2004/0073953 A1 | 4/2004 | Xu et al. |
| 2004/0095829 A1 | 5/2004 | Barnbrook |
| 2004/0103439 A1 | 5/2004 | Macrae et al. |
| 2004/0148625 A1 * | 7/2004 | Eldering ............... H04N 7/165 |
| | | 725/34 |
| 2004/0210945 A1 | 10/2004 | Snyder et al. |
| 2004/0228605 A1 | 11/2004 | Quan et al. |
| 2004/0237122 A1 | 11/2004 | Yamaguchi et al. |
| 2005/0028217 A1 | 2/2005 | Marler et al. |
| 2005/0084232 A1 | 4/2005 | Herberger et al. |
| 2005/0193410 A1 * | 9/2005 | Eldering ............... H04N 7/165 |
| | | 725/34 |
| 2005/0259946 A1 | 11/2005 | Kitamura |
| 2008/0016532 A1 | 1/2008 | Wang |
| 2008/0028340 A1 | 1/2008 | Davis |

FOREIGN PATENT DOCUMENTS

| | | | |
|---|---|---|---|
| EP | 0 239 884 B1 | 10/1987 | ............ G09B 5/06 |
| EP | 0 774 756 A2 | 5/1997 | .......... G11B 27/034 |
| EP | 0 774 756 A3 | 5/1997 | .......... G11B 27/034 |
| EP | 0 817 474 A1 | 1/1998 | ............ H04N 5/222 |
| EP | 0929197 | 7/1999 | |
| EP | 0 933 893 A1 | 8/1999 | ............... H04H 7/00 |
| EP | 0952732 A2 | 10/1999 | |
| EP | 1126712 | 8/2001 | |
| EP | 1262063 | 12/2002 | |
| GB | 2 323 699 A | 9/1998 | ............ H04N 5/78 |
| GB | 2343051 A | 4/2000 | |
| JP | 265677 | 10/1989 | |
| JP | 276160 | 10/1998 | |
| JP | 11266422 | 9/1999 | |
| WO | WO 87/07108 | 11/1987 | ............ H04N 5/782 |
| WO | WO 96/13119 A1 | 5/1996 | |
| WO | WO9722204 | 6/1997 | |
| WO | WO 98/45789 A1 | 10/1998 | ............ G06F 17/21 |
| WO | WO 98/45792 A1 | 10/1998 | ............ G06F 17/30 |
| WO | WO 99/05821 A2 | 2/1999 | ............ H04L 12/00 |
| WO | WO 99/05821 A3 | 2/1999 | ............ H04L 12/00 |
| WO | WO 99/66719 A1 | 12/1999 | |
| WO | WO 00/72574 | 11/2000 | |
| WO | WO 01/52526 | 7/2001 | |
| WO | WO02087244 | 10/2002 | |
| WO | WO2004095829 | 11/2004 | |

OTHER PUBLICATIONS

U.S. Appl. No. 10/431,576, filed May 8, 2003, Snyder et al.
U.S. Appl. No. 10/247,783 filed, Sep. 20, 2002, Holtz et al.
U.S. Appl. No. 10/434,458, filed May 9, 2003, Snyder et al.
U.S. Appl. No. 10/434,461, filed May 9, 2003, Holtz et al.
U.S. Appl. No. 10/208,810, filed Aug. 1, 2002, Holtz et al.
U.S. Appl. No. 10/434,460, filed May 9, 2003, Snyder et al.
Synchronized Multimedia Working Group: "Synchronized Multimedia Integration Language (SMIL) 1.0 Specification" World Wide Web Consortium, Online 15=Jun. 1998, XP002934899.
Matt Cristy, "ParkerVision puts together $100,000 exhibit for show", Apr. 7, 1997, Business Journal of Jacksonville, pp. 1-2.
ParkerVision 1997 Annual Report.
Parkervision, CameraManSTUDIO, Preliminary Sales Manual, SSM-963-001-KKM, Sep. 18, 1996, pp. 1-29.
Parkervision, Preliminary Sales Manual, SSM-963-001-KKM, Product Pricing, Sep. 18, 1996, pp. 1-54.
"Overview," *Yahoo!® Broadcast* [online], 2000 [retrieved Apr. 26, 2001], Retrieved from the Internet: <URL: http://business.broadcast.com/overview.html, 2 pages.
International Search Report for Appln. No. PCT/US02/14427 dated Oct. 17, 2003, 6 pages.
Judy, T.A. (Ed.). Louth Automation: Quarterly News, vol. 1, Issue 2, Jul. 1997.
Judy, T.A. (Ed.). Louth Automation: Quarterly News, vol. 1, Issue 3, Oct. 1997.
Judy, T.A. (Ed.). Louth Automation: Quarterly News, vol. 1, Issue 4, Jan. 1998.
Judy, T.A. (Ed.). Louth Automation: Quarterly News, vol. 1, Issue 5, Mar. 1998.
Judy, T.A. (Ed.). Louth Automation: Quarterly News, vol. 1, Issue 6, Jul. 1998.
U.S. Appl. No. 09/482,683, filed Jan. 14, 2000, Holtz et al.
U.S. Appl. No. 09/488,578, filed Jan. 21, 2000, Snyder et al.
U.S. Appl. No. 09/634,735, filed Aug. 8, 2000, Snyder et al.

(56) References Cited

OTHER PUBLICATIONS

U.S. Appl. No. 09/822,855, filed Apr. 2, 2001, Holtz et al.
U.S. Appl. No. 09/832,923, filed Apr. 12, 2001, Holtz et al.
U.S. Appl. No. 09/836,239, filed Apr 18, 2001, Holtz et al.
Burghardt, J., "Das Sony-News-System," *Fernseh Und Kinotechnik*, Vde Verlag Gmbh, vol. 50, No. 11, pp. 641-642 and 644-646 (Nov. 1, 1996).
English-language translation of Sections 1, 2 and 3.7 of Burghardt, J., "Das Sony-News-System," *Fernseh Und Kinotechnik*, Vde Verlag Gmbh, 4 Pages (Nov. 1, 1996).
*Avstar and ParkerVision Streamline Broadcast News Production Process: Reducing Costs*, Radio-Television News Directors Association, at http://www.avstartnews.com/news/parker.html, 3 pages (Sep. 29, 1999).
*Avstar BCS*, at http://www.avstarnews.com/products/bcs/bcs_over.html, 2 pages (last visited Oct. 2, 1999).
*Avstar Fact Sheet*, at http://www.avstarnews.com/about/facts.html, 2 pages (last visited Oct. 2, 1999).
*Avstar MBS*, at http://www.avstarnews.com/products/mbs/mbs_over.html, 1 page (last visited Oct. 2, 1999).
*Avstar Products*, at http://www.avstarnews.com/products/products.html, 1 pages (last visited Oct. 2, 1999).
Avstar™ *Broadcast Control System*, available at http://www.avstarnews.com/products/bcs/bcs_over.html, 2 pages (last visited Oct. 2, 1999)/.
Avstar™ *Media Browse System*, available at http://www.avstarnews.com/products/mbs/mbs_over.html, 2 pages (last visited Oct. 2, 1999).
Avstar™ *Newsroom Computer System*, available at http://www.avstarnews.com/products/ncs_over.html 2 pages (last visited Oct. 2, 1999).
*Complete Seamless Integration*, at http://www.play.com/trinityNLE/complete.html, 2 pages (last visited Oct. 14, 1999).
*Edit. Sweet.*, at http://www.play.com/trinityNLE/edit.html (last visited Oct. 14, 1999).
*Gizmos98 Home Page*, at http://www.play.com/products/gizmos/index.html, 2 pages (last visited Oct. 14, 1999).
*GlobalCast Communications, Inc.—Solutions*, GlobalCast Communications, at http://www.gcast.com/solutions.shtml, 2 pages (last visited Oct. 15, 1999).
*GlobeCaster*, at http://www.play.com/products/globecaster/index.html, 2 pages (last visited Oct. 14, 1999).
*HP Teams With ISVs to Complete Solution Portfolio for Internet Service Providers*, GlobalCast Communications, at http://www.gcast.com/press/11.shtml, 2 pages (Sep. 28, 1998).
*LeaderPlus*, at http://www.avstarnews.com/products/leader/leader_over.html, 2 pages (last visited Oct. 2, 1999).
*Lucent Technologies and GlobalCast Communications Form Strategic Partnership in Reliable Multicast Market*, GlobalCast Communications, at http://www.gcast.com/press/2.shtml, 2 pages (Aug. 25, 1997).
*Newsroom Computer System*, at http://www.avstarnews.com/products/ncs/ncs_over.html, 2 pages (last visited Oct. 2, 1999).
*Play Incorporated Announces Do-It-Yourself Internet Studio*, at http://www.play.com/news/111698-globecaster.html, 2 pages (Nov. 19, 1998).
*Play Incorporated Announces Trinity Live, A Live Production System Based on Advanced Digital Component Switcher and Real-Time Trinity Architecture*, at http://www.play.com/news/091099.html, 2 pages (Sep. 10, 1999).
*Product Features*, at http://www.play.com/products/globecaster/features.html, 1 page (last visited Oct. 15, 1999).
*Products*, at http://www.play.com/products/index.html, 2 pages (last visited Oct. 14, 1999).
*Products: Trinity*, at http://www.play.com/products/tinity/index/html, 1 page (last visited Oct. 14, 1999).
*Products: Trinity: Digital Effects*, at http://www.play.com/products/trinity/digital.html, 2 pages (last visited Oct. 14, 1999).
*Products: Trinity: Editor*, at http://www.play.com/products/trinity/editor.html, 1 page (last visited Oct. 14, 1999).
*Products: Trinity: Switcher*, at http://www.play.com/products/trinity/switcher.html, 2 pages (last visited Oct. 14, 1999).
*Products: Trinity: Technical Specifications*, at http://www.play.com/products/trinity/techspecs.html, 1 page (last visited Oct. 14, 1999).
*RealProducer Plus G2*, at http://www.real.com/products/tools/producerplus/index.html, 3 pages (last visited Oct. 15, 1999).
*RealProducer Plus G2 Documentation*, at http://www.real.com/products/tools/producerplus/docs.html, 3 pages (last visited Oct. 15, 1999).
*System Requirements*, at http://www.play.com/products/globecaster/sysreq.html, 1 page last visited Oct. 15, 1999).
*Technical Engineer Speak Specs*, at http://www.play.com/trinityNLE/tech.html, 2 pages (last visited Oct. 14, 1999).
*Trinity-NLE is Here!*, at http://www.play.com/news/100499.html, 2 pages (last visited Oct. 15, 1999).
*Trinity University Opens*, at http://wwww.play.com/news/121797.html, 1 page (last visited Oct. 15, 1999).
*Video Production*, at http://www.winningpost.com.au/html/video_production.html, 1 , page (last visited Oct. 14, 1999).
Wolfe, M., *Television Stations, Production Companies Appreciate Trinity's Impressive Features, Low Cost*, at http://www.play.com/news/090299.html, 2 pages (Sep. 2, 1999).
Wolfe, M., *USA Today Runs Extensive Story About GlobeCaster*, at http://www.play.com/news/061699.html, 2 pages (Jun. 16, 1999).
International Search Report for Appl. No. PCT/US01/00547 dated Aug. 28, 2001, 10 Pages.
International Search Report for Appl. No. PCT/US01/10306 dated Jan. 18, 2002, 6 Pages.
*ADC-100*, available at http://www.louth.com/products/adc100_info.htm, 2 pages (Jul. 13, 1998).
Ahanger, G. and Little, T., "Automatic Composition Techniques for Video Production," *IEEE Transactions on Knowledge and Data Engineering*, IEEE, vol. 10, No. 6, Nov./Dec. 1998, pp. 967-987.
*AirBoss: Airtime Broadcast Automation*, [retrieved on Jul. 13, 1998] at http://www.florical.com/airboss.html, 1 pages.
*CameraMan Studio*, CSS-2000-N/P, ParkerVision, Apr. 1997, 2 pages.
*CameraMan Studio System II Broadcast Production Systems*, CSS-2000, CSS-2313, CSS-2017, ParkerVision, Oct. 1997, 2 pages.
Declaration of Alex Holtz under 35 U.S.C. § 1.56, Feb. 2, 2001, 6 pages.
Hartford, S., "Overcoming Current Limitations of Personal Computers in Replacing Traditional Video Production Equipment," *SMPTE Journal*, Jan. 1998, pp. 58-64.
Judy, T.A. (Ed.), "AUTOSAT Provides Downlink Control for WKYC," *LOUTH Automation Quarterly News*, vol. 1, Issue 2, Jul. 1997, 4 pages.
Cataldo, C., "Louth Provides The Automation Solution for HBO, New York," *LOUTH Automation Quarterly News*, vol. 1, Issue 3, Oct. 1997, 4 pages.
Judy, T.A. (Ed.), "Louth Provides Satellite Program Acquisition System to CNBC-TV, New Jersey,"*LOUTH Automation Quarterly News*, vol. 1, Issue 4, Jan. 1998, 4 pages.
Judy, T.A. (Ed.). "Louth Provides Fully Digital Solution for Foxtel, Australia," *LOUTH Automation Quarterly News*, vol. 1, Issue 5, Mar. 1998, 4 pages.
Judy, T.A. (Ed.), "Telemadrid Chooses Louth for Multi-Channel Automation System," *LOUTH Automation Quarterly News*, vol. 1, Issue 6, Jul. 1998, 4 pages.
Maar, J., "Newscast Without a Crew," Television Broadcast, Oct. 1998, 1 page.
*NewsRepeater: Automated News Channel*, [retrieved on Jul. 13, 1998] at http://www.florical.com/newsrepeater.html, 1 page.
ParkerVision Beta License Agreement for CameraMan STUDIO Systems, ParkerVision, Dec. 19, 1997.
*Presentation Automation, The Powerful and Flexible Windows Based Solution* (Copyright 1995, 1996), (retrieved on Jul. 14, 1998) at http://www.pro-bel.com/corporate/pro-bel_software/products/automation/cp-4000.htm,, 3 pages.
*Pro-Bel Software: Procion AV-Workbench* (Copyright 1995-1998), [retrieved on Jul. 14, 1998]at http://www.pro-bel.com/corporate/pro-bel.ltd/products/ShortForm/page3.htm, 8 pages.

(56) References Cited

OTHER PUBLICATIONS

*Product Information* (last revised Jun. 17, 1998), [retrieved on Jul. 13, 1998] at http://www.louth.com/products/index.htm, 1 page.
*Products: Integrated Money Making Systems*, at http://www.florical.com/products.html, 2 pages (last visited Jul. 13, 1998).
*ShowTimer: PreAir Automation*, at http://wwww.florical.com/showtimer.html, 1 page (last visited Jul. 13, 1998).
Slack, P.A. et al., "An Integrated Video Production System," *International Broadcasting Convention*, Sep. 12-16, 1996, pp. 403-408.
*SpotCacher—Video Server and Cache Management*, at http://www.florical.com/spotcacher.html, 1 page (last visited Jul. 13, 1998).
*Station Automation—Now it's a Snap!* (Copyright 1995, 1996), Pro-Bel Ltd., at http://www.pro-bel.com/corporate/pro-bel_software/products/automation, 2 pages (last visited Jul. 14, 1998).
*TimeShifter: Tape/Disk Network Delay*, at http://www.florical.com/timeshifter.html, 1 page (last visited Jul. 13, 1998).
*Video Server Management System* (Copyright 1995, 1996), Pro-Bel Ltd., at http://www.pro-bel.com/corporate/pro-bel_software/products/mapp/, 4 pages (last visited Jul. 14, 1998).
Vigneaux, S., "The Integration of a Newsroom Computer System with a Server-Centred News Production System," *International Broadcasting Convention*, Sep. 12-16, 1996, pp. 512-518.
English-language Abstract of JP 10-065936, published Mar. 6, 1998, from http://wwwl.jpdl.jpo.go.jp, 2 Pages (last visited May 20, 2002).
"About Yahoo! Broadcast," *Yahoo!® Broadcast* [online], 2000 [Retrieved on Apr. 26, 2001]. Retrieved from the Internet:URL: http://business.broadcast.com/about_2.html, 1 page.
"Advantages," *Yahoo!® Broadcast* [online], 2000 [retrieved on Apr. 26, 2001]. Retrieved from the Internet:URL: http://business.broadcast.com/advantages.html, 3 pages.
"Content and Conversation," *Yahoo!® Broadcast* [online], [retrieved on Apr. 26, 2001]. Retrieved from the Internet:<URL:http:business.broadcast.com/sanders_sprint/frameset/html, 1 page.
Festa, P., "Flood of spending due for streaming video," *Yahoo!® News* [online], Apr. 12, 2001 [retrieved Apr. 26, 2001]. Retrieved from the Internet:<URL: http://dailynews.yahoo.com/h/cn/20010412/tc/flood_of_spending_due_for_streaming_video_1.html, 2 pages.
Mannes, G., "Yahoo! Joins Suddenly Crowded Online Music Field," *AOL Personal Finance* [online], Apr. 5, 2001 [retrieved Apr. 26, 2001]. Retrieved from the Internet:<URL: http://aol.thestreet.com/tech/internet/1379000.html, 3 pages.
Mannes, G., "Chasing Sweet Semel of Success Takes Yahoo! To Hollywood," *AOL Personal Finance* [online], Apr. 17, 2001 [retrieved Apr. 26, 2001]. Retrieved from the Internet:<URL: http://aol.thestreet.com/tech/internet/1393298.html, 3 pages.
"Changing the Delivery of Business Communications," *Yahoo!® Broadcast* [online], 2000 [retrieved Apr. 26, 2001]. Retrieved from the Internet: <URL: http://business/.broadcast.com/overview.html, 2 pages.

Weisman, R., "Yahoo's Latest: New Broadcast Site," *Yahoo!® News* (online), Apr. 23, 2001 (retrieved Apr. 26, 2001). Retrieved from the Internet:<URL: http://dailynews.yahoo.com/h/nf/20010423/tc/9176_1.html, 3 pages.
"Webcasting 101," *Yahoo!® Broadcast* [online], 2000 [retrieved Apr. 26, 2001]. Retrieved from the Internet :<URL: http://business.broadcast.com/webcasting101.html, 3 pages.
"Welcome," *Yahoo!® Broadcast* [online], 2000, [retrieved Apr. 26, 2001]. Retrieved from the Internet:<URL: http://business.broadcast.com/, 1 page.
"Welcome to Yahoo! Broadcast," *Yahoo!® Broadcast* [online], 2001 [retrieved Apr. 26, 2001]. Retrieved from the Internet:>URL: http://mediaframe.yahoo.com/launch?lid=wmv-56-p.902530-41362.wmv-100-p.902531-4136.../index2html, 1 page.
Wine, W., Dr., "What is I Love TV™?," *iLoveTV Inc.* [online], [retrieved Jun. 12, 2001]. Retrieved from the Internet:>URL: http://209.47.14.231/whatis.html, 1 page.
Humphries, M., "The Options.," *iLoveTV Inc.* [online], [retrieved Jun. 12, 2001]. Retrieved from the Internet:>URL: http://209.47.14.231/possiblel.html, 1 page.
Wine, W., Dr., "The Benefits," iLoveTV Inc. [online], [retrieved Jun. 12, 2001]. Retrieved from the Internet:>URL:http://209.47.14.231/benefit.html, 1 page.
"Contact Us," *iLoveTV Inc.* [online], [retrieved Jun. 12, 2001]. Retrieved from the Internet:>URL: http://209.47.14.231/contact.html, 1 page.
"Press Releases," *iLoveTV Inc.* [online], Jun. 5, 2001 [retrieved Jun. 12, 2001]. Retrieved from the Internet:>URL: http://209.47.14.231/press.html, 1 page.
Park, I., "I Love TV: Cutting Edge Technology Unites the Power of Television and the Internet," *iLoveTV Inc.*[online], Jun. 5, 2001 [retrieved Jun. 12, 2001]. Retrieved from the Internet:>URL: http://209.47.14.231/press_cuttingEdge.html, 2 pages.
"Yahoo to Unveil New Broadcast Site," *Yahoo!® News* [online], Apr. 23, 2001 [retrieved Apr. 26, 2001]. Retrieved from the Internet:>URL: http://dailynews.yahoo.com/h/nm/20010423/tc/yahoo_broadcast_dc_1.html, 2 pages.
"Yahoo! Events," *Yahoo!® Events* [online], Apr. 26, 2001 [retrieved Apr. 26, 2001]. Retrieved from the Internet:>URL: http://events.yahoo.com/, 2 pages.
"Welcome to Yahoo! Radio," *Yahoo!® Radio* [online], [retrieved Apr. 26, 2001]. Retrieved from the Internet:>URL: http://radio.broadcast.com/, 2 pages.
International Search Report for Appln. No. PCT/US02/12048 dated Sep. 18, 2002, 6 pages.
International Search Report for Appln. No. PCT/US02/24929 dated Dec. 4, 2002, 6 pages.
International Search Report for Appln. No. PCT/US02/29647 dated Dec. 11, 2002, 8 pages.

\* cited by examiner

| PVTV WEB S.M.A.R.T. - [Sales] | | | | | | | | |
|---|---|---|---|---|---|---|---|---|
| File | Edit | View | Insert | Format | Tools | Modify | Window | Help |

Sales | Manager | Accounting | Reports | Traffic | Rate Cards | Tally Sheet Account Name: Sports Memorabilia
Account Source: Local
Account Rep: Alex Holtz
Account Number: 1234567
Address: 123 Auto Alley, Jacksonville, FL 12345
Contact Name: Charlie Hoss
Position: Owner
Telephone: 555-555-5555
Fax: 555-555-5555
E-Mail: choss@sportsgalore.com Signing Date 07/13/01

Print Reciept | Submit to Data Base

Sales Associate I D Number

Ads entered into data base under station advertising agreement

| Ad "Slug" Name | Tracking Number | Type | Broadcast / On Demand | Priority | Show | Break | Category | Begin Date | End Date | Quantity | Unit Rate | Adj Rate |
|---|---|---|---|---|---|---|---|---|---|---|---|---|
| Hockey Greats | 1234567-0001-01-1-2-2--0513-090701-- | Banner | Broadcast | Targeted | Noon | | 05-13 | 09/07/01 | | 10 | $45 | $450 |
| Hockey Greats | 1234567-0001-01-1-1-6--0605-090701-- | Banner | Broadcast | Exclusive | 10 00 | | 06-05 | 09/07/01 | | 10 | $75 | $750 |
| Hockey Greats | 1234567-0001-01-2-1-2--0506-090701-- | Banner | On Demand | Exclusive | Noon | | 05-06 | 09/07/01 | | 10000 | $45 | $450 |

Not to Exceed Total | $1650

Back

| S.M.A.R.T. - [Reports] | | | | | | | |
|---|---|---|---|---|---|---|---|
| File | Edit | View | Insert | Format | Tools | Modify | Window | Help |

Sales Manager Accounting Reports Traffic

Reports

Sales & Account Management

Sales Open Ad Avails & Cost Estimate Reports

Metrical

By Sales Person
Broadcast Sales
Management Detailed Report

By Sales Person
Broadcast Sales Management
Overview Report

By Account
Customer Account
Detailed Report

By Account
Customer Overview &
Status Report

By Account
Customer Invoice Report

Sales Persons Name

Report Period

From [ ] c
To [ ] c

Total Actual Sales for the Period  $000,000,000 00
Projected Sales for the Period  $000,000,000 00
Balance Remaining  $000,000,000 00

Sales Objective for the Period  $000,000,000 00
Projected Sales vs Objective for the Period. 100%
Actual vs Objective for the Period  100%

Total Number of Accounts Represented
Accounts Represented by Name
Total Number of Open Accounts  (Accounts with a Balance of Ad Avails Remaining)
Total Ad Avails Open by Account
Total Number of Ads Served by Account
Percent Complete by Account
Total Number of Ads Served for the Period by Account
Total Actual Sales for the Period  $000,000,000 00
Projected Sales for the Period  $000,000,000 00
Balance Remaining  $000,000,000 00
Total Number of Closed Accounts. (Accounts with ALL Ad Avails Served)
Total Number of Ads Served by Account
Total Actual Sales by Account  $000,000,000 00
Number of NEW Accounts for the Period
Accounts with NO Sales Activity
For the Period
For Last 90 Days (One Quarter)
For Last 180 Days (Two Quarters)
For Last 270 Days (Three Quarters)
For Last 360 Days (Four Quarters, One Year)
Accounts by Historical Sales Ranking  RANK # & Total Sales $000,000,000 00
Account Ranking for the Period  RANK # & Total Sales for the Period $000,000,000 00

Sales & Account Management Reports*(Cont)*

✓ By Account (Customer Account Detailed Report)

*FIELDS:*
Account Name
Account Address
Account Contact Information – Key Contact Name, Position, Office/Cell Phone, Fax, e-mail address, www address
Account Source: LOCAL (Local/Regional/National for Broadcaster or Group) or NATIONAL (ParkerVision/Third Party)
Salesperson for Account: Name NOTE: FOR EACH AD THERE MAY BE SEVERAL BRANCHES OF DATA DEPENDING UPON AD TYPE (LEVEL 1), AD PRIORITY (LEVEL 2) OR AD CATEGORY (LEVEL 3)

*AD NUMBER 1:*
Ad I.D. Number
Ad Name
Ad Media – Video, Banner, Button
Ad Video Duration: 5, 10, 15, 20, 25, 30, 45, 60, 90 Second Spots
Ad Type – LIVE or ON-DEMAND (LEVEL 1)
Ad Priority – Exclusive, Targeted, Non-Targeted (LEVEL 2)
Ad Category Selection(s): (LEVEL 3)
    TOPIC CODE: 01-01
    TOPIC NAME: Top News Story
    SHOW NAME: 5:00PM Newscast
Ad Pricing - $0,000.00/CPM (On-Demand) or $0,000.00/AVAIL (Live)
Ad Purchase Criteria:
    Maximum Total Number of Hits – Not to Exceed
    Start Date – End Date
    Maximum Budget: $0,000,000.00
Ad Status:
    As of - Date
    Number of Hits
    Percent Complete
    Current Balance: $0,000,000.00
    Number of Hits Remaining
    Percent Remaining
    Balance Remaining: $0,000,000.00

*AD NUMBER 2: repeat as above, etc.*

Sales & Account Management Reports*(Cont)*

✓ By Account (Customer Overview & Status Report)

*FIELDS:*
Account Name
Account Address
Account Contact Information – Key Contact Name, Position, Office/Cell Phone, Fax, e-mail address, www address
Account Source: LOCAL (Local/Regional/National for Broadcaster or Group) or NATIONAL (ParkerVision/Third Party)
Total Number of Ads
    Video
    Banner
    Button
Total Current Balance $0,000,000.00
Total Balance Remaining $0,000,000.00

Ad I.D. Number
    Ad Name
    Ad Pricing - $0,000.00/CPM
    Ad Status:
        As of - Date
        Number of Hits
        Percent Complete
        Current Balance: $0,000,000.00
        Number of Hits Remaining
        Percent Remaining
Balance Remaining: $0,000,000.00

FIG. 26

Sales & Account Management Reports*(Cont)*

✓ By Account (Customer Invoice Report)

*FIELDS:*
Account Name
Account Address
Account Contact Information – Key Contact Name, Position, Office/Cell Phone, Fax, e-mail address, www address
Account Source: LOCAL (Local/Regional/National for Broadcaster or Group) or NATIONAL (ParkerVision/Third Party)

Invoice Report Period Date: From 00/00/00 – To 00/00/00
Invoice Cycle: 30 Days
Invoice Due: $1,260.00

Total Number of Ads Served:
    Video:
            10 Second: 0
            15 Second: 12,000
            30 Second: 0
    Banner: 12,000
    Button: 0

| *AD NUMBER 1* | *AD NUMBER 2* |
|---|---|
| Ad I.D. Number: | Ad I.D. Number: |
| Ad Name: | Ad Name: |
| Ad Type: ON-DEMAND | Ad Type: ON-DEMAND |
| Ad Media Type: Video | Ad Media Type: Banner |
| Ad Duration: 15 Second | Ad Duration: N/A |
| Ad Pricing - $75.00/CPM | Ad Pricing - $30.00/CPM |
| Ad Priority – Targeted (LEVEL 2) | Ad Priority – Targeted (LEVEL 2) |
| Ad Category Selection(s): (LEVEL 3) | Ad Category Selection(s): (LEVEL 3) |
|    TOPIC CODE: 01-01 |    TOPIC CODE: 01-01 |
|    TOPIC NAME: Top News Story |    TOPIC NAME: Top News Story |
|    SHOW NAME: 5:00PM Newscast Newscast |    SHOW NAME: 5:00PM |
| Ad Status: | Ad Status: |
|    Number of Hits: 12,000 |    Number of Hits: 12,000 |
|    Percent Complete 100% |    Percent Complete 100% |
|    Current Balance: $900.00 |    Current Balance: $360.00 |
|    Number of Hits Remaining: 0 |    Number of Hits Remaining: 0 |
|    Percent Remaining: 0.0% |    Percent Remaining: 0.0% |
|    Balance Remaining: $0.00 |    Balance Remaining: $0.00 |

Sales Open Ad Avails & Cost Estimate Reports

✓ By Ad Media Type – (Example for LIVE 15 Second Targeted Video Ad)
Ad Type – LIVE (LEVEL 1)
Ad Media – Video
Ad Duration: 15 Second Spot
Ad Priority – Targeted (12 Open Avails) (LEVEL 2)
Ad Category Selection(s): (LEVEL 3)
  TOPIC CODE: N/A
  TOPIC NAME: N/A
  SHOW NAME: 5:00PM Newscast
  SHOWS/WEEK: 5
  AVAILS/SHOW (PER UNIQUE AD): 4
Ad Pricing - $75.00/AVAIL (Live)
Avails/Wk Estimate: 20
Cost/Wk Estimate: 20 x $75/AVAIL = $1,500

Sales Open Ad Avails & Cost Estimate Reports*(Cont)*

- ✓ By Ad Priority – (Example for ON-DEMAND 15 Second Targeted Video Ad)
  Ad Type – ON-DEMAND (LEVEL 1)
  Ad Media – Video
  Ad Duration: 15 Second Spot
  Ad Priority – Targeted (LEVEL 2)
  Ad Category Selection(s): (LEVEL 3)
      TOPIC CODE: 01-01
      TOPIC NAME: Top News Story
      SHOW NAME: 5:00PM Newscast
      CURRENT NUMBER OF ADS IN CYCLE: 2
      AVERAGE NUMBER OF DOWNLOADS PER WEEK: 12,000
  Ad Pricing - $75.00/CPM (On-Demand)
  Downloads/Wk Estimate based on Ads in Cycle: 4,000 Cycles for 3 Ads
  Cost/Wk Estimate based on Ads in Cycle: 4,000 x $75/CPM = $300

Sales Open Ad Avails & Cost Estimate Reports*(Cont)*

✓ By Ad Category – (Example for "Exclusive" Topic Code: 01-01; Topic Name: Top News Story of 15 Second Video Ad)
Ad Type – ON-DEMAND (LEVEL 1)
Ad Media – Video
Ad Duration: 15 Second Spot
Ad Priority – Exclusive (LEVEL 2)
Ad Category Selection(s): (LEVEL 3)
    TOPIC CODE: 01-01
    TOPIC NAME: Top News Story
    SHOW NAME: 5:00PM Newscast
    MAXIMUM ADS IN CYCLE: 1
    AVERAGE NUMBER OF DOWNLOADS PER WEEK: 12,000
Ad Pricing - $150.00/CPM (On-Demand)
Downloads/Wk Estimate based on Ads in Cycle: 12,000
      Cost/Wk Estimate based on Ads in Cycle: 12,000 x $150/CPM = $1,800

```
S.M.A.R.T. - [Reports]                                              _ □ ⊠
File    Edit    View    Insert    Format    Tools    Modify    Window    Help
```

Sales   Manager   Accounting   Reports   Traffic

Reports

| Sales & Account Management |
|---|

| Sales Open Ad Avails & Cost Estimate Reports |
|---|

| Metrical |
|---|

Create Report Sheet By
Live ○    On-Demand ○
Ad Media Type ▽
Ad Duration ▽
Ad Priority ▽
Ad Category ▽
Ad Price ▽
Avails/Wk Est ▽
Cost/Wk Est ▽

Time Period
Enter From Date [  C ]
Enter To Date  [  C ]

Metric Management Reports

✓ Download Report (By Show)
SHOW SCHEDULE:

| M-F | LIVE VIEWERS AVG.TOTAL/SHOW | % TOTAL | ON-DEMAND VIEWERS TOTAL/WK | % TOTAL |
|---|---|---|---|---|
| 6:00AM Newscast | 000,250 | 002% | 001,000 | 004% |
| 7:00AM Newscast | 000,750 | 007% | 002,500 | 010% |
| 12:00PM Newscast | 000,500 | 005% | 001,500 | 006% |
| 5:00PM Newscast | 001,500 | 014% | 005,000 | 020% |
| 5:30PM Newscast | 002,500 | 024% | 010,000 | 040% |
| 11:00PM Newscast | 001,500 | 014% | 000,500 | 002% |
| | | | | |
| Saturday | | | | |
| 12:00PM Newscast | 000,250 | 002% | 000,500 | 002% |
| 5:30PM Newscast | 000,750 | 007% | 001,500 | 006% |
| 11:00PM Newscast | 000,750 | 007% | 000,250 | 001% |
| | | | | |
| Sunday | | | | |
| 12:00PM Newscast | 000,250 | 002% | 000,500 | 002% |
| 5:30PM Newscast | 000,750 | 007% | 001,500 | 006% |
| 11:00PM Newscast | 000,750 | 007% | 000,250 | 001% |
| | | | | |
| TOTAL | 010,500 | 100% | 025,000 | 100% |

FIG. 32

Metric Management Reports*(Cont)*

3300

✓ Download Report (By Demographics % of Total Downloads)
SHOW SCHEDULE:

| M-F | MALE <18 | 18 – 34 | 18 – 49 | 25 – 54 | FEMALE <18 | 18 – 34 | 18 – 49 | 25 - 54 |
|---|---|---|---|---|---|---|---|---|
| | | | LIVE VIEWER DEMOGRAPHICS | | | | | |
| 6:00AM Newscast | 1% | 25 % | 45% | 35% | 1% | 25% | 45% | 35% |
| 7:00AM Newscast | 1% | 25 % | 45% | 35% | 1% | 25% | 45% | 35% |
| 12:00PM Newscast | 1% | 25 % | 45% | 35% | 1% | 25% | 45% | 35% |
| 5:00PM Newscast | 1% | 25 % | 45% | 35% | 1% | 25% | 45% | 35% |
| 5:30PM Newscast | 1% | 25 % | 45% | 35% | 1% | 25% | 45% | 35% |
| 11:00PM Newscast | 1% | 25 % | 45% | 35% | 1% | 25% | 45% | 35% |
| Saturday | | | | | | | | |
| 12:00PM Newscast | 1% | 25 % | 45% | 35% | 1% | 25% | 45% | 35% |
| 5:30PM Newscast | 1% | 25 % | 45% | 35% | 1% | 25% | 45% | 35% |
| 11:00PM Newscast | 1% | 25 % | 45% | 35% | 1% | 25% | 45% | 35% |
| Sunday | | | | | | | | |
| 12:00PM Newscast | 1% | 25 % | 45% | 35% | 1% | 25% | 45% | 35% |
| 5:30PM Newscast | 1% | 25 % | 45% | 35% | 1% | 25% | 45% | 35% |
| 11:00PM Newscast | 1% | 25 % | 45% | 35% | 1% | 25% | 45% | 35% |
| TOTAL AVG/AGE GROUP | 1% | 25 % | 45% | 35% | 1% | 25% | 45% | 35% |

NOTE: The above report should also be available in "units" i.e., downloads.

Metric Management Reports*(Cont)*

✓ Download Report (By Topic Category)

|  | ON-DEMAND VIEWERS | |
|---|---|---|
|  | TOTAL/WK | % TOTAL |
| Top News Story | 08,000 | 027% |
| Sports | 12,000 | 040% |
| Weather | 06,000 | 020% |
| Traffic | 04,000 | 013% |
| Etc. | | |
| Total | 30,000 | 100% |

Metric Management Reports*(Cont)*

✓ Download Report (By Demographics as a % of Downloads)

|  | ON-DEMAND VIEWER DEMOGRAPHICS | | | | | | | |
|---|---|---|---|---|---|---|---|---|
| CATEGORIES | MALE <18 | 18 – 34 | 18 – 49 | 25 – 54 | FEMALE <18 | 18 – 34 | 18 – 49 | 25 - 54 |
| Top News Story | 1% | 25 % | 45% | 35% | 1% | 25% | 45% | 35% |
| Sports | 1% | 25 % | 45% | 35% | 1% | 25% | 45% | 35% |
| Weather | 1% | 25 % | 45% | 35% | 1% | 25% | 45% | 35% |
| Traffic | 1% | 25 % | 45% | 35% | 1% | 25% | 45% | 35% |
| ETC | | | | | | | | |

NOTE: The above report should also be available in "units" i.e., downloads.

Metric Management Reports*(Cont)*

✓ Bandwidth Report (By Downloads & Service)

|  | 28.8kbps | 56kbps | 100+kbps | 300+kbps | 1.5+Mbps |
|---|---|---|---|---|---|
| Download Units | 0 | 50 | 450 | 250 | 250 |
| Downloads % | 0% | 5% | 45% | 25% | 25% |
| Service: | | | | | |
| POTS Modem | 0 | 50 | 0 | 0 | 0 |
| Cable Modem | 0 | 0 | 200 | 100 | 50 |
| DSL Modem | 0 | 0 | 150 | 100 | 50 |
| ISDN | 0 | 0 | 100 | 50 | 0 |
| T-1 | 0 | 0 | 0 | 0 | 100 |
| DS-3/OC-3 | 0 | 0 | 0 | 0 | 50 |
| Other | 0 | 0 | 0 | 0 | 0 |

FIG. 36

ADVERTISEMENT MANAGEMENT METHOD, SYSTEM, AND COMPUTER PROGRAM PRODUCT

This application is a continuation-in-part of U.S. application Ser. No. 10/208,810, filed Apr. 1, 2002, by Holtz et al., entitled "Method, System and Computer Program Product for Producing and Distributing Enhanced Media," incorporated herein by reference in its entirety, which is a continuation-in-part of U.S. application Ser. No. 09/836,239, filed Apr. 18, 2001, by Holtz et al., entitled "Method, System and Computer Program Product for Producing and Distributing Enhanced Media Downstreams," incorporated herein by reference in its entirety.

This application also claims the benefit of U.S. Provisional Application No. 60/323,328, filed Sep. 20, 2001, by Holtz, entitled "Advertisement Management Method, System, and Computer Program Product," incorporated herein by reference in its entirety, and the benefit of U.S. Provisional Application No. 60/363,098, filed Mar. 12, 2002, by Holtz et al., entitled "Sales Module to Support System for On-Demand Internet Delivery of News Content," incorporated herein by reference in its entirety.

BACKGROUND OF THE INVENTION

Field of the Invention

The present invention relates generally to information management, and more specifically, to pricing and distributing media over a communications network.

Related Art

Today, local television stations and network broadcasters have implemented some type of sales, management, accounting, reporting, and traffic software tools and processes for single (e.g., local television station) and multi-distribution (e.g., broadcast network) content production and advertisement management functions. For local broadcasters, these five processes are managed within their facilities over their local area networks. These processes assist personnel operating the facility and production environment. However, the inventors are aware of no single software application that covers all five processes, in the manner described in the following, although some software applications exist that provide integration between a software application and production equipment. As an example, some vendor products provide interactive integration between traffic and production equipment such as master control.

Broadcasters and/or content producers are also moving towards multi-format distribution methods and channels. As such, the traditional approach to advertising is becoming ineffective and outdated. For instance, distribution over the Internet (or by any "digital" bi-directional communication and distribution method) introduces a new method of delivery that can be "live," "as live" (time shifted) or "on-demand." Historically, the Internet webcasters have sold advertising based on "click-throughs," "impressions" or by "sponsorships." Television broadcasters, on the other hand, sell advertisements based on "linear avails," before, during, and after a show typically known as commercial breaks. As broadband becomes more ubiquitous, the Internet (or any other "digital" bi-directional communication and distribution method such as multicasting) will require different advertisement management and sales techniques to meet the needs of integrated "live," "as live" (time shifted) or "on-demand" programming.

Therefore, what is needed is an advertisement sales and management system and method that are adapted to overcome these problems.

SUMMARY OF THE INVENTION

A method, system and computer program product are provided to enable the automation and control of the functions necessary to manage advertisement sales, content management, and administrative processes for media production environments, including, but not limited to, broadcast television, radio and webcasting stations, newspapers, and Internet or wireless broadband properties. In an embodiment of the present invention, an advertisement management and automation system is operable to manage functions related to sales, traffic, accounting, reporting, or the like.

In an embodiment, the advertisement management and automation system includes a sales module, a traffic module, an accounting module, a reports module, and manager module. The sales module enables an authorized user to create an advertisement campaign. The traffic module enables the review and approval of an advertisement campaign, the creation of lineup schedules for live shows, and the serial insertion of advertisements within a media stream comprising of both "linear" and "non-linear" advertising. The accounting module enables the development and maintenance of pricing for advertisements and report polling for advertisement campaigns. The reports module monitors the sell and distribution of the advertisements, and collects statistics to generate reports by account or sales person in addition to reports that actual content, demographic, and advertising performance measurements. The manager module controls access to the system records, and implements the system policies and rules to maintain system and data security and integrity.

The advertisement management and automation system operates on a PC-based platform and is networked for communications with local area networks, wide area networks, and the Internet, including both wired and wireless appliances.

In an embodiment of the present invention, a widely distributed network of two or more advertisement management and automation systems are integrated to manage and automate multi-tiered advertising across a plurality of local, regional, and/or national markets, including international opportunities. As such, a national advertisement management and automation system serves as a master system, and a plurality of affiliate advertisement management and automation systems are the slave systems. Thus, distribution and tracking is enabled for both local and national advertisement and content management, whereby data, advertisements, content, and reports are pushed and pulled from individual nodes (e.g., affiliate television stations) to a central network hub or point that feeds and/or gathers data and communicates with the individual nodes.

In an embodiment, traditional broadcast methods for over-the-air, DBS, terrestrial cable, wireless, and live Internet webcasting are combined with on-demand Internet and wireless appliances for monetizing and streamlining the sales, management, accounting, reporting, and traffic processes for single and multi-distribution content production environments.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally similar elements. Additionally, generally, the leftmost digit(s) of a reference number identifies the drawing in which the reference number first appears.

FIG. 9 illustrates a sales GUI according to another embodiment of the present invention.

FIG. 11 illustrates a sales GUI according to another embodiment of the present invention.

FIG. 12 illustrates a sales GUI according to another embodiment of the present invention.

FIG. 19 illustrates an accounting GUI according to another embodiment of the present invention.

FIG. 20 illustrates a client display GUI according to an embodiment of the present invention.

FIG. 21 illustrates a reports GUI according to an embodiment of the present invention.

FIG. 24 illustrates a reports GUI according to another embodiment of the present invention.

FIG. 26 illustrates a reports GUI according to another embodiment of the present invention.

Figure 27B:
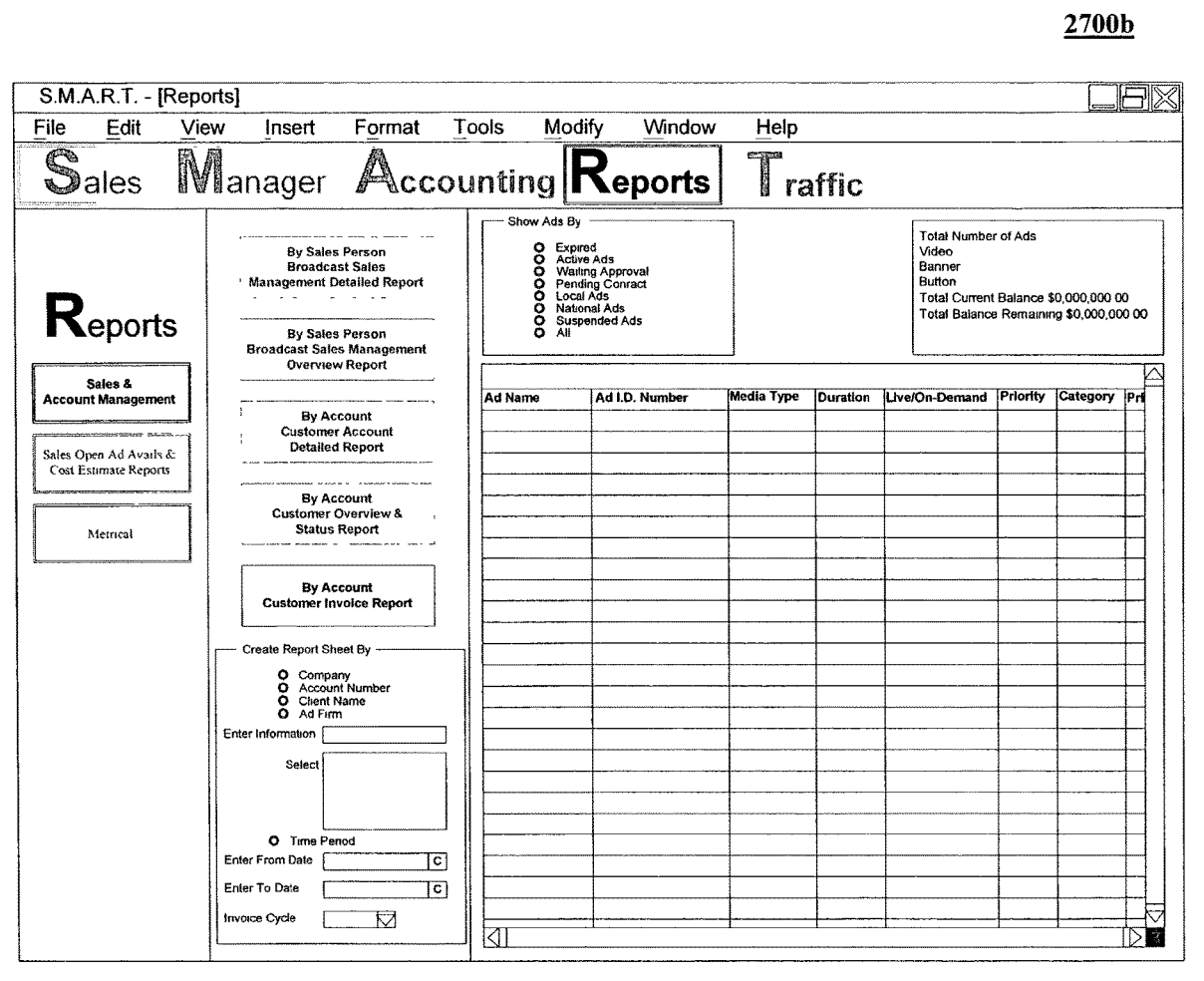

FIGS. 27a-27b illustrate reports GUIs according to another embodiment of the present invention.

FIG. 28 illustrates a reports GUI according to another embodiment of the present invention.

FIG. 29 illustrates a reports GUI according to another embodiment of the present invention.

FIG. 30 illustrates a reports GUI according to another embodiment of the present invention.

FIG. 31 illustrates a reports GUI according to another embodiment of the present invention.

FIG. 32 illustrates a reports GUI according to another embodiment of the present invention.

FIG. 33 illustrates a reports GUI according to another embodiment of the present invention.

FIG. 34 illustrates a reports GUI according to another embodiment of the present invention.

FIG. 35 illustrates a reports GUI according to another embodiment of the present invention.

FIG. 36 illustrates a reports GUI according to another embodiment of the present invention.

DETAILED DESCRIPTION OF THE INVENTION

Table of Contents

Figure 1:
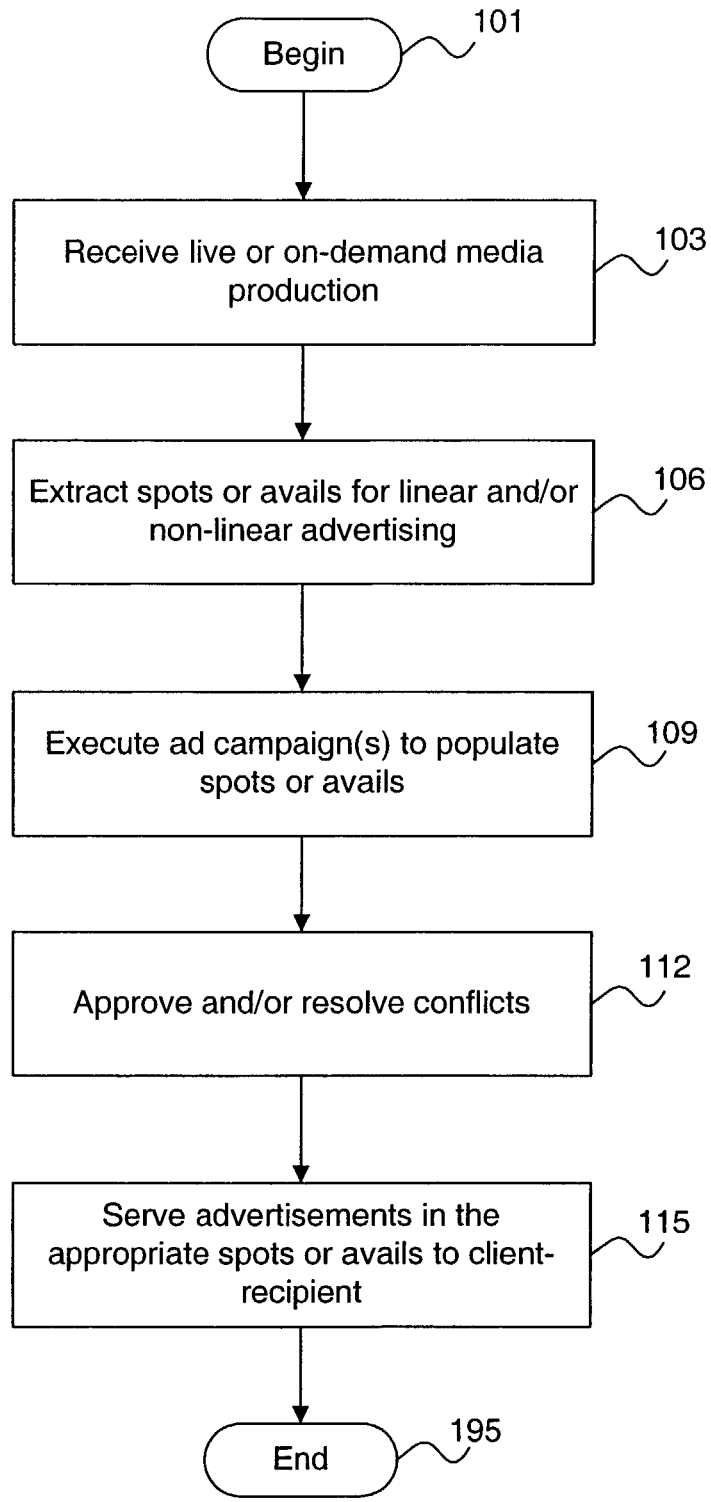
FIG. 1 illustrates an operational flow diagram for executing an advertisement campaign according to an embodiment of the present invention.

I. Introduction
II. Distributing Advertisements in a Media Production
III. System Overview of an Advertisement Network
IV. System Overview of a Distributed Advertisement Network
V. Sales Module
VI. Traffic Module
VII. Exemplary Implementation of Sales and Trafficking
VIII. Accounting Module
IX. Reports Module
X. Manager Module
XI. Exemplary System Implementation
XII. Conclusion I. Introduction The present invention enables advertisements, in various formats, to be automatically linked and integrated with a media production. In embodiments of the present invention, "live," "as-live," "live-to-tape," or "on-demand" media productions are encoded and transmitted over a computer network, such as the global Internet, a local intranet, private virtual networks, or any other computer or communication network, medium, and/or mode. In other embodiments, the media productions are distributed to one or more recipients over a traditional broadcast medium (including, over-the-air, digital broadcast satellite (DBS), terrestrial cable, etc.). As such, the present invention supports distributions to a recipient's television, enhanced digital television, monitor or other display, as well as over wired and/or wireless communication or computer networks (e.g., the World Wide Web) onto a personal computer (PC), personal digital assistant (PDA), telephone, or other display or data processing or communication device.

As used herein, the term "media production" includes the production of any and all forms of media or multimedia in accordance with the method, system, and computer program product embodiments of the present invention. A media production includes, but is not limited to, news programs, television programming (such as, documentaries, situation comedies, dramas, variety shows, interviews, or the like), sporting events, concerts, infomercials, movies, video rentals, government content, public service content, corporate content, educational content, retail sales content, community content, or any other content. For example, and without limitation, media productions can include streaming video related to corporate communications and training, educational distance learning, or home shopping video-based "e" or "t"-commerce. Media productions also include live or recorded audio (including radio broadcast), video, graphics, animation, computer generated, text, and other forms of media and multimedia. Media productions also include combinations of the foregoing.

Additionally, the term "enhanced media" refers to a media production that has been supplemented according to the present invention to enhance the value, enjoyment, and/or substance of the media production. In an embodiment, enhanced media is produced by associating auxiliary information, such as graphics, extended play segments, opinion research data, universal resource locators (URLs), advertisements, computer programs, Java or similar code, spreadsheets, audio in any format, video in any format, multimedia, or other auxiliary information deemed desirable. During the encoding process, auxiliary information is associated with stories or story elements within the media production, such that the auxiliary information is presented with the media production when it is streamed, downloaded, or otherwise transferred, transmitted, or provided to a display device. An exemplary media production and enhanced media production system is described in the copending application entitled "Method, System and Computer Program Product for Producing and Distributing Enhanced Media Downstreams" (U.S. application Ser. No. 09/836,239), which is incorporated herein by reference as though set forth in its entirety. Another exemplary system is described in the copending application entitled "Method, System and Computer Program Product for Producing and Distributing Enhanced Media" (U.S. application Ser. No. 10/208,810), which is incorporated herein by reference as though set forth in its entirety.

A "live" media production is produced and distributed in real time to a destination. The term "as-live" refers to a time-shifted distribution of a live media production. An as-live production can be stored at a server or client display for the delayed presentation to the user. The term "live-to-tape" refers to a live media production that has been stored to any type of record playback device (RPD), including a video tape recorder/player (VTR), video recorder/server, virtual recorder (VR), digital audio tape (DAT) recorder, or any mechanism that stores, records, generates, or plays back via magnetic, optical, electronic, or any other storage media. It should be understood that "live-to-tape" represents only one embodiment of the present invention. The present invention is equally applicable to any other type of production that uses or does not use live talent (such as cartoons, computer-generated characters, animation, etc.). Accordingly, reference herein to "live," "as-live," or "live-to-tape" is made for illustrative purposes, and is not limiting. Also, these terms are used interchangeably herein.

In an "on-demand" embodiment, a news program or other type of program (as noted above) is recorded at a hosting facility (e.g., television station, radio station, newspaper, webcasting station, private homepage or web site, or other media "hosting" environment(s)), segmented, categorized, and indexed for retrieval and viewing. These operations can be performed automatically using the PVTV Production Automation System™ (previously referred to in the applications cited above as the CameraManSTUDIO™ automation system) available from ParkerVision, Inc. of Jacksonville, Fla., although it is not necessary to use this system. Alternatively, these operations (or subsets thereof) can be performed manually.

In a "live or as-live broadcast" embodiment of the present invention, a media production is broadcast over traditional airwaves or other mediums (e.g., cable, satellite, etc.) to a television set. At the same time (or substantially the same time), the production is enhanced and encoded for distribution over a computer/communication network. The traditional and network distribution modes/methods are synchronized and transmitted substantially at the same time. Alternatively, they can be distributed at different times. The distribution can be live or repurposed from previously stored media. In an embodiment, the media production is distributed only via a traditional medium. In another embodiment, the media production is distributed only over a computer network. In another embodiment, they are distributed multiple times, in a synchronized and/or unsynchronized manner. In an embodiment, the computer network includes the Internet, and the enhanced media is formatted in hypertext markup language (HTML) for distribution over the World Wide Web. The network transmission or web cast is delivered to a display device within an approximate twenty-second delay from the live broadcast. However, the present invention is not limited to the Internet, and the transmission latency will vary based on a number of factors, such as geographies, equipment used, system loading, etc.

As such, the method, system, and computer program product of the present invention enable an individual to view real-time or customized media productions. Additionally, the present invention enables a hosting facility to automatically link advertisements or other types of messages to a specific media production or show (or a specific show element/story) by time, duration, and/or topic, or any other desired criteria. Advertisements include video or audio commercials; dynamic or static banners; sponsorship advertisements; public service messages; community messages; government messages; pre-roll advertisements; active or passive advertisements; skyscrapers; email correspondence; or like forms of media and multimedia promotions. It is noted that the term "advertisement" as used herein includes any type of message and content.

Video or audio commercials can be integrated into a media stream such that the commercial feed can be presented to the user while the user views the media production. For example, the commercial feed can be presented after one or more news stories, at the beginning of the media production, at the end, between scenes within a video production, or at any other place designated by the video director.

The advertisements also include banners. A banner includes any combination of text, graphics and other forms of media and multimedia that promotes a good or service, or otherwise provides information or an announcement. The banner can be strictly descriptive, or include hypertext, a hot spot, or a hyperlink to open additional banners, place an order, or send a request for additional information to the server of the hosting facility or another server. The banner can include a hyperlink to any pre-defined destination. The banner can be a static banner that only displays the promotional advertisement. However, the banner can also be an active banner that blinks, spins, fades, and the like. The banner can also be a scrolling banner that includes a scroll bar that allows the user to move through contents of the banner. Resizable banners can also be used to allow the user to expand or enlarge the banner to receive more data. The aforementioned is a representative list of banners that can be used with the present invention, it should be understood that any other type of banner capable of promoting a product or conveying a message or content, including, but not limited to, banners developed with Macromedia® Flash™ or Macromedia® Shockwave®, or the like, as would be apparent to one skilled in the relevant art(s), could be easily included and would not change the scope of the invention.

The advertisements can also be active or passive. An active advertisement requires or permits interaction from the user, such as clicking-through, scrolling and the like. Passive advertisements are displayed and require no interaction from the user. Additionally, the advertisements can take the form of pre-roll advertisements. Such advertisements are commercials, banners, or the like that are transmitted to the display device prior to the startup of the media production.

As such, the present invention supports all types of advertisements that can be transmitted over a client-server network to a display device. As a video show is being transmitted, the advertisements are streamed at specified intervals and durations with the video show. In an embodiment, the advertisements are presented on the side panels of the same frame or window in which the video show is displayed. In another embodiment, the advertisements are streamed in separate frames. In another embodiment, the advertisements are streamed prior to the display of the related segment video. The advertisements can also include a hyperlink to a web site for the sponsor of the advertisement. Embodiments of the invention include any combination of the above.

In an embodiment, metadata associated with an advertisement includes a copyright field that specifies any restrictions placed on the use or re-use of an advertisement. For example, a hosting facility may not have a license to transmit a specific content on the Internet, but may have permission to provide the content over a private network or the airwaves, or vice versa. The advertisement can be restricted for educational uses, single broadcast, transmissions to designated clients, or the like.

II. Distributing Advertisements in a Media Production

The present invention enables advertisements, in various formats, to be linked and integrated with a media production. Several methodologies and/or techniques are available for selecting and integrating the advertisements into the media production. The advertisements can be embedded directly into the media production as an introductory piece, at a break within the media production, and/or at the end of the media production. The parallel distribution of the advertisements can be implemented by presenting the advertisement in another window, frame, or region. Selection of the advertisements can be based on a particular show, context, or demographic preference.

Referring to FIG. 1, flowchart 100 represents the general operational flow of an embodiment of the present invention. More specifically, flowchart 100 shows an example of a control flow for managing and automating the distribution of advertisements according to the present invention.

The control flow of flowchart 100 begins at step 101 and passes immediately to step 103. At step 103, a media production is received from a production source, such as, but not limited to, the system described in U.S. application Ser. No. 09/836,239. The present invention is also configurable to receive a media production from other sources. The media production can be a live or as-live show that has been encoded for transport over, for example, a TCP/IP protocol, digital broadcast satellite, terrestrial cable, or the like. The media production can also be on-demand selections of all or a portion of an archived media production. In essence, the media production can be of any type and from any source. In embodiments, the on-demand media production is encoded and enhanced to designate categories and include URLs for auxiliary information, as described above. Segments of a live show can also be categorized.

At step 106, spots or avails are extracted or determined for integrating linear and/or non-linear advertising into the encoded media production. Linear advertisements are located before, during (i.e., commercial breaks), and after a media production. Linear advertisements include audio and/or video commercials, public service announcements, and other contents, as described above, that are served in series with the media production. Non-linear advertisements are simultaneously displayed during the presentation of media production. Non-linear advertisements include banners, buttons, audio/video content, and the like that are located in a separate region, frame, or window than the media production. Non-linear advertisements support a combination of serial and parallel servicing. In other words, non-linear advertisements are served in parallel with the media production, but in series with other non-linear advertisements (as described below with respect to FIG. 17).

Once the spots or avails have been extracted, an availabilities list (as the listing shown in new Ad editor 806 described below with reference to FIGS. 8-11) is prepared. The availabilities list identifies spots which are available for insertion of advertisements. For live media productions, a lineup schedule (such as, the lineup schedule described below with reference to FIG. 16) is produced from the availabilities list to identify breaks for linear advertising. In embodiments, the lineup schedule can also include openings for nonlinear advertisements.

For on-demand media productions, the availability list identifies openings for linear and non-linear advertisements. As described in greater detail below, the availability list also enables searching for context-sensitive spots or avails based on categories, demographics, duration, price, and/or the like.

At step 109, the availabilities list is populated with advertisements. In an embodiment, the present invention permits the selection of existing (i.e., previously sold) advertisements. As such, an existing advertisement campaign is executed to select the appropriate advertisements. In an embodiment, selection is based on a priority scheme involving exclusive, targeted, and non-targeted advertisements.

In other words, advertisements can be categorized in three categories: exclusive advertisements, targeted advertisements, and non-targeted advertisements. Exclusive advertisements are served with a specified topic or category. Exclusive advertisements are primarily, but not exclusively, served with on-demand media productions, and are linked to a media production by a topic or category that has been established for the media production. Exclusive advertisements are not rotated among other advertisements. As such, exclusive advertisements are sold at a premium price, and the exclusive banner, button, video, or the like is displayed with the specified topic or category throughout the duration of the linked media production or a segment thereof.

Targeted advertisements are also served with a specified topic or category. However, unlike exclusive advertisements, targeted advertisements are rotated among other targeted advertisements. In an embodiment, banner or button advertisements are rotated in and out on a ten-second interval, although intervals of other durations are contemplated by the invention. With respect to video or audio-streaming advertisements, such advertisements are rotated with other targeted streaming advertisements. Targeted advertisements are also sold at a premium price, but at a lower price than exclusive advertisements.

Non-targeted advertisements are served without regard to a specified topic or category, and are therefore sold at a lower price than targeted advertisements. Additionally, non-targeted advertisements are rotated among other non-target advertisements.

Accordingly, when executing an advertisement campaign according to embodiments of the present invention, selection is based on a priority scheme in which exclusive advertisements are selected prior to targeted advertisements. If no exclusive advertisements are available, targeted advertisements are served. In the event that no exclusive advertisements or targeted advertisements are available, the present invention serves non-targeted advertisements.

In another embodiment, the present invention allows advertisements to be sold in real time or near term to populate the lineup schedule or availability list. If all spots or avails remain unsold at airtime, the priority scheme, discussed above, is executed. In embodiments, a commercial insertion application (CIA) inserts non-targeted advertisements in open spots or avails for live media productions.

At step 112, a system operator or user is enabled to inspect and/or approve the selected advertisements prior to air or distribution. In embodiments, the operator previews the advertisements to check for errors, verify availability and operation, or the like. In embodiments, the operator inspects the advertisement media for suitability with the content of the media production and/or compliance with ethical policies and standards. For example, this inspection or resolver mode can be implemented to prevent an airline promotion from airing with a news story about an airplane crash.

At step 115, the advertisements are served in the appropriate and approved spots or avails to the client-recipient of the encoded live, as-live, or on-demand media production. In embodiments, the advertisements are served to a specific media player that is operable or customized for the media production. The present invention, in embodiments, enables the media player (such as, client display 2000 described below with reference to FIG. 20) to be modified to alter its branding. As such, the logo displayed on the media player can be changed according to embodiments of the present invention, as described below with reference to FIG. 40.

In embodiments, the advertisements linked with the media production are distributed to other applications and vertical markets. Other applications include broadcast television, Internet broadband, digital broadcasting to digital televisions and/or set-top boxes, multicasting split digital bandwidth to multiple channels, wireless applications, and/or the like. The present invention enables each application to manage and automate the distribution of advertisements to a plurality of vertical markets. For example, the application pertaining to "multicasting split digital bandwidth to multiple channels" allows a traditional broadcast to be transmitted to an interactive or enhanced digital television that permits user requests to be sent to the host facilities over the Internet or terrestrial cable. The present invention enables the "split bandwidth" for each channel to be used to target a plurality of vertical markets (such as, twenty-four hour local news, twenty-four hour local sports, education programming, shopping channel, and/or the like).

In embodiments, the present invention collects impressions and demographics from the client-recipient for future advertisement sales and servicing. This data collection and reporting functionality is described in greater detail below.

After the advertisements have been distributed to the client-recipient, other applications, or vertical markets, the control flow ends as indicated at step 195.

III. System Overview of an Advertisement Network

Figure 2:
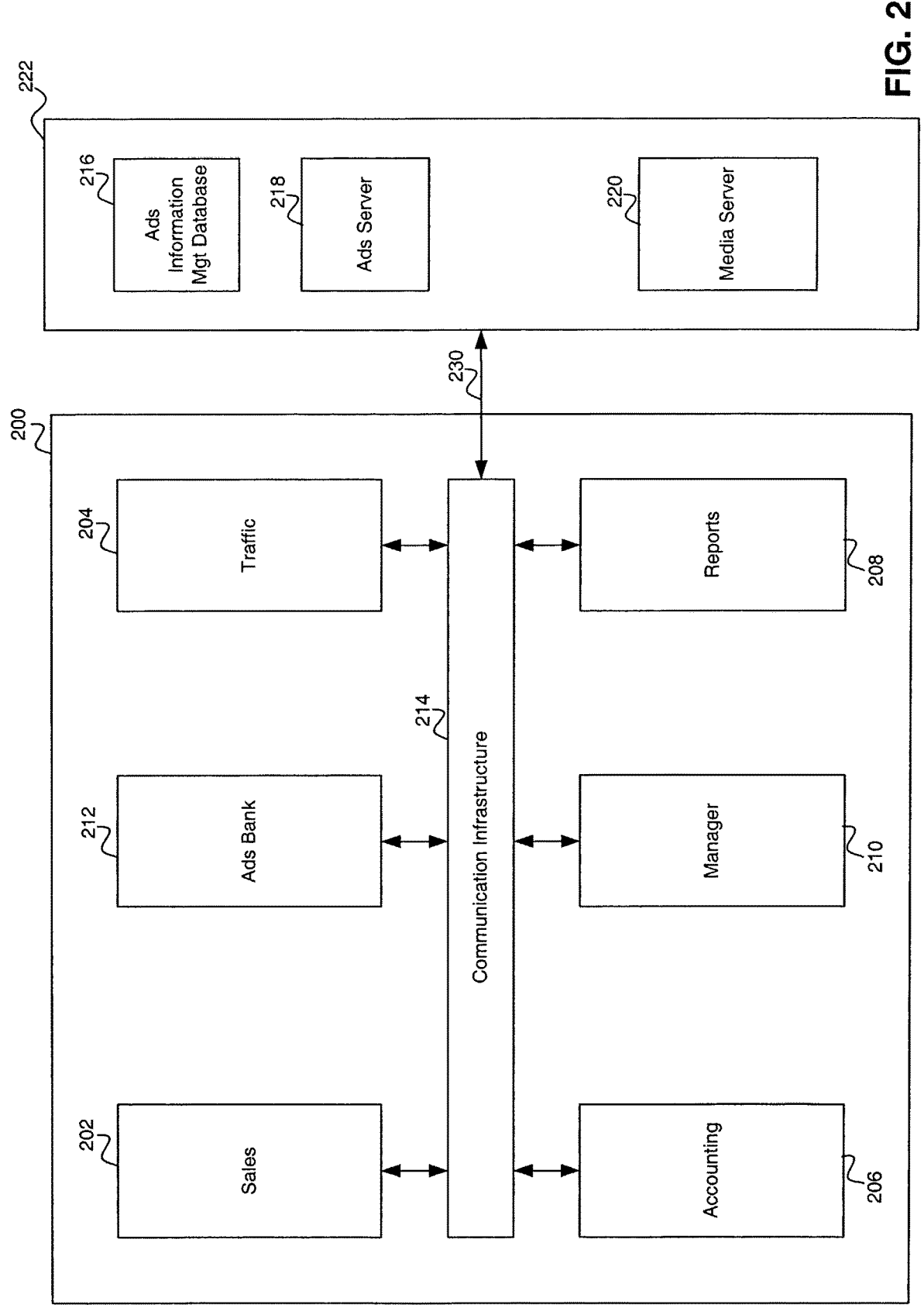
FIG. 2 illustrates an advertisement management system according to an embodiment of the present invention.

FIG. 2 illustrates an advertisement management and automation system 200 according to an embodiment of the present invention. System 200 manages the distribution of advertisements and advertisement data related to sales, traffic, accounting, reporting, or the like. In an embodiment, system 200 is a component of the S.M.A.R.T.™ advertisement management program application developed by ParkerVision, Inc. (Jacksonville, Fla.).

System 200 includes a sales module 202, a traffic module 204, an accounting module 206, a reports module 208, a manager module 210, an advertisements bank 212, and a communication infrastructure 214. Communication infrastructure 214 is a communication medium of any type, such as a wired and/or wireless medium (e.g., a communications bus, crossover bar, or network), that enables each system component to communicate with each other and with external devices or applications, such as media production sources of the hosting facilitates described above as including, but not being limited to, a television station, radio station, newspaper, webcasting station, private homepage or web site, or other media "hosting" environment(s).

Communications infrastructure 214 also enables system 200 to query and/or publish to advertisement information management (AIM) database 216, advertisements server 218, and media server 220. AIM database 216, advertisements server 218, and media server 220 are collectively referred to herein as host server 222. The components of host server 222 can reside at the same location as system 200, or one or more components of host server 222 can reside at other locations. Communication infrastructure 230 enables communications between host server 222 and system 200. Communication infrastructure 230 supports wired, wireless, or both transmission media, including satellite, terrestrial (e.g., fiber optic, copper, twisted pair, coaxial, hybrid fiber-coaxial (HFC), or the like), radio, microwave, free space optics (FSO), and/or any other form or method of transmission. In an embodiment, communication infrastructure 230 is an extension of communication infrastructure 214.

Sales module 202 accesses an availabilities list that identifies unused or unallocated spots or avails for linear and/or non-linear advertisements. As discussed, the present invention supports both live and on-demand media productions. For live media productions, traffic module 204 provides a lineup schedule that identifies breaks or spots in the productions for selling advertisements. For on-demand media productions, sales module 202 queries AIM database 216 that enables the selling of exclusive, targeted, and non-targeted advertisements, as described in greater detail below. Accordingly, sales module 202 enables an advertisement sponsor or promoter to purchase one or more spots or avails, and thereby create one or more advertisement campaign(s). In embodiments, distribution of advertisements using the media priority scheme described herein are also used for live broadcasts in the same manner described herein for on-demand operation.

Sales module 202 interacts with accounting module 206 for pricing data. Accounting module 206 establishes and maintains the pricing structure for the advertisements. As described in greater detail below, the present invention enables various pricing models to be implemented based on media priority, media type, impressions, or the like.

Once the spots or avails have been sold, traffic module 204 associates the sold spots or avails with the actual advertisement media. The advertisement media are temporarily stored in advertisement bank 212, or can be retrieved from a computer network, such as the Internet, a private virtual network, or the like. Traffic module 204 permits a system operator to preview and/or approve the sold and associated advertisement media, and/or check or resolve the content for conflicts. During this approval and/or resolver stage, traffic module 204 interacts with advertisement bank 212 to check the availability of the advertisements or pull the advertisements for service. Approved advertisement media are published to advertisements server 218, and the associated advertisement metadata is stored at AIM database 216. Subsequently, advertisements server 218 and media server 220 interact to integrate the advertisement media with the encoded media production located at media server 220. The integrated stream is distributed to one or more client-recipients.

Reports module 208 monitors the sell and distribution of the advertisements, and also collects statistics about the client-recipient. Manager module 210 oversees and manages the operations of the other components of system 200. As such, manager module 210 implements and enables modification to system policies and rules. In addition, manager module 210 maintains system and data integrity and controls user access to various features, functions, and data.

As discussed, AIM database 216 stores and tracks various information related to the advertisements managed by the present invention. In an embodiment, AIM database 216 is one or more integrated databases or a data warehouse system that stores information used to support the components and functions described herein. In an embodiment, AIM database 216 includes a relational or object oriented (OO)/component based database management system (not shown), or the like, that controls the storing, retrieving and updating of data and metadata in the database records. The database management system also controls data integration, enforces integrity rules and constraints (including data integrity and referential integrity), and enforces security constraints. AIM database 216 is a scalable system that stores data on multiple disk arrays. Data warehousing can be implemented with the SQL Server 2000 application available from Microsoft Corporation, the Oracle 9i™ database available from Oracle Corporation (Redwood City, Calif.), or the like. AIM database 216 supports Open DataBase Connectivity (ODBC) or Java DataBase Connectivity (JDBC) protocols.

IV. System Overview of a Distributed Advertisement Network

In embodiments of the present invention, media productions can be sponsored at multiple geographic levels. Specifically, local or regional sponsors purchase advertisements to be promoted within a local geographical region. Conversely, national sponsors purchase advertisements to be promoted across several local geographical regions. National sponsorship, as used herein, is intended to include national as well as international promotions. Thus, a media production can be integrated with local advertisements, national advertisements, or a combination of both. Moreover, the distribution of multi-tiered advertisements (i.e., local and national sponsorship) can be managed and automated by embodiments of the present invention.

In an embodiment of the present invention, a widely distributed network of two or more advertisement management and automation systems 200 are integrated to manage and automate multi-tiered advertising across a plurality of local, regional, and/or national markets. As such, one system 200 serves as the master node and the other system(s) 200 serve as the slave node(s).

Figure 4:
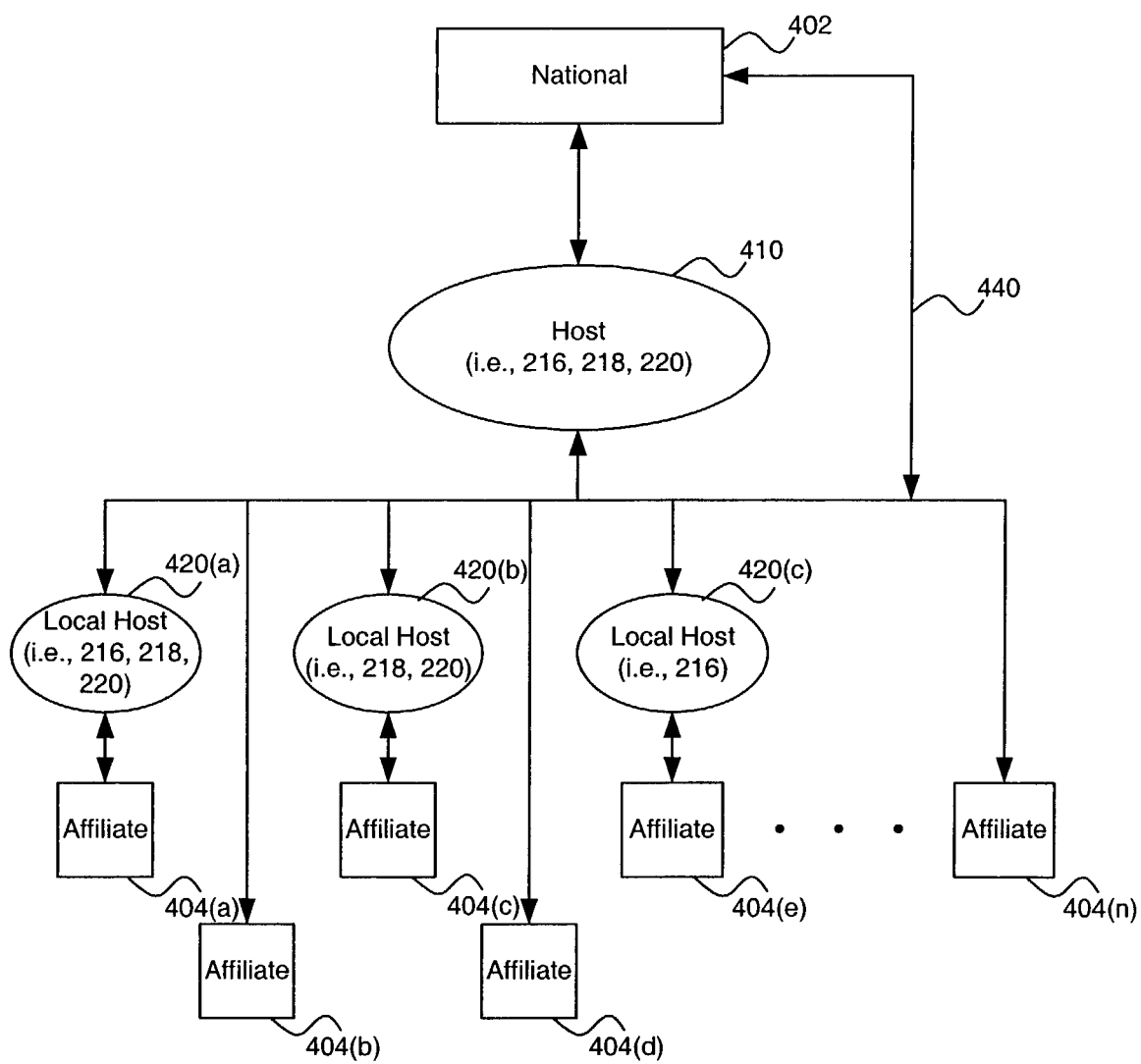
FIG. 4 illustrates a distributed network of advertisement management systems according to an embodiment of the present invention.

FIG. 4 illustrates an embodiment of a distributed advertisement network 400 that comprises a plurality of advertisement management and automation systems 200. National advertising system 402 is the master system 200, and affiliate advertising systems 404(a)-404(n) are the slave systems 200. Central host server 410 resides at the facility for a national internet service provider (ISP), such as AOL, AT&T, Starpower, Verizon, or the like. In an embodiment, central host server 410 resides at the facility for a national information service provider that offers information content, such as news, entertainment, travel, history, art, business, education, science, health, recreation, careers, and/or the like. An information service provider primarily hosts a national portal operating over the Internet, such as AOL, MSN, Yahoo, Alta Vista, Excite, and the like. An information service provider also includes web sites operated by major networks (such as, CNN, MSNBC), local broadcasting networks, private/personal web sites or homepages, and the like.

In an embodiment, central host server 410 includes an AIM database 216 for tracking availabilities, impressions, demographics, and other advertisement related data as described herein. Central host server 410 also includes an advertisement database 218 for storing national advertisement media for national advertisement campaigns. Additionally, central host server 410 includes a media database 220 for encoding and transmitting media productions with linear advertising.

Local host servers 420(a)-420(c) are located within the local geographical areas of a corresponding affiliate advertising system 404(a)-404(n). As shown, an affiliate advertising system 404(a)-404(n) does not necessarily communicate with a corresponding local host server 420(a)-420(c). Affiliate advertising systems 404(b) and 404(d), for example, communicate directly with central host server 410. In an embodiment, affiliate advertising system 404(b) and 404(d) communicate directly with national advertising system 402) over communication infrastructure 440.

Local host servers 420(a)-420(c) also include at least one of AIM database 216, advertisements database 218, and media database 220, which are configured to support advertisement management in the respective local region. As shown, local host server 420(a) comprises all three servers. Local host server 420(b) comprise advertisements server 218 and media database 220. Local host server 420(c) comprise a local AIM database 216. Although only three affiliate advertising systems 404(a)-404(n) are shown with a corresponding local host server 420(a)-420(c), other affiliate advertising systems 404(a)-404(n) can include a local host server 420(*a*)-420(*c*). Moreover, in embodiments, each local host server 420(*a*)-420(*c*) can include any combination of AIM database 216, advertisements database 218, and media database 220, or none at all.

Each affiliate advertising system 404(*a*)-404(*n*) includes components of system 200 that enables the sale and distribution of advertising in its respective local or regional market. In other words, local advertisements are sold and managed by each affiliate advertising system 420(*a*)-420(*n*).

Accordingly, some affiliate advertising systems 404(*a*)-404(*n*) queries and writes to the central AIM database 216 at central host server 410, which provides centralized storage and management of advertisement information related to the entire distributed network. Other affiliate advertising systems 404(*a*)-404(*n*) queries and writes to a local AIM database 216 at a corresponding local host server 420(*a*)-420(*c*).

Additionally, some affiliate advertising systems 404(*a*)-404(*n*) interact with the central advertisements server 218 and media server 220 at central host server 410 for integrating and serving enhanced media productions to client-recipients, as described herein. Other affiliate advertising systems 404(*a*)-404(*n*) interact with a local advertisements server 218 and media server 220 at a corresponding local host server 420(*a*)-420(*c*).

In an embodiment, central host server 410 periodically polls, updates, and/or synchronizes the local host servers 420(*a*)-420(*c*) with the central records. In another embodiment, national advertising system 402 communicates directly with local host servers 420(*a*)-420(*c*) over communication infrastructure 440 for periodic polls, updates, and/or synchronization. The periodic communications enable national advertisement server to collect, verify, and modify information related to advertisement sales, reporting, accounting, trafficking, user authorization, and/or the like, as described herein, at a national level.

According to embodiments of the present invention, national advertising system 402 provides national advertisements that can be selected and/or sold to the local markets managed by each affiliate advertising system 404(*a*)-404(*n*). In an embodiment, national advertising system 402 sends File Transfer Protocol (FTP) advertisement files to all local host servers 420(*a*)-420(*bc*) (e.g., advertisements server 218). In another embodiment, national advertisements are stored in at central host server 410 (e.g., advertisements server 218). As such, the local host servers 420(*a*)-420(*c*) or affiliate advertisement systems 404(*a*)-404(*n*) makes on-demand requests to central host server 410 for national advertisements.

In an embodiment, national advertisements (from national advertising system 402 or central host 410) are served in open advertising spots by the traffic modules 204 of affiliate advertising system 404(*a*)-404(*n*). Open advertising spots are defined by locations or time slots which are not sold locally by show, show segment, topic, or the like. Affiliate advertising systems 404(*a*)-404(*n*) execute a media priority scheme, described in greater detail below, that enables local exclusive and target advertisements to be served prior to national exclusive and targeted advertisements. National exclusive and targeted advertisements are served before local non-targeted advertisements. Local non-targeted advertisements are likewise served prior to national non-targeted advertisements, or can be configured to be shared by rotating between local and national non-targeting advertisements.

Other exemplary systems for managing and selling local and national advertisements in a widely distributing network are described in the copending application entitled "Method, System and Computer Program Product for Producing and Distributing Enhanced Media Downstreams" (U.S. application Ser. No. 09/836,239), which is incorporated herein by reference as though set forth in its entirety V. Sales Module Sales module 202 enables a system operator (e.g., a sales representative) to open and/or edit a customer account and the customer's advertisement campaign(s). In other words, sales module 202 determines and/or receives a listing of open (unused) advertising spots or avails, and allows a system operator to enter advertising orders to create an advertisement campaign for the customer (e.g., a sponsor or promoter). In creating the advertisement campaign, sales module 202 enables specification of a desired show selection (including by time), category selection (e.g., new story, weather, sports, or the like), media rotation schedule (e.g., broadcast, or on demand), media priority (e.g., exclusive, targeted, or non-targeted), duration selection (e.g., no expiration, one day, one week, etc.), quantity or hit limits (e.g., no limit, or 1000, 2000, 5000, or 10,000 hits or downloads, etc.), or the like.

Figure 3A:
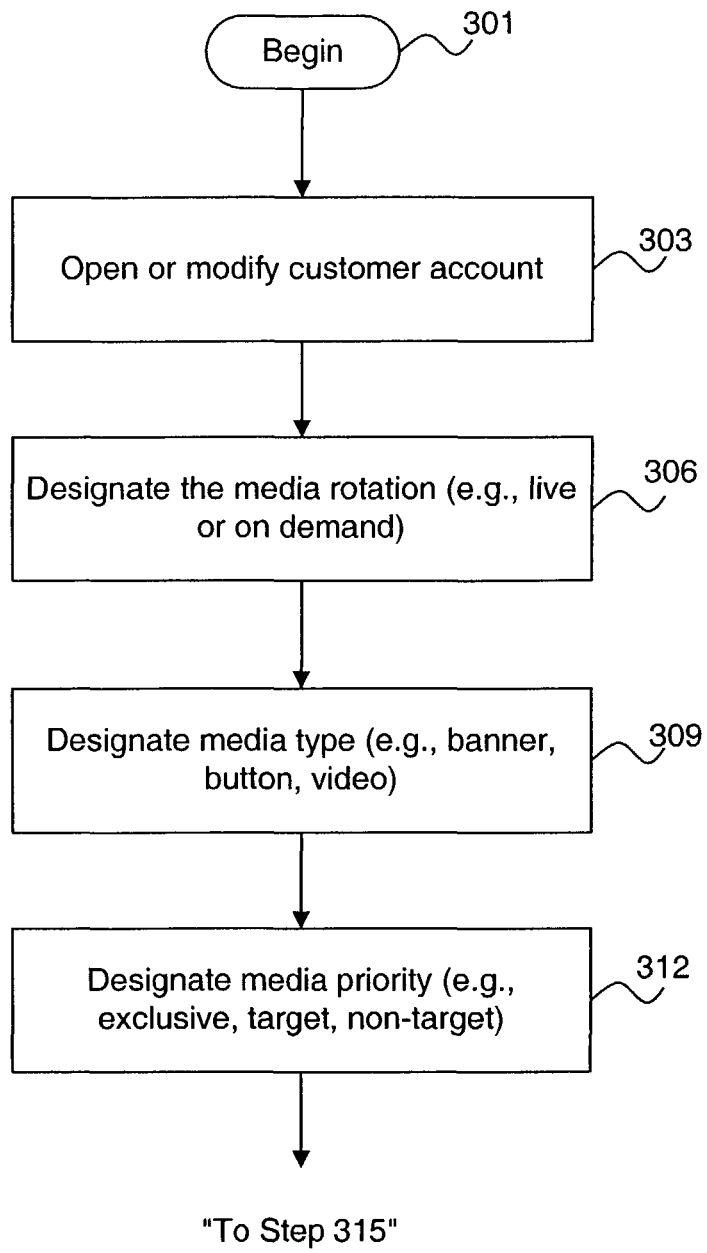
FIGS. 3a-3b illustrate an operational flow diagram for producing an advertisement campaign according to another embodiment of the present invention.
Figure 3B:
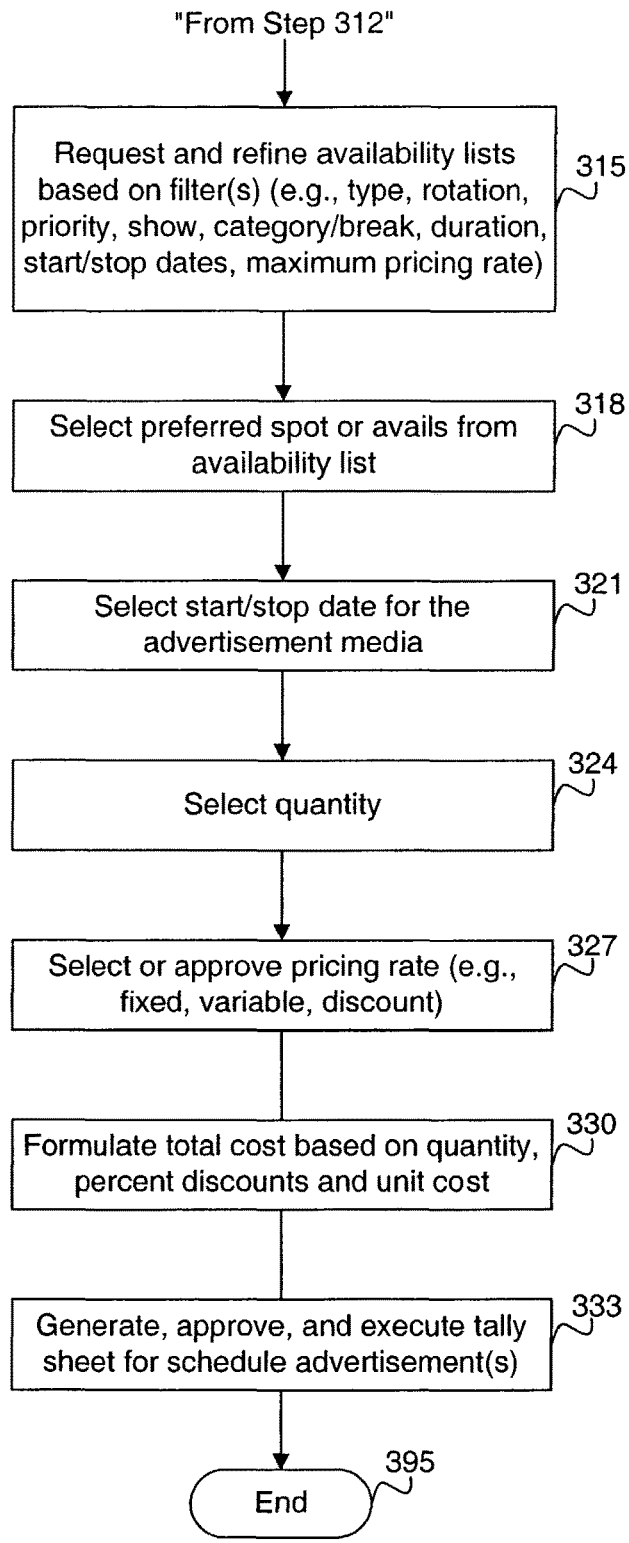

Referring to FIGS. 3*a*-3*b*, flowcharts 300*a*-300*b* represent the general operational flow of an embodiment of the present invention. More specifically, flowcharts 300*a*-300*b* show an example of a control flow for creating an advertisement campaign by selling spots or avails according to the present invention.

The control flow of flowchart 300*a*-300*b* begins at step 301 and passes immediately to step 303. At step 303, a sales representative, account representative, or the like opens or modifies a customer account for an advertisement campaign. As such, the sales representative enters or edits customer information in the customer account. The customer information includes agency name, agency address, agency telephone, agency web address, agency contact person, company name, company address, company telephone, company web address, company contact person, account source (e.g., local, regional, or national), account representative, account contact person, account number, contact information (e.g., contact position, address, telephone number, facsimile number, email address, etc.), and/or the like.

At step 306, the sales representative determines whether the customer prefers to purchase advertisement for a live or on-demand spot or avail. This is accomplished by designating the media rotation (i.e., live or on demand).

At step 309, the sales representative designates the media type (e.g., banner, button, or video) of the advertisement media that the customer desires and/or intends to rotate.

At step 312, the sales representative designates the media priority to identify whether the customer desires exclusive, targeted, and/or non-targeted advertising.

At step 315, based on the customer's desires/specifications, sales module 202 requests, receives, or generates an availabilities list of spots or avails from AIM database 216. Depending on the customer's specifications, the availabilities list can be filtered by various criteria, such as media type, media rotation, show, category or break location, duration, start/stop dates, maximum pricing constraints, and/or the like. If the media rotation is set to live, AIM database 216 returns a lineup schedule presenting the dates, shows, and breaks (opportunities) for advertising. As described below, the lineup schedule is a template established and maintained by traffic module 204. If the media rotation is set to on-demand, AIM database 216 returns an availabilities list showing dates, shows, categories, or the like. As such, the present invention enables advertisements to be sold based on the context of the linked on-demand media production. In some embodiments, this is also the case for live productions.

At step 318, the desired spots or avails, from the availabilities list, are selected and marked to be served with the customer's advertisement media. In an embodiment, a first, second, and third preference (or any other number of preferences) can be selected. The sales representative is also able to update the customer information to describe the advertisement, such as, by designating an advertisement name.

At step 321, the start/stop dates for running the advertisement are entered. At step 324, a quantity is designated to stipulate a maximum number of downloads or distributions of the advertisement. At step 327, the desired pricing rate for running the advertisement is selected. Sales module 202 supports various pricing models and enables a customer to select a fixed or variable pricing rate based on various factors, including show selection, category, media type, media priority, quantity downloaded, duration, etc. As described in greater detail below, the pricing structure is set and maintained by accounting module 206. Discounts can also be selected for certain customers as approved by the accounting module 206. If non-targeted advertisements are being sold, the pricing rate is typically a fixed rate. Referring back to FIG. 4, in an embodiment, minimum pricing levels are set by accounting module 206 of national advertising system 402. This allows the network 400 to set minimum pricing levels among all affiliate advertising systems 420(a)-420(n). At this point, and at any other time, various steps of FIGS. 3a-3b can be repeated to adjust previous selection, so as to achieve the customer's goals regarding distribution and pricing of the advertisement.

At step 330, sales module 202 processes the customer information to formulate a total cost, or projected total cost, based on the selected factors, such as quantity, percent discounts, unit cost, or the like. At step 333, a tally sheet is generated for the scheduled advertisements. The tally sheet shows all advertisements being rotated and the rotational data (e.g., advertisement name, tracking number, context/category, etc.) associated with the advertisements. The tally sheet also summarizes other customer information (such as, customer/agency name, address, account number, contact information, etc.) and pricing data. It should be understood that the aforementioned data has been provided as an example of the various factors that sales module 202 can set to create an advertisement campaign. Other factors can also be included to define and administer contractual relations with the customer. Also, a subset of the factors (and steps of FIGS. 3a-3b) can be used, depending on the criteria of interest to the customer, as well as the criteria supported in particular implementations.

After the tally sheet is approved and executed, the advertisement campaign is ready for implementation as described above with reference to FIG. 1, and therefore, the control flow of flowcharts 300a-300b ends as indicated at step 395. As discussed above, the present invention enables live, as-live, or on-demand media productions to be transmitted across traditional broadcast mediums and computer networks. As such, sales module 202 and the other components of system 200 supports convergent media sales across different media markets, such as over-the-air broadcast, the Internet, terrestrial, cable, satellite, or other distribution medium as a "packaged" system sale. Referring back to FIG. 4, in an embodiment, open spots or avails are filled by national advertisements sold at the national (or broadcast network) level using the sales module 202 of national advertising system 402. As discussed, national advertising system 402 operates in a similar manner to the operations of affiliate advertising systems 404(a)-404(n) at the local level. However national advertisements are sold across a larger geographical region or across all regions served by the affiliate advertising systems 404(a)-404(n). Regions of converage for an advertisement sold can be specified by one, or a combination of affiliates that represent a geographic territory or all affiliates. In addition, advertisers can target affiliates by affiliate network representation. As an example, an advertiser can target only those affiliates associated with the CBS network. Thus, distributed advertisement network 400 can consist of CBS, NBC, ABC, FOX, UPN, WB and/or other networks and independent affiliates including non-broadcast affiliates such as newspapers, radio, Internet only or other media companies VI. Traffic Module Traffic module 204 manages distribution of linear and non-linear advertising over different media markets, including the Internet, over-the-air, terrestrial, cable, satellite, etc., or a combination thereof. As discussed, traffic module 204 generates a lineup schedule that lists spots or avails to be linked with live media productions. The lineup schedule includes dates, shows, breaks, duration of breaks, and/or the like. For both live and on-demand media productions, traffic module 204 associates sold spots or avails with a customer's advertisement media that has been marked for the sold availabilities. Traffic module 204 also approves and enables inspection of sold advertising spots or avails prior to distribution. In embodiments, a user interface enables a system operator to review the sold spots or avails, and preview the advertisement media. The operator can also evaluate the content of the advertisement to ensure it is a suitable match for the context of the link media production. As such, the operator can utilize a resolver feature of traffic module 204 to resolve one or more advertisements, resolve the entered lineup, or accept the lineup as proposed.

Traffic module 204 is responsible for implementing rules and policies to make sure that a linked or assigned advertisement is available and ready to be served. Traffic module 204 is programmable to check the availability of the advertisement preceding or during live or on-demand transmissions to a client-recipient or host server. In an embodiment, traffic module 204 encodes the advertisement media for distribution over a computer network. In other embodiments, traffic module 204 forwards the advertisement media to advertisements server 218 to be encoded.

Traffic module 204 also monitors and verifies the status of the advertisement media. If suspended or expired, the advertisement media is pulled from rotation and an appropriate module, entity, or person (e.g., the assigned sales person, account representative, agency contact person, etc.) is notified. Similarly, if advertisement media is pending approval or contract agreement, traffic module 204 would block the advertisement media from being served.

In an embodiment, traffic module 204 assigns unsold advertising spots or avails to non-targeted advertisements archived in advertisements bank 212, or a default advertisement, such as a logo or feed from a local broadcasting station. In an embodiment, national advertisements can also be assigned to unsold spots or avails. Referring back to FIG. 4, the traffic module 204 of national advertising system 402 sends a FTP package of national advertisements to one, a portion of, or all affiliate advertising systems 404(a)-404(n) to fill open spots or avails.

In an embodiment, traffic module 204 includes or interacts with a commercial insertion application (CIA) to fill unsold spots or avails for live or as-live webcasts or other distribution means. The CIA operates primarily with live media productions, but can be used with as-live media productions. In an embodiment, the CIA serves the identical advertisements integrated with the live media production into the stream for the as-live media production. In another embodiment, the CIA serves different advertisements based on the media priority schemes discussed herein. The CIA receives the lineup schedule (containing the date, show, breaks, etc.) and populates the break fields according to the sold and associated advertisement data. The unsold or unassociated spots are filled with non-targeted local and/or national advertisements, including station promotions and public service announcements.

At times during a live broadcast, a scheduled break must be dynamically extended or shortened from the original duration. Traffic module 204 (with or without CIA) is operable to adjust the lineup schedule in accordance with these dynamic changes. For shortened breaks, traffic module 204 holds the un-aired advertisement and serves it at a higher priority than non-targeted advertisements. If un-aired advertisement is not aired by completion of the media production, the advertisement is designated with a "make good" status. Advertisements designated as "make good" are rescheduled to other media productions, breaks, and/or time slots, or defaulted to a "first serve" priority over all non-targeted advertisements.

For extended breaks, traffic module 204 draws from a pool of un-aired advertisements from the same media production. If none are available, non-targeted advertisements are served. An unplanned or scheduled break would be serviced as an extended break.

VII. Exemplary Implementation of Sales and Trafficking

As described above, the sale, association and distribution of advertisement media is influenced by the media rotation (i.e., live or on demand). This can be illustrated with reference to FIG. 5 and FIG. 6.

Figure 5:
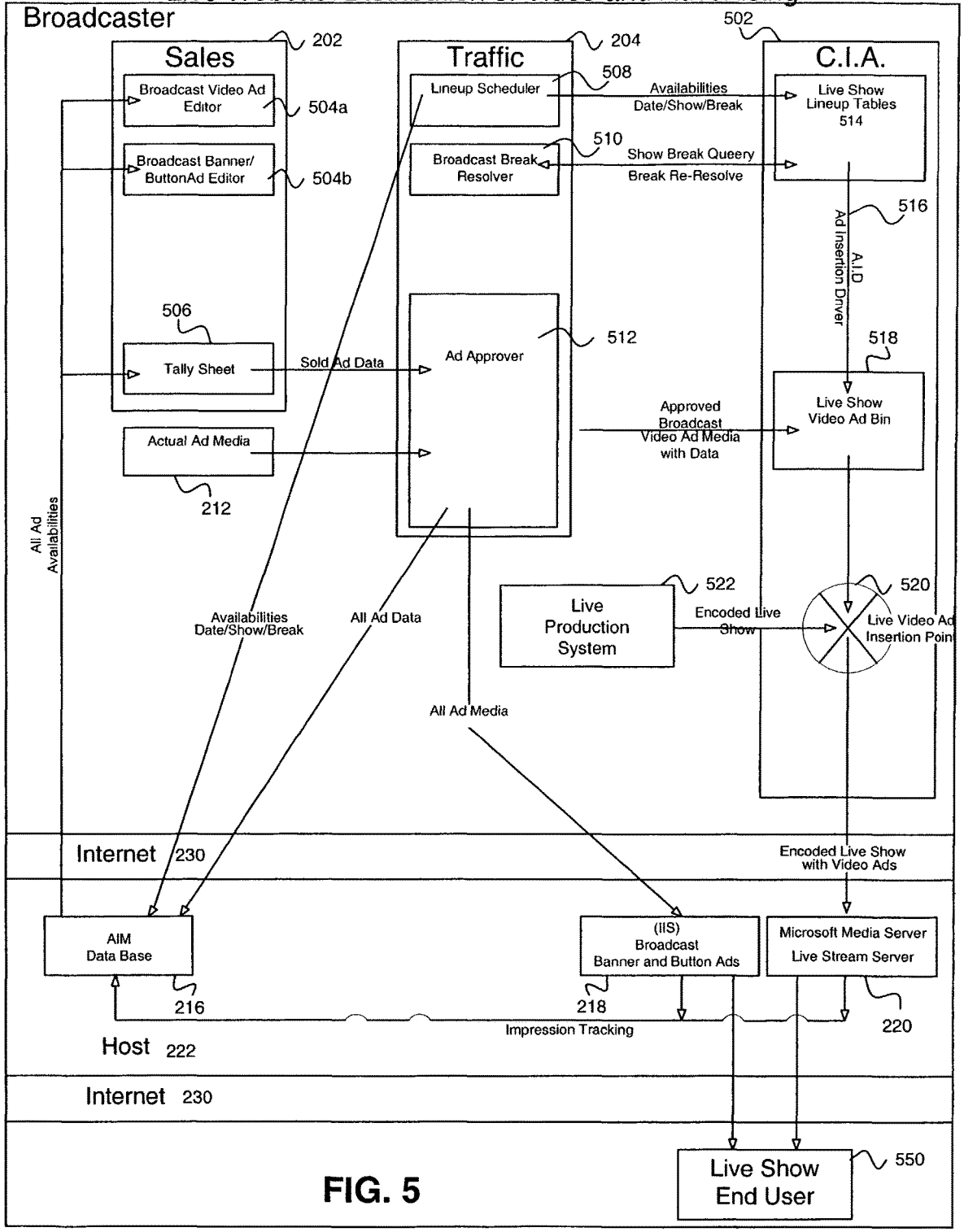
FIG. 5 illustrates an advertisement management system for live and as-live distributions according to an embodiment of the present invention.

FIG. 5 shows an embodiment of system 200 as implemented to support a live distribution of a media production and associated advertising. Sales module 202 includes a broadcast video Ad editor 504a and broadcast banner/button Ad editor 504b. A sales representative operates broadcast editors 504a-504b to create a "live" and "as-live" advertisement campaign, as discussed above. Broadcast video Ad editor 504a is used to sell availabilities for video or audio media. Broadcast banner/button Ad editor 504b is used to sell availabilities for advertisement banners, buttons, or the like. Broadcast editors 504a-504b search for availabilities (unsold avails) by querying AIM database 216. AIM database 216 stores information that identifies each avail and indicates whether the avails are sold or unsold. After the availabilities have been queried and sold, a tally sheet application 506 enables the sales representative to finalize and execute the contract that governs the advertisement campaign.

Traffic module 204 interacts with both AIM database 216 and sales module 202. Traffic module 204 includes a lineup scheduler 508 that provides the availabilities information to AIM database 216. In this manner, AIM database 216 is updated, so it can accurately respond to queries from broadcast editors 504a-504b. A lineup schedule is a show template that is used by all live broadcasts or shows to schedule and integrate commercials. The template includes a predetermined number of blocks and breaks for a set time period (e.g., a thirty minute show). The blocks enable input of the show content or media production, and the breaks enable input of the advertising. Hence, according to embodiments of the present invention, the live media production source provides traffic module 204 with the requisite information to enable traffic module 204 to publish one or more lineup schedules in AIM database 216. The lineup schedule identifies the dates, shows, breaks, break durations, etc., for future live broadcasts or shows.

Traffic module 204 also includes an Ad approver 512. Ad approver 512 associates the sold availabilities with the corresponding advertisement media temporarily located in advertisements databank 212. Ad approver 512 also enables an operator to preview or inspect the advertisement media. The operator can accept or approve the associated media without modifications. Alternatively, the operator can operate Ad approver 512 to disapprove or disassociate the advertisement media for whatever reason. In an embodiment, Ad approver 512 enables an operator to edit or modify the advertisement media, the advertisement name, tracking information, or the like. In an embodiment, Ad approver 512 enables an operator to associate another advertisement media with the avail. After the associated advertisement media is approved, Ad approver 512 updates the availabilities list and other records in AIM database 216 (to indicate avails that are sold and thus unavailable), and publishes the approved advertisement banners and/or buttons (non-linear) to advertisement server 218. The approved video and/or audio advertisements (linear) are supplied to a commercial insertion application (CIA) 502. If a video and/or audio advertisement is associated and approved for non-linear distribution, a URL, hyperlink, or similar pointer to the non-linear advertisement is supplied to advertisement server 218, which integrates this metadata with other auxiliary information (including banner/button advertising) used to enhance the live (including as-live) media production.

Traffic module 204 includes a broadcast break resolver 510. An operator can activate broadcast break resolver 510 to evaluate the content of advertisement media to ensure it is a suitable match for the context of the linked media production. The operator can review descriptive metadata associated with the advertisement media and/or the actual advertisement to resolve ethical and conflict management concerns. The operator can also compare the category or topic of the live media production (if known in advance of air) with the advertisement media or metadata. In an embodiment, the operator can resolve breaks up to five minutes prior to airtime. Otherwise, unsold breaks or inappropriate advertisements (identified by parsing the advertisement descriptive metadata) are handled by established rules and policies of system 200. As such, the operator can utilize broadcast break resolver 510 to resolve one or more advertisements, resolve an entered lineup, or accept a lineup as proposed. Alternatively, broadcast break resolver 510 can operate automatically in accordance with established rules and policies.

As discussed above, traffic module 204 includes a commercial insertion application for live (including as-live) distributions. An exemplary implementation of a commercial insertion application is shown as CIA 502. As such, CIA 502 inserts audio and/or video advertisements into a live media production. CIA 502 receives the lineup schedule (containing the date, show, breaks, etc.) from lineup scheduler 508 and produces a live show lineup table 514 (also described below with reference to FIGS. 15 and 17). CIA 502 populates the break fields (avails) in lineup table 514 according to the associated and approved advertisement data. Broadcast break resolver 510 is enabled to modify or update lineup table 514 as described above. CIA 502 fills unsold or unassociated spots with non-targeted local and/or national advertisements, including station promotions and public service announcements.

Approved advertisements (from Ad approver 512) stored in a live show video Ad bin 518. An Ad insertion driver 516 selects the appropriate advertisement media from Ad bin 518 (or non-targeted local and/or national advertisements for unassociated spots) for insertion at combiner 520.

Figure 42:
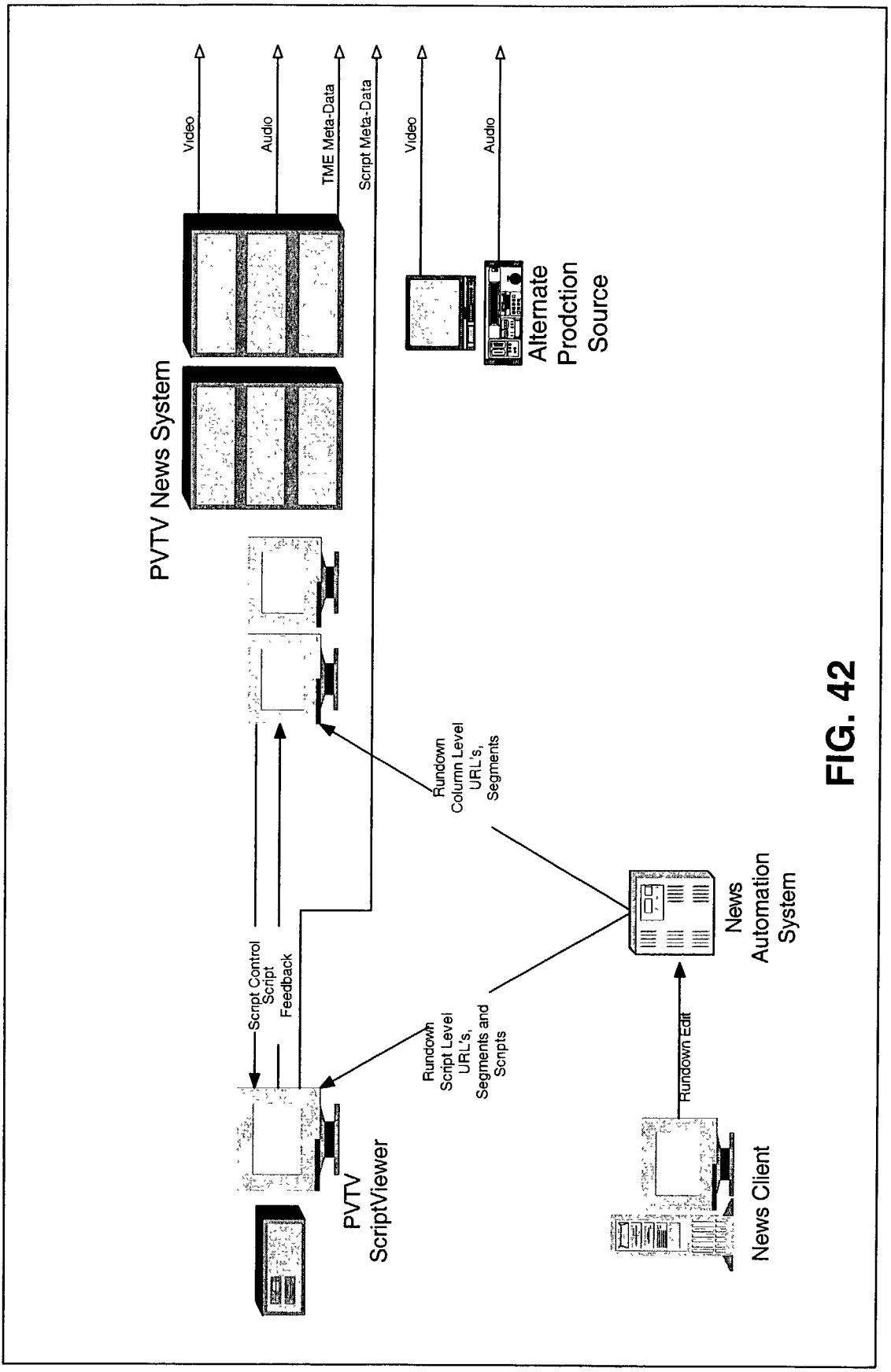
FIG. 42 illustrates a pre-production and production media system according to an embodiment of the present invention.
Figure 43:
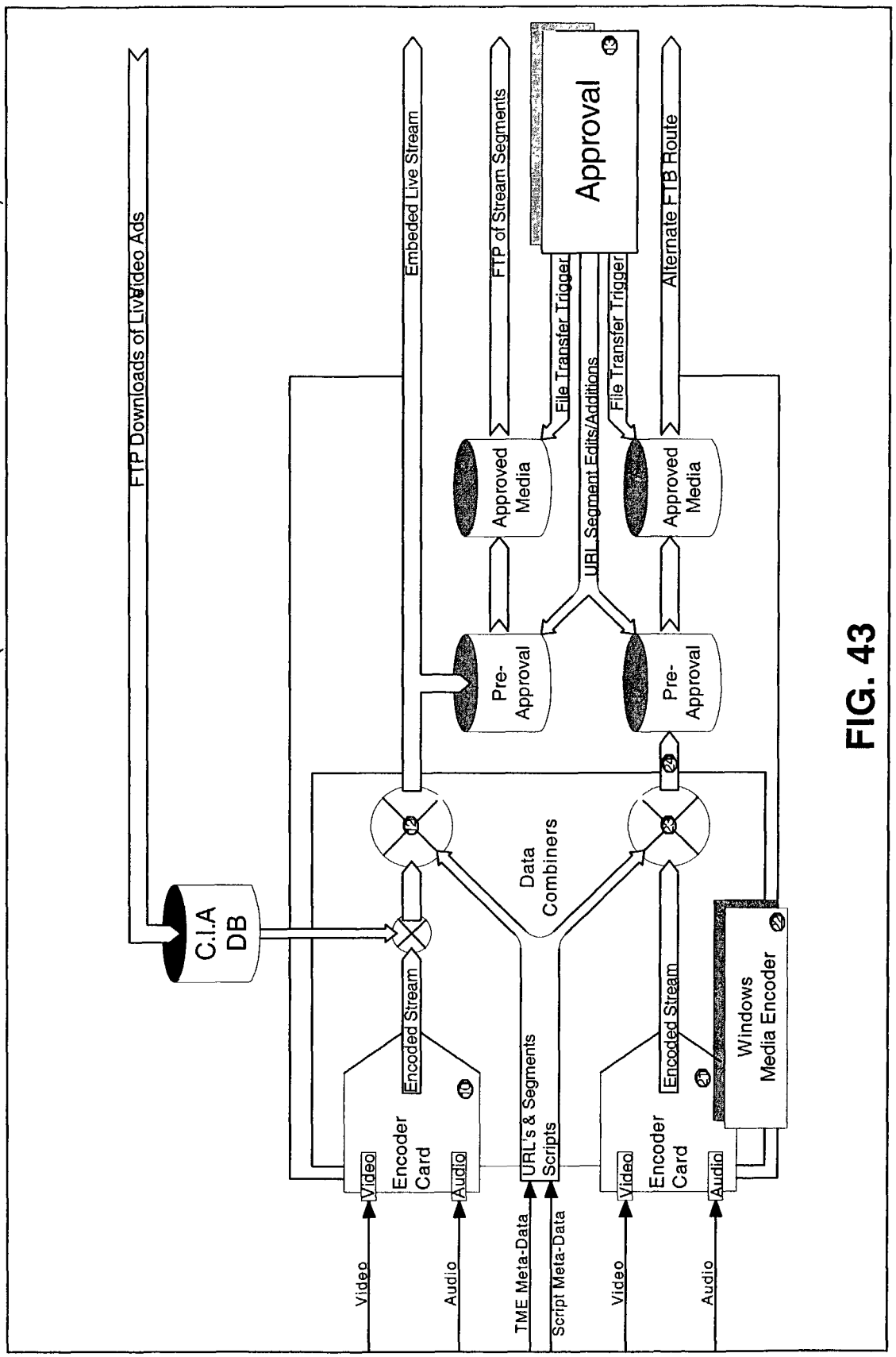
FIG. 43 illustrates a pre-production, production, and post-production system according to an embodiment of the present invention.

As the encoded live media production is produced and streamed from media production source 522 (i.e., the hosting facility), combiner 520 integrates the advertisement media from Ad bin 518 into the encoded live media stream at the designated breaks or avails according to the lineup table. FIG. 42 and FIG. 43 illustrates pre-production, production, and post-production processing according to an embodiments of the present invention for producing live, as-live, and on-demand content for media production source 522. Other examples are described in the copending application entitled "Method, System and Computer Program Product for Producing and Distributing Enhanced Media Downstreams" (U.S. application Ser. No. 09/836,239), which is incorporated herein by reference as though set forth in its entirety. Additional examples are described in the copending application entitled "Method, System and Computer Program Product for Producing and Distributing Enhanced Media" (U.S. application Ser. No. 10/208,810), which is incorporated herein by reference as though set forth in its entirety.

Figure 17:
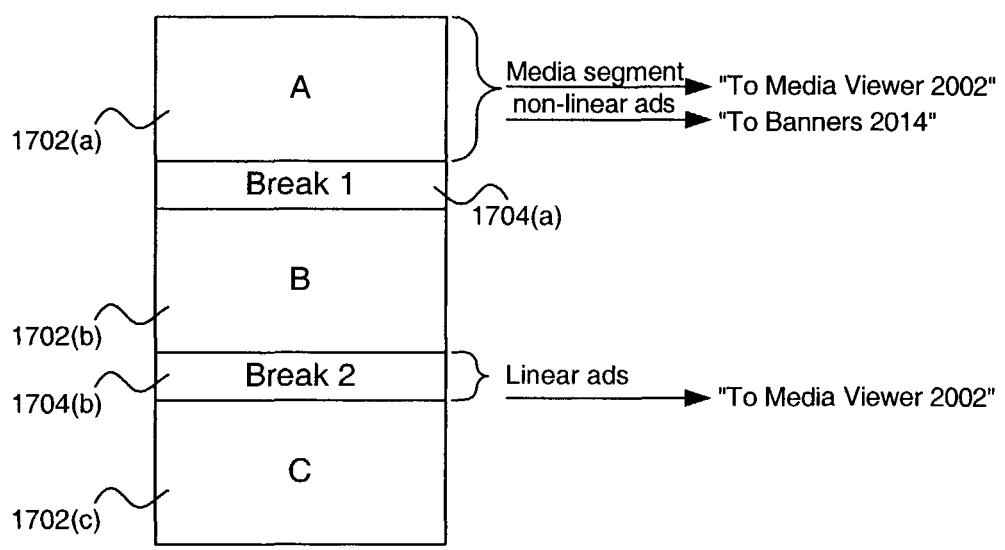
FIG. 17 illustrates a lineup table according to an embodiment of the present invention.

FIG. 17 illustrates an embodiment of a lineup table 514 useful for implementing the present invention. Lineup table 514 identifies blocks 1702*a*-1702*c* that indicates where combiner 520 receives the live media segments. Breaks 1704*a*-1704*b* indicates where combiner 520 integrates the advertisement media. The encoded stream (containing the live media and advertisements) are published to media server 220. Lineup table 514, as illustrated in FIG. 17, is a "still frame" in time. Although only three breaks 1704*a*-1704*b* are shown, multiple breaks exist for a real time lineup. Therefore, multiple stories of the "still frame" exist within an A, B, C and or N block.

At the host servers 222, media server 220 and advertisements server 218 operate synchronously to stream the encoded live media production (including linear advertisements) and non-linear advertisements (i.e., banners and buttons) to the one or more live show end users 550 (i.e., the client-recipient). A Java application or like client-programming application is prepared and transmitted to enable the media production, enhanced with linear and non-linear advertisements, to be presented on a display device or television set of the client-recipient in the appropriate order. In an embodiment, an ASX metafile for a Windows Media™ application is created. The metafile contains multiple files or streams (i.e., the live media production and linear advertisements) arranged in a playlist, instructions for playing the files or streams, text and graphic elements (e.g., non-linear advertisements and auxiliary information) associated with the media production and topic being streamed, and hyperlinks associated with the elements as they are to be displayed by a Windows Media™ application on a client display. An exemplary system for using ASX metafiles to integrate a media production with auxiliary information (including advertisements) is described in the copending application entitled "Method, System and Computer Program Product for Producing and Distributing Enhanced Media Downstreams" (U.S. application Ser. No. 09/836,239), which is incorporated herein by reference as though set forth in its entirety.

Figure 20:
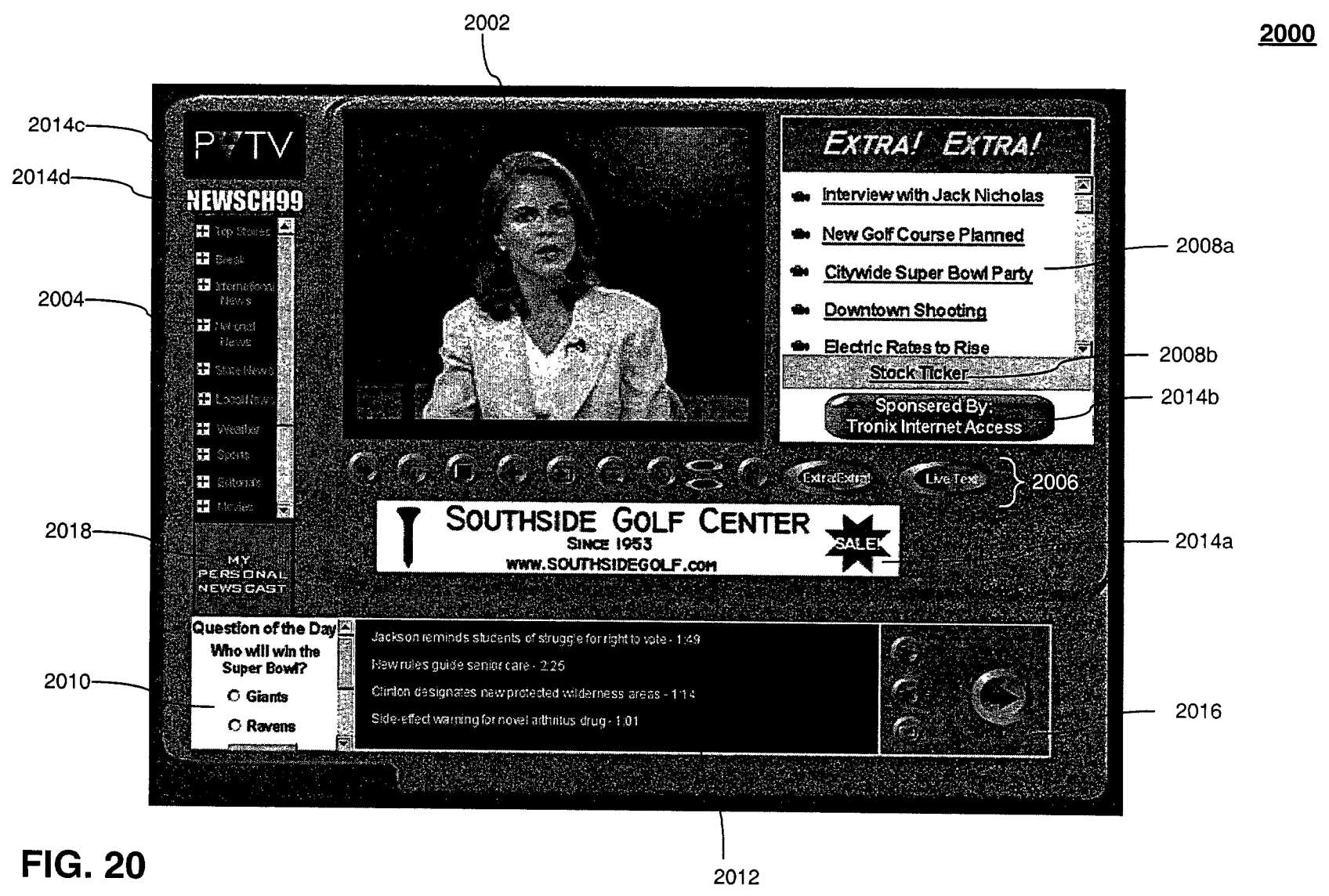

The process for integrating and displaying live (including as-live and on-demand) media productions with linear and non-linear advertising can be explained with reference to FIGS. 17 and 20. FIG. 20 illustrates an embodiment a client display 2000 for receiving enhanced media streams according to an embodiment of the present invention. Client display 2000 is a textual or graphical user interface that provides a common platform for integrating one or more of the following components: a media viewer 2002, media index 2004, viewer controls 2006, auxiliary media 2008*a*-2008*b*, opinion media 2010, media access area 2012, banners 2014*a*-2014*d*, media access controls 2016, and index button 2018. As illustrated, client display 2000 is configured to display each component in the same frame or window. However, in another embodiment, one or more of the components are displayed in a separate frame or window. In an embodiment, client display 2000 receives an ASX metafile, described above, that instructs a browser application operating on the client device to create the requisite components of client display 2000. Other programming applications can be used as would be apparent to one ordinarily skilled in the relevant art(s).

With reference to FIG. 17 and FIG. 20, the ASX metafile instructs client display 2000 to display an enhanced media production according to lineup table 1700. The media production designated at blocks 1702*a*-1702*b* and linear advertising designated at breaks 1704*a*-1704*b* are serially displayed on media viewer 2002. Non-linear advertisements are displayed at banners 2014*a*-2014*d* in parallel with the content on media viewer 2002. The ASX metafile instructs client display 2000 to present the non-linear advertisements in parallel with the media production and linear advertisements. For on-demand productions, although not exclusively, the non-linear advertisements are linked to the media production and/or linear advertisements by topic or category. Other programming applications to arrive at the same end result can be developed based on rules and protocols such as "standards" based on the Advanced Television Systems Committee (ATSC) that allows for distribution onto digital television and set-top boxes as would be apparent to one skilled in the relevant art(s).

Accordingly, live media production, with linear and non-liner advertisements, are transmitted over communication infrastructure 230 that supports traditional over-the-air broadcasts and/or computer network distributions. Statistics, impressions, demographics, and the like are collected and stored in AIM database 216.

As discussed, the process described with reference to FIG. 5 is applicable to both "live" and "as-live" (time shifted) distributions. For "as live" distributions, a live media production can be temporarily stored at host 222 (or a component of system 200), or at the client device (e.g., client display 2000) until it is viewed by a user. In an embodiment, the as-live distribution includes the same linear and non-linear advertisements as distributed (or would have been distributed) with the original live distribution. In another embodiment, the as-live distribution includes the same non-linear advertisement, but new linear advertisements can be inserted according to the media priority schemes included herein. In another embodiment, the as-live distribution includes the same or different non-linear advertisements, but the linear advertisements can differ or be removed. Therefore, although the present invention or other proprietary systems can remove or replace linear advertisements that are placed at the beginning, within breaks, or at the end of a media production, the present invention is able to ensure that non-linear advertising remain associated with the media production. As discussed, the ASX metafile, or like programming applications, ensure that the context links (e.g., by topic or category) between the media segments and associated non-linear advertisements are preserved.

Figure 6:
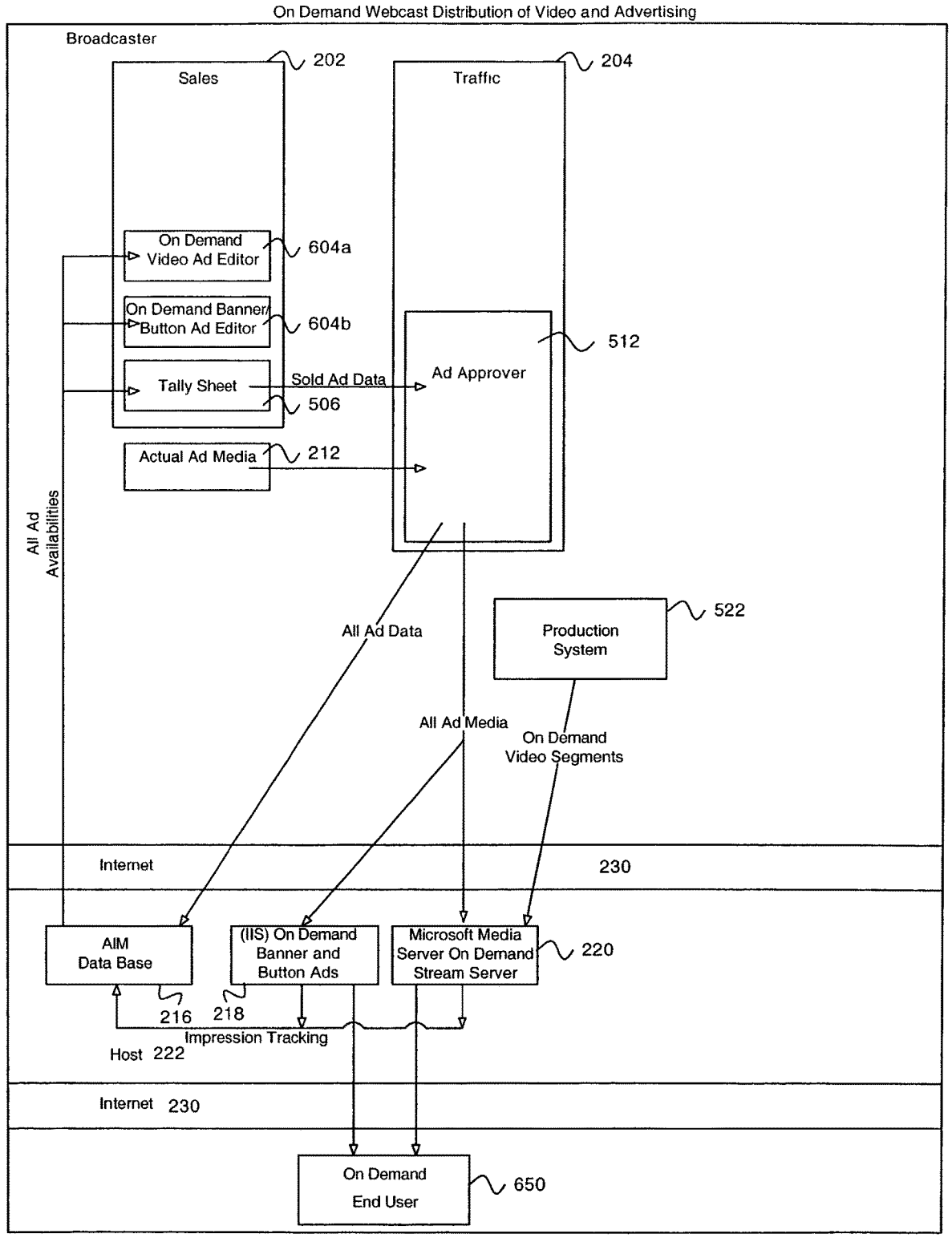
FIG. 6 illustrates an advertisement management system for on-demand distributions according to an embodiment of the present invention.

Referring to FIG. 6, an embodiment of system 200 is shown to support an on-demand distribution of a media production and associated advertising. Sales module 202 includes an on-demand video Ad editor 604*a* and an on-demand banner/button Ad editor 604*b*. A sales representative operates on-demand editors 604*a*-604*b* to create an "on-demand" advertisement campaign, as discussed above. On-demand video Ad editor 504*a* is used to sell availabilities for video or audio media. On-demand banner/button Ad editor 504*b* is used to sell availabilities for advertisement banners, buttons, or the like. On-demand editors 504*a*-504*b* search for unsold availabilities by querying AIM database 216. As discussed above, AIM database 216 collects statistics and data related to the sale and distribution of advertisements and media productions. The availabilities list for on-demand distributions are produced from this information, and enables advertising to be sold by target market, category, or the like. Thus, in embodiments, the rotation schedule for on-demand advertisement campaigns are not based on a show, as discussed above with respect to live advertisement campaigns. Advertisements for a live distribution are served in "breaks" according to a lineup schedule, without regard or advanced knowledge of the show content, or the recipient's viewing patterns, buying habits, other psychographic data, etc. Advertisements for on-demand distribution can be targeted to a particular audience, market, etc. by considering historical trends and factual data. Therefore, the "on-demand" availabilities list can be filtered to identify dates, shows, categories, topics, demographic markets, and the like.

After the availabilities have been queried and sold, tally sheet application 506 enables the sales representative to finalize and execute the contract that governs the advertisement campaign.

Traffic module 204 interacts with both AIM database 216 and sales module 202. Specifically, Ad approver 512 within traffic module 204 associates the sold availabilities with the corresponding advertisement media temporarily located in advertisements databank 212. Ad approver 512 also enables an operator to preview or inspect the advertisement media. The operator can accept or approve the associated media without modifications. Alternatively, the operator can operate Ad approver 512 to disapprove or disassociate the advertisement media for whatever reason. In an embodiment, Ad approver 512 enables an operator to edit the advertisement media, the advertisement name, tracking information, or the like. In an embodiment, Ad approver 512 enables an operator to associate another advertisement media with a given avail. After the associated advertisement media is approved, Ad approver 512 updates the availabilities list and other records in AIM database 216, and publishes the approved advertisement banners and/or buttons to advertisement server 218. The approved video and/or audio advertisements are published to media server 220. If a video and/or audio advertisement is associated and approved for non-linear distribution, a URL, hyperlink, or similar pointer to the non-linear advertisement is supplied to advertisement server 218, which integrates this metadata with other auxiliary information (including banner/button advertising) used to enhance the on-demand media production.

After an on-demand media production is produced and streaming begins from media production source 522, media server 220 integrates the approved video and/or audio advertisement media into the encoded on-demand media stream at the designated locations at the beginning, end, and/or within the media stream. Media server 220 and advertisements server 218 operate synchronously to stream the encoded on-demand media production (including linear advertisements) and non-linear advertisements (i.e., banners and buttons) to the one or more on-demand end users 650 (i.e., the client-recipient). In an embodiment, a Java application or like client-programming application is prepared and transmitted to enable the media production, enhanced with linear and non-linear advertisements, to be presented on a display device or television of the client-recipient in the appropriate order. In an embodiment, an ASX metafile for a Windows Media™ application is created. The metafile contains multiple files or streams (i.e., the media production and linear advertisements) arranged in a playlist, instructions for playing the files or streams, text and graphic elements (e.g., non-linear advertisements and auxiliary information) associated with the media production and topic being streamed, and hyperlinks associated with the elements as they are to be displayed by a Windows Media™ application on a client display. An exemplary system for using ASX metafiles to integrate a media production with auxiliary information (including advertisements) is described in the copending application entitled "Method, System and Computer Program Product for Producing and Distributing Enhanced Media Downstreams" (U.S. application Ser. No. 09/836,239), which is incorporated herein by reference as though set forth in its entirety.

The on-demand media production, with linear and non-liner advertisements, are transmitted over communication infrastructure 230 that supports traditional over-the-air broadcasts and/or computer network distributions. Statistics, impressions, demographics, and the like are collected and stored in AIM database 216.

Figure 8:
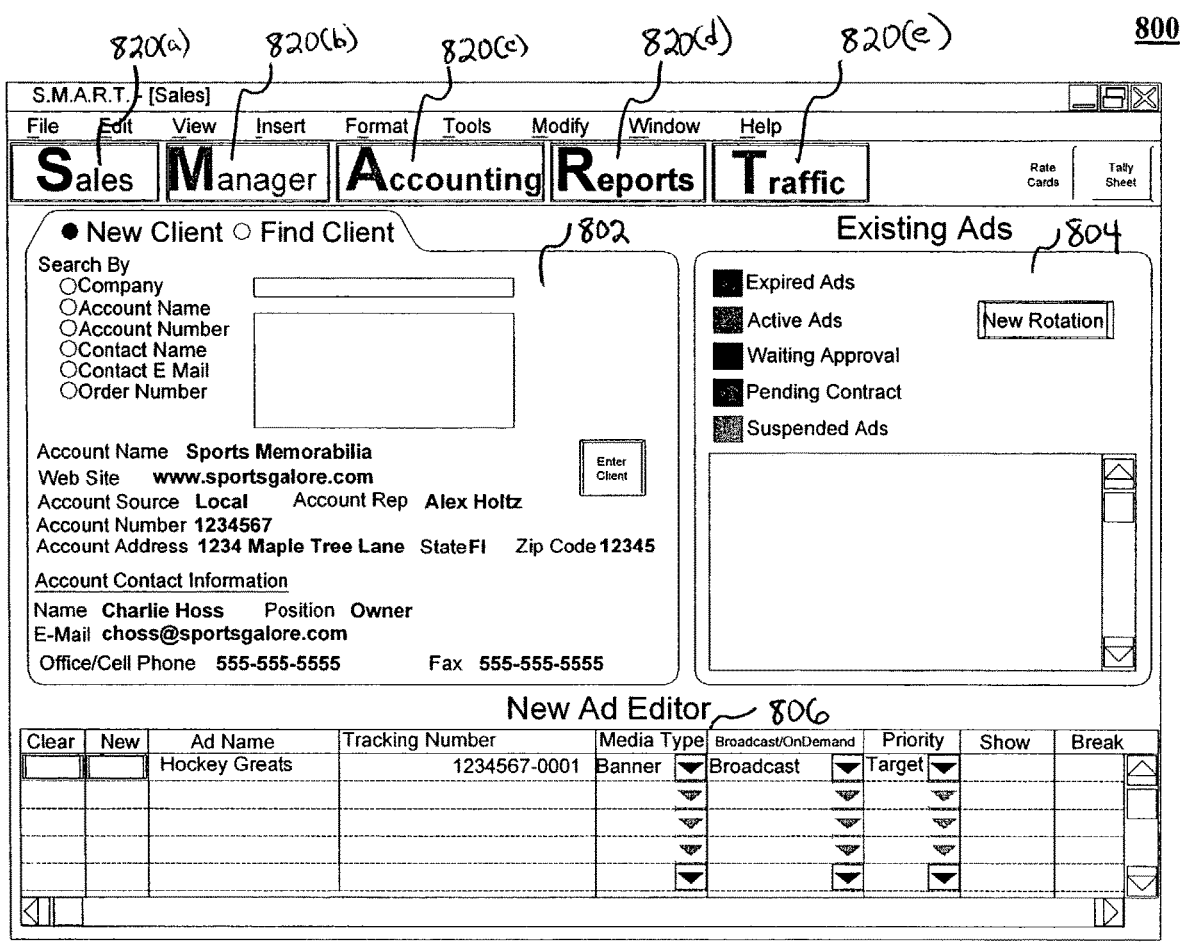
FIG. 8 illustrates a sales graphical user interface (GUI) according to an embodiment of the present invention.

FIG. 8 illustrates a graphical user interface (GUI) 800 that enables a sales representative to generate an advertisement campaign in accordance with embodiments of the present invention. Disposed at the top of Sales GUI 800 are graphical icons or buttons 820(*a*)-820(*e*) that can be activated to enable authorized users to gain access to sales module 202, traffic module 204, manager module 210, accounting module 206, and reports module 208. User authorization is set and controlled by manager module 210, as described herein.

Sales GUI 800 enables an authorized operator to price and/or sell advertisements according to various pricing models. Sales GUI 800 includes a customer information region 802 that enables the sales representative to create a new account for a customer. Customer information region 802 also enables searches for existing customers. Therefore, if a client account already exists, the operator can search for the client account to edit or verify the contact information.

As described above, the contact information includes a company name (such as, the name of manufacturer, retailer, or distributor of the promoted product and/or service). Contact information also includes an account name. The account name is used to identify the advertising firm subscribing to system 100. However, if the seller of the promoted item performs its own advertising, the company name and account name can be the same.

Contact information also includes an account number that identifies the account name. Other contact information includes a contact name, contact email, and order number for the promoted product and/or service. An account source is also included to identify whether the product and/or service is being promoted from a local or regional company. Hence, the present invention supports sponsorship at multiple levels. Other contact information, as described above, can also be included, and is intended to be within the scope of the present invention.

Existing Ads region 804 tracks past and/or current advertisements for the client company and/or account Hence, existing Ads region 804 displays the status of all advertisement campaigns for a designated customer. As discussed, advertisement status can be designated as expired, active, waiting approval, pending contract agreement, or suspended. Expired advertisements are no longer being rotated, but are marked to be saved for future use. Active advertisements are currently being rotated. Advertisements designated as "waiting approval" are scheduled for distribution, but are awaiting approval by traffic module 204, as described herein. Advertisements designated as "pending contract" are scheduled for distribution, but are awaiting contract acceptance or agreement as described with reference to the tally sheet application 506. Finally, suspended advertisements are suspended by traffic module 204 due to objectionable material or by accounting module 206 for contractual issues. In an embodiment, traffic module 204 is the only component having authority to suspend and reinitiate advertisement campaigns. As such, accounting module 206 would initiate the suspended status, but traffic module 204 would implement actual suspension.

Sales GUI 800 also includes a new Ad editor 806. New Ad editor 806 allows an authorized operator to schedule a rotation for an advertisement. As shown, the operator uses new Ad editor 806 to specify an advertisement name and set the rotation attributes, such as tracking number, media type, media rotation, media priority, show, break, etc. In an embodiment, new Ad editor 806 is only used to set the rotation schedule if the advertisement will be served to a non-targeted audience. For a target or exclusive audience, the operator uses a GUI for "Broadcast Banner & Button Ad Editor" or an "On Demand Ad Editor," both discussed below.

Figure 9:
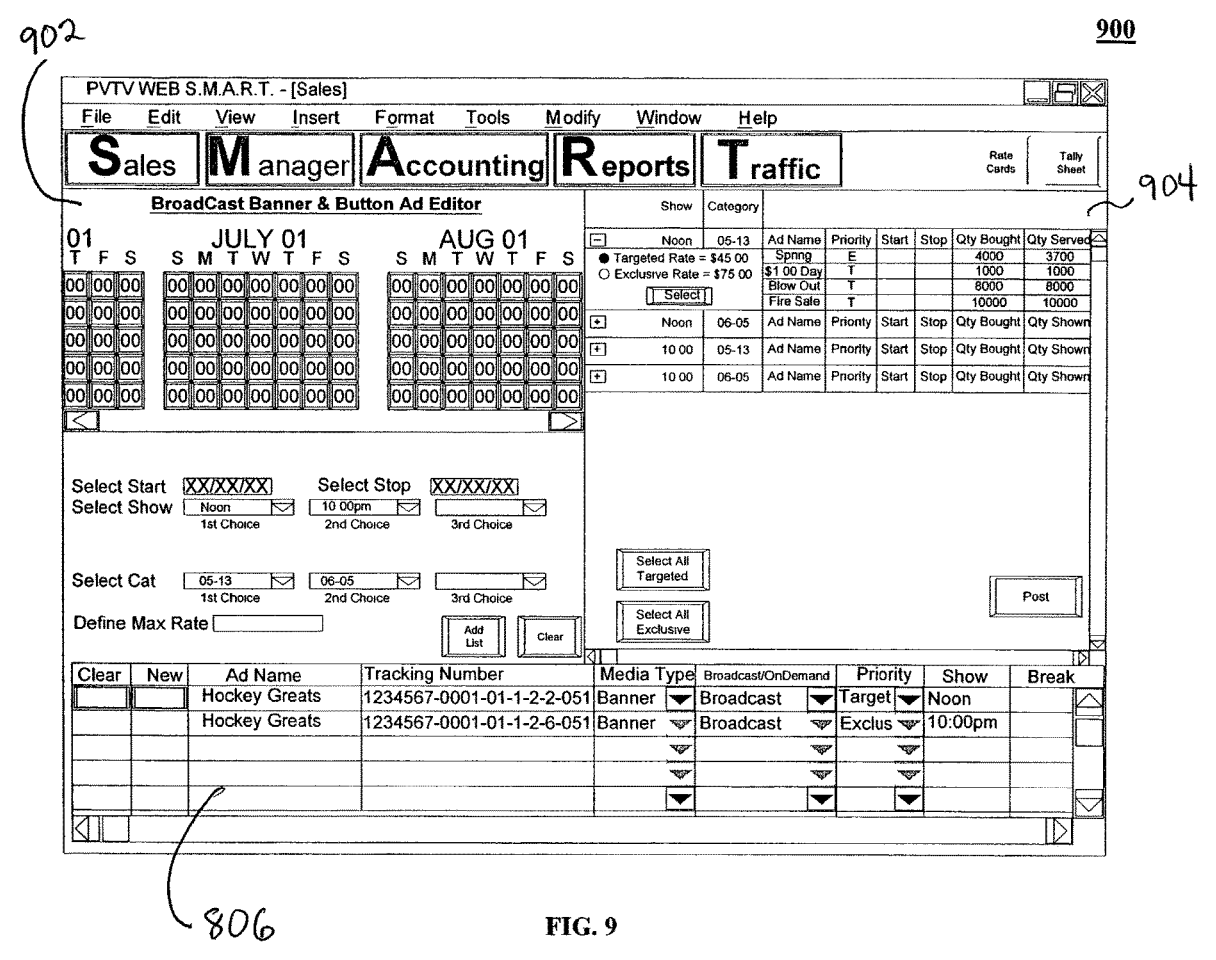

FIG. 9 illustrates a sales GUI 900 for a Broadcast Banner & Button Ad Editor according to an embodiment of the present invention. Sales GUI 900 enables an authorized operator to access broadcast banner/button Ad editor 504b, described above, to search and select time slots for a rotation schedule. Left pane 902 enables an authorized operator to search AIM database 216 for availabilities (unused or unsold spots or avails). The availabilities list is displayed in right pane 904. Left pane 902 allows searches to be based on start date and stop date. Searches can also be based on a first, second, and third preference. A maximum rate can also be set for the search, and the search can be updated (or a new search can be performed) by activating an "add list" button and/or "clear" button. The availabilities list (displayed in right pane 904) reflects the search criteria prioritized to first, second, and third choice. The availabilities list also indicates the time slots that are available for purchase. Selections from right pane 904 are displayed in new AD editor 806.

Figure 10:
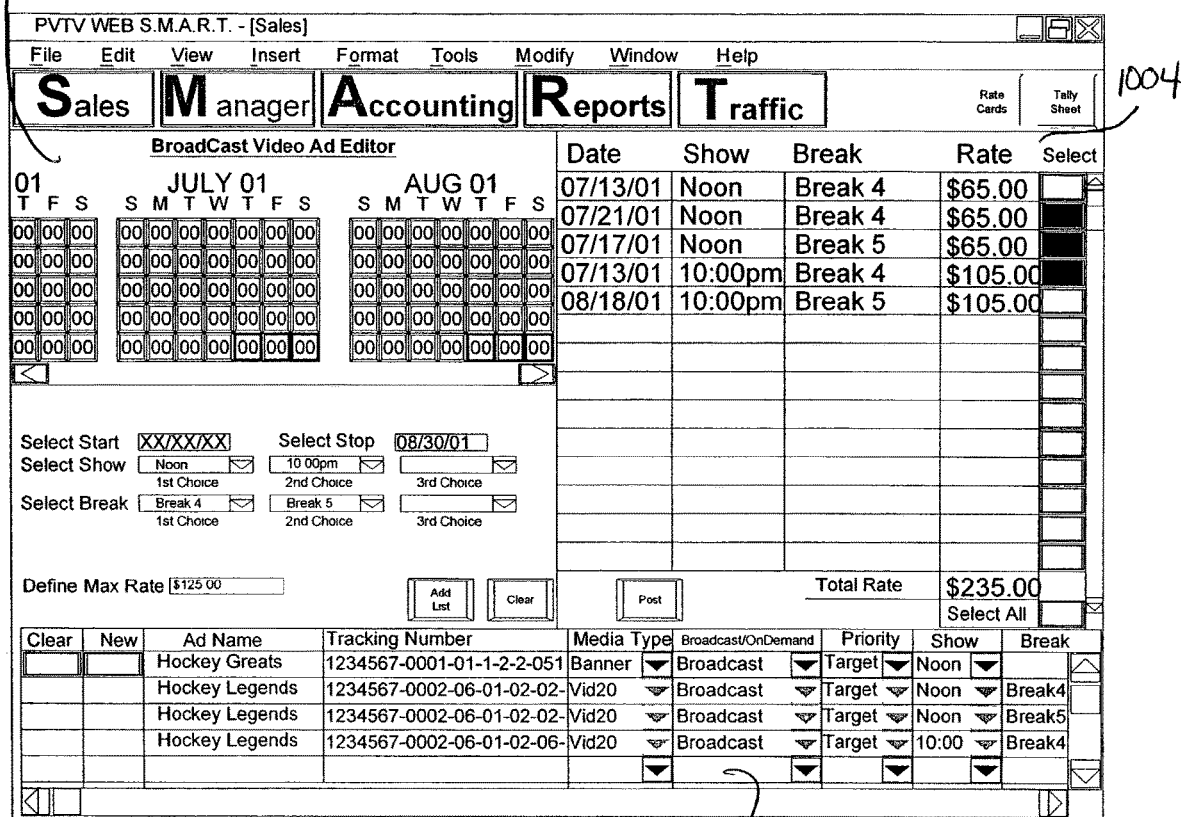
FIG. 10 illustrates a sales GUI according to another embodiment of the present invention.

FIG. 10 illustrates a sales GUI 1000 for a Broadcast Video Ad Editor according to an embodiment of the present invention. Sales GUI 1000 enables an authorized operator to access broadcast video Ad editor 504a, described above, to search and select time slots for a rotation schedule. Left pane 1002 enables searches, refined searches, additional searches, and/or new searches for availabilities, as described with reference to right pane 902. Right pane 1004 displays the availabilities list from AIM database 216. New Ad editor 806 displays the selected spots or avails from right pane 1004.

Figure 11:
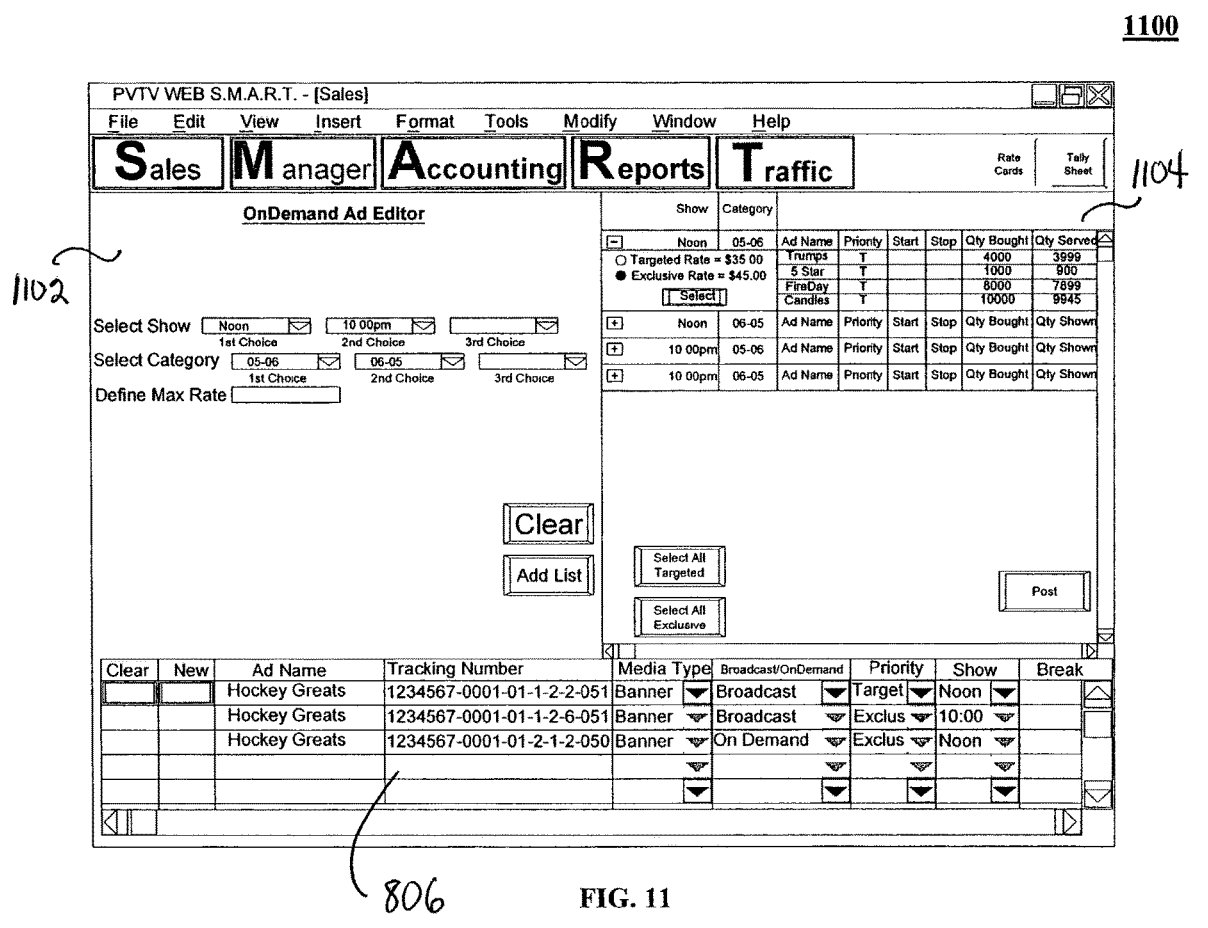

FIG. 11 illustrates a sales GUI 1100 for an On Demand Ad Editor according to an embodiment of the present invention. Sales GUI 1100 enables an authorized operator to access on-demand Ad editors 604a-604b, as described above, to search and select time slots for a rotation schedule. Left pane 1102 enables searches, refined searches, additional searches, and/or new searches for availabilities. Right pane 1104 indicates time slots that are available to be purchased. Selections from right pane 1104 are displayed in new Ad editor 806.

FIG. 12 illustrates a tally sheet GUI 1200 for the spots or avails to be purchased for a given client company or account. Tally sheet GUI 1200 is reviewed and finally approved for execution by an authorized operator. The form displayed on tally sheet GUI 1200 can be printed or saved to a storage medium.

Figure 13:
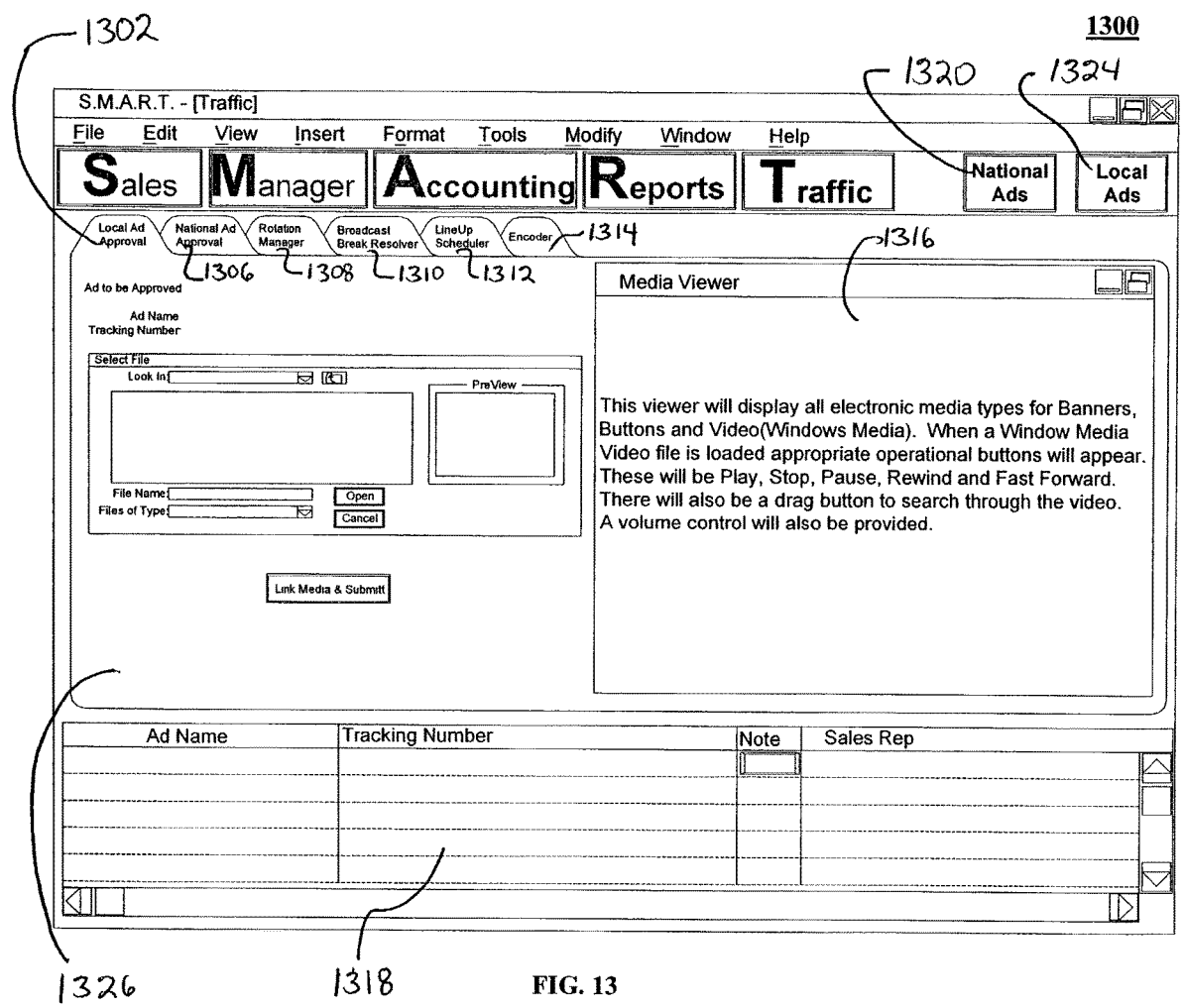
FIG. 13 illustrates a traffic GUI according to an embodiment of the present invention.

FIG. 13 illustrates a traffic GUI 1300 that enables an authorized operator to access the records of traffic module 204 to review and approve an advertisement campaign in accordance with embodiments of the present invention. Graphical icons or buttons 1302-1314 can be activated to enable the operator gain access to the functions of traffic module 204. Local Ad button 1302 enables approval of local advertisement campaigns. National Ad button 1306 enables approval of national advertisement campaigns. Rotation button 1308 enables management of advertisement rotation. Resolver button 1310 enables resolution of ethical or conflict concerns. Lineup schedule button 1312 enables creation and modifications to be made to a lineup schedule. Encoder button 1314 enables modification to be made to the data and video encoding options implemented by the system.

Indicators 1320 and 1324 signals whether national and local, respectively, advertisements need approval. As shown, local Ad approval button 1302 has been activated in traffic GUI 1300. Local Ad approval button 1302 enables access to Ad approver 512, as described above. Advertisements needing approval are displayed in left pane 1326. Viewer 1316 allows a selected advertisement to be displayed. Left pane 1326 also allows searches and approval of advertisements. Editor 1318 allows the operator to modify the tracking information and the like. Activating national Ad approval button 1306 generates a similar screen, and enables an authorized operator to gain access to Ad approver 512, described above.

Figure 14:
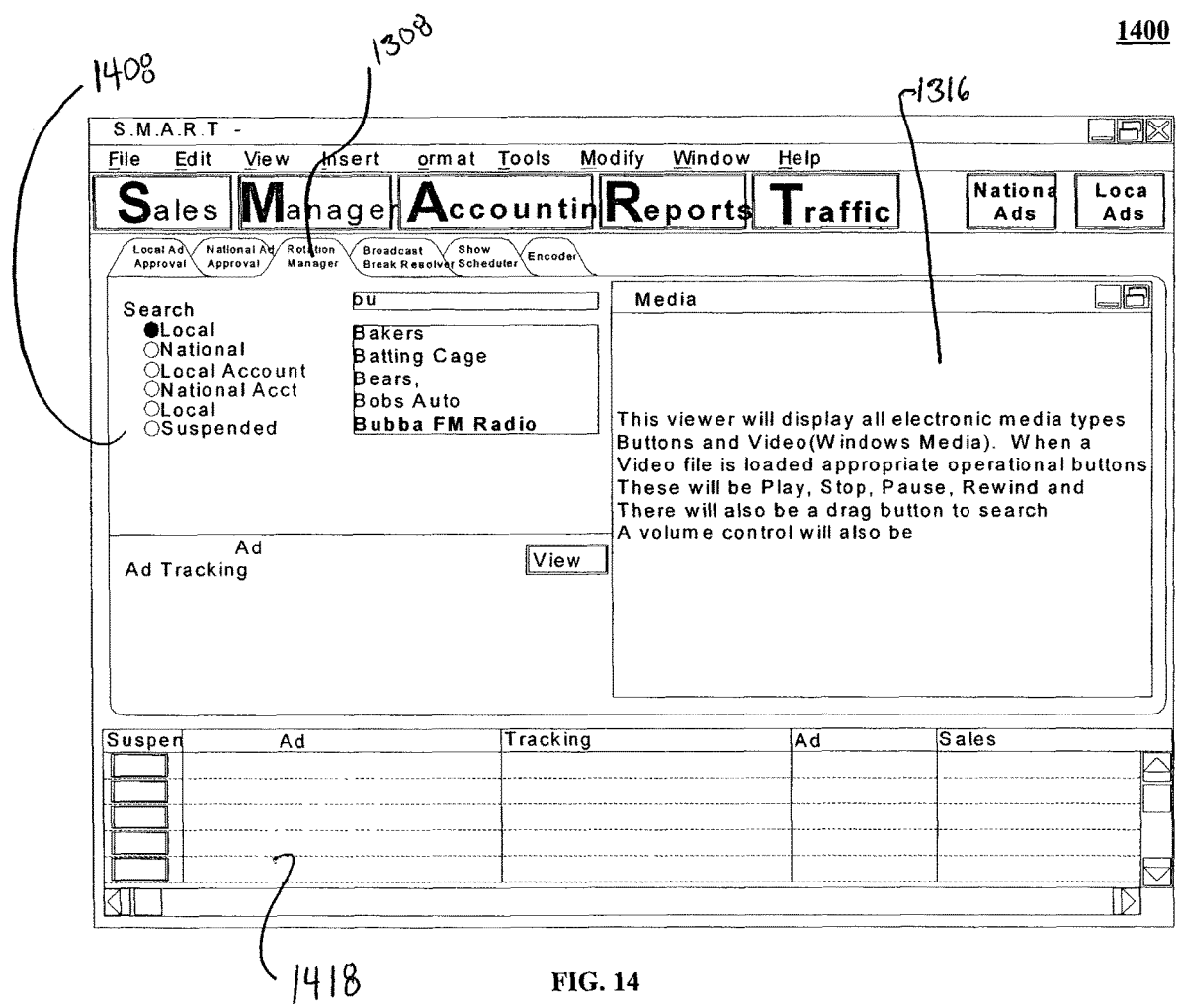
FIG. 14 illustrates a traffic GUI according to another embodiment of the present invention.

FIG. 14 illustrates a traffic GUI 1400 for rotation management according to an embodiment of the present invention. Traffic GUI 1400 illustrates a screen generated in response to activating rotation button 1308. Left pane 1408 enables an authorized operator to search and pull an advertisement from rotation for whatever reason. As such, the pulled advertisement is designated as being suspended and the appropriate sales person, entity, or sales module 202 is notified. Left pane 1408 also enables the operator to changes the suspended status to re-distribute a suspended advertisement. Viewer 1316 enables a selected advertisement to be displayed. Editor 1418 allows the operator to modify the rotation information, tracking information, and the like.

Figure 15:
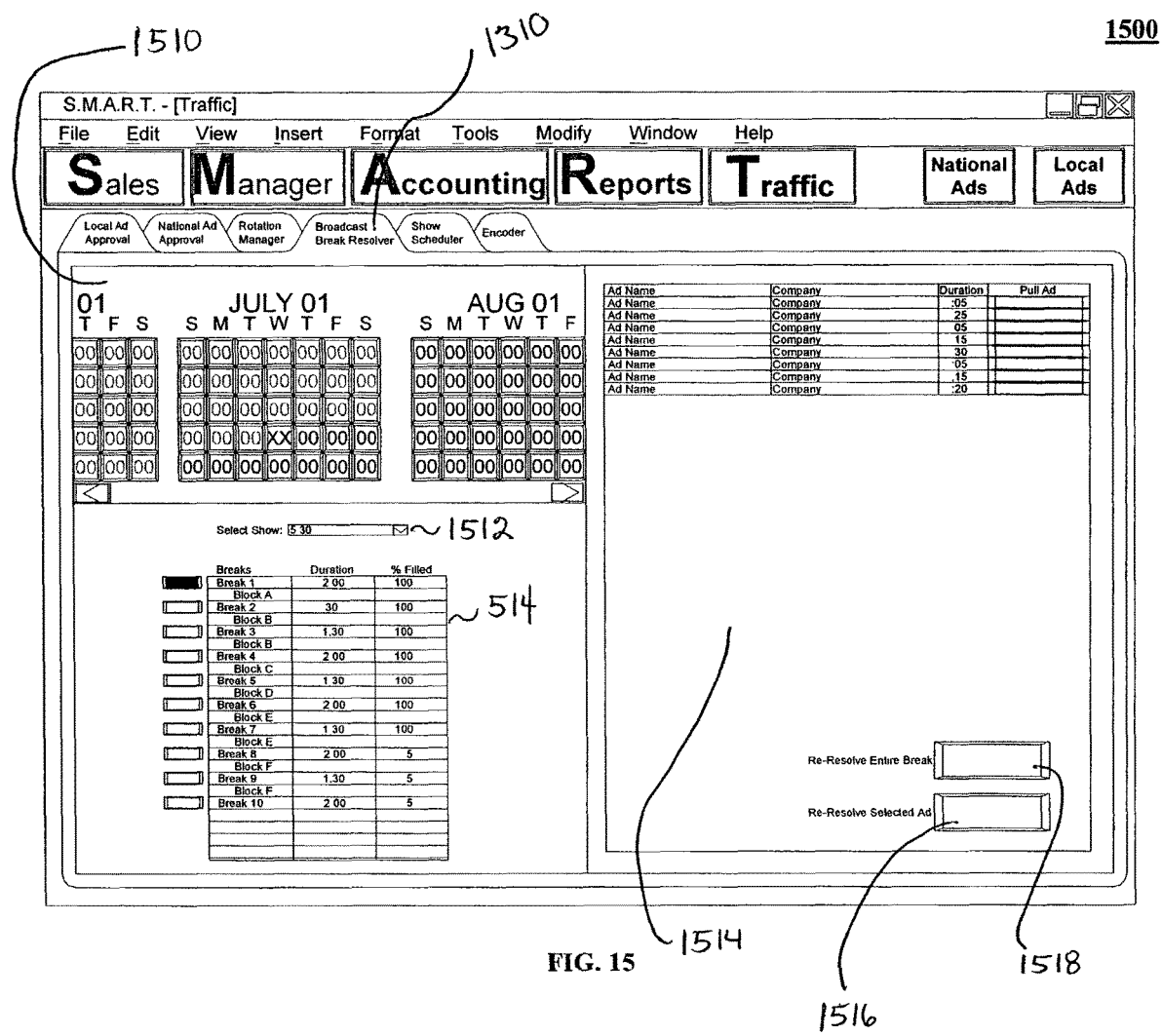
FIG. 15 illustrates a traffic GUI according to another embodiment of the present invention.

FIG. 15 illustrates a traffic GUI 1500 for resolving conflicts according to an embodiment of the present invention. Traffic GUI 1500 illustrates a screen generated in response to activating resolver button 1310. Traffic GUI 1500 enables an authorized operator to gain access to break resolver 510, described above. Left pane 1510 enables an authorized operator to view a lineup table 514 for a selected live media production. The live media production is selected in show field 1512. Right pane 1514 displays the advertisements for each break that has been selected by the operator in left pane

1510. The operator can pull advertisements that conflict with ethical polices, as described above. The pulled advertisements are designated in right pane 1514. Activating button 1516 and 1518, the operator can resolve the entire break or selected ads, respectively, as described above.

Figure 16:
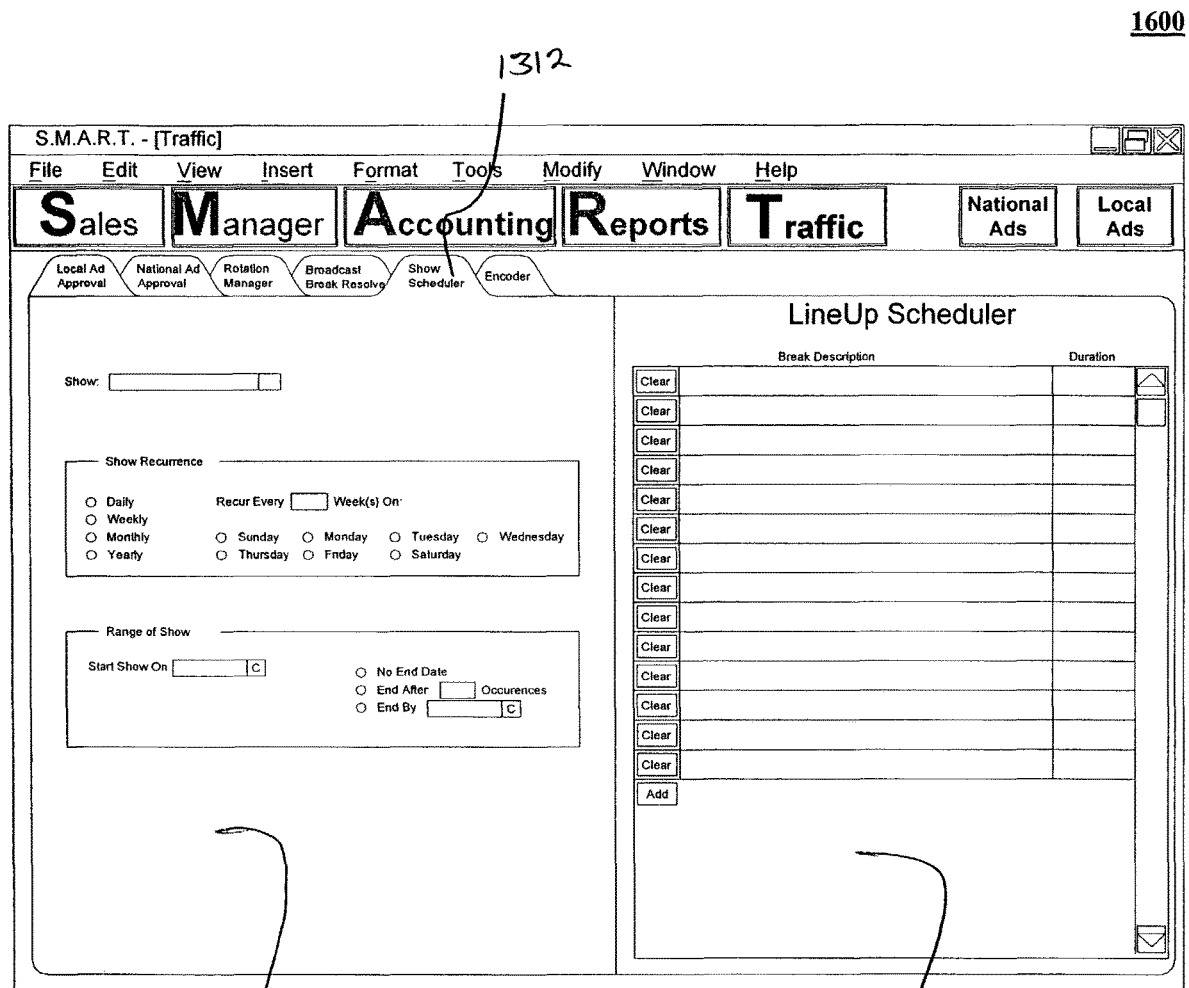
FIG. 16 illustrates a traffic GUI according to another embodiment of the present invention.

FIG. 16 illustrates a traffic GUI 1600 for building and scheduling a live show and the breaks that occur with a live show according to an embodiment of the present invention. Traffic GUI 1600 illustrates a screen generated in response to activating lineup schedule button 1312. Traffic GUI 1600 enables an authorized operator to gain access to lineup scheduler 508, described above. Left pane 1612 enables an authorized operator to designate a time and recurrence schedule for a live show. Right pane 1614 enables the operator to set the duration and order of appearance of breaks within the live show. The lineup schedule created by traffic GUI 1600 is stored in AIM database 216 and can be selected by sales module 202, as described.

VIII. Accounting Module

Referring back to FIG. 2, accounting module 206 stores and manages the pricing, collections and account monitoring, and record-keeping functions. Since account module 206 develops, maintains, and stores the price structure for the advertisements, a system operator accesses the records of accounting module 206 to create or update the pricing or sales data. The price structure maintained by accounting module 206 is accessed by sales personnel (via sales module 202) to sell avails to customers. In an embodiment, the prices for the advertisements are based on the content of a media production. The content can be evaluated or determined by a particular show, topic, category, media, time period, or the like.

As described above, prices can also be determined by media priority. As described, the present invention enables distribution of three media priority categories: exclusive advertisements, targeted advertisements, and non-targeted advertisements. Exclusive advertisements command the highest premium and are served with a specified topic or category. Exclusive advertisements are primarily served with on-demand media productions, and are not rotated among other advertisements. In an embodiment, an exclusive advertisement remains active during the presentation of the linked media production.

Targeted advertisements command the second highest premium and are also served with a specified topic or category. However, targeted advertisements are rotated among other targeted advertisements.

Finally, non-targeted advertisements are sold at the lowest rate and served without regard to a specified topic or category. Additionally, non-targeted advertisements are rotated among other non-target advertisements. In embodiments, non-targeted advertisement are used to fill an open spot or open avail (i.e., a spot or avail not sold to exclusive or targeted advertisements).

As discussed, advertisements can be sold and promoted at a local or national level. As such, local and national advertisements are sold on an exclusive, targeted, or non-targeted basis according the decreasing pricing rates discussed above. In an embodiment, local advertisement campaigns are created and managed as discussed with reference to FIG. 2. National advertisement campaigns are created and managed as discussed with reference to FIG. 4. As such, national advertisements are sold via national advertising system 402, and made available to local affiliate advertising systems 404(*a*)-404(*n*). The present invention enables local and national advertisements to be priced and distributed according to the following media priority: exclusive local advertisements, targeted local advertisements, exclusive national advertisements, targeted national advertisements, non-targeted local advertisements, and non-targeted national advertisements. Prices can alternatively be based on other system-defined criteria.

In another embodiment, the prices are based on the duration of an advertisement. For example, a thirty-second time slot can be used to determine the base price for a video or audio advertisement. If an advertiser purchases a ten-second commercial, the price can be, for example, fifty percent of the price for a thirty-second commercial length. If, on the other hand, a fifteen-second commercial is purchased, the price can be sixty-five percent of the thirty-second price. In another embodiment, the prices are based on the size (e.g., file size, packet size, etc.) or memory requirements for processing an advertisement.

In another embodiment, accounting module 206 is operable to calculate cost-per-point (CPP), cost-per-thousand (CPM), or the like based on whether a sponsored segment is delivered in a specific program, time period or advertising slot (i.e., local or national advertising slot), or receives a specific Nielsen rating. In another embodiment, rates are based on a target audience as determined by processing demographic, psychographic or behavioral patterns of online users.

The above pricing models represent over-the-air broadcast models that enables the creation of price differentials based on content or time period. The present invention enables the advertisement price structure to be based on a combination of over-the-air broadcast models and client-server models. Client-server models permit one to set prices based on impressions, such as page views, click-throughs, downloads, etc. As a result, accounting module 206 can produce an optimal pricing model predicated on user demand and content criteria, or other system-defined criteria. In an embodiment, price rates are set by an operator. Linear advertising for live distributions are priced according to the broadcast models, and all non-linear advertising are priced according to a combination of client-server and broadcast models.

Today, separate departments exist for over-the-air broadcasts versus web page management and Internet distribution. The hybrid approach described herein provides a broadcaster with an ability to streamline and integrate separate departmental workflow processes once higher penetration rates of digital television and set-top boxes enter the consumer market place allowing the broadcaster to produce content and sell advertising for both "personal" entertainment environments, such as the PC, to "group" entertainment environments, such as digital television/large screen PC.

For example, if accounting module 206 is programmed to implement a pricing model based only on client-server metrics (e.g., page views, click-throughs or downloads), advertisers would most likely choose to sponsor (i.e., advertise during) the content logging the greatest number of users because no price differentials are provided by content or time periods. On the other hand, if the pricing model is based only on over-the-air broadcast models (e.g., price differentials per content or time period), the advertiser has no assurance that an online user would actually receive or view the advertisement. However, the flexibility provided by the capabilities of accounting module 206 empower advertisers to choose (or sales representative to select) from various pricing models that are based on media content, duration, time period, psychographic data, page views, click-throughs, downloads, hits, like metrics, or a combination thereof. Accounting module 206, in an embodiment, measures or approximates the confidence level for either reaching a predetermined number of users, or ensuring that users are receiving or viewing the advertisements. Accounting module 206 would also produce, or receive from an operator, prices based on content criteria, such as media content, duration, time period, psychographic data, or the like. Accounting module 206 would, in turn, use the confidence level and criteria-based prices to establish the actual price for the selected pricing model.

For example, non-linear advertisements can be priced on client-server metrics, and also based on characteristics of the production being viewed when the non-linear advertisement is served. In a similar manner, linear advertisements can be priced on a combination of factors. In other words, since the pricing models of the present invention are based on a combination of over-the-air broadcast criteria and client-server metrics, these factors are combined to create varying degrees of certainty that an advertisement actually would be presented, received or viewed by the greatest quantity of users most likely to purchase the advertised item or service. The degree of certainty (or confidence level) is directly proportional to the price rate for the advertisement. For example, a broadcast model may identify the time periods "6 p.m." and "9 p.m." as being time periods for attracting a large quantity of viewers. Client-server metrics may reveal that males having an annual "disposable" income exceeding $100K and a propensity to purchase gaming applications have a history of viewing a particular live webcast at "9 p.m." As such, non-targeted advertisements served at "6 p.m." and "9 p.m." can be set at a higher rate than other time periods, but targeted and/or exclusive advertisements from a gaming supplier can be set at a higher rate at "9 p.m." than at "6 p.m." Therefore, the present invention provides a fair and equitable methodology for pricing an advertisement based on consumer demand, behavioral patterns, or the like.

Figure 18:
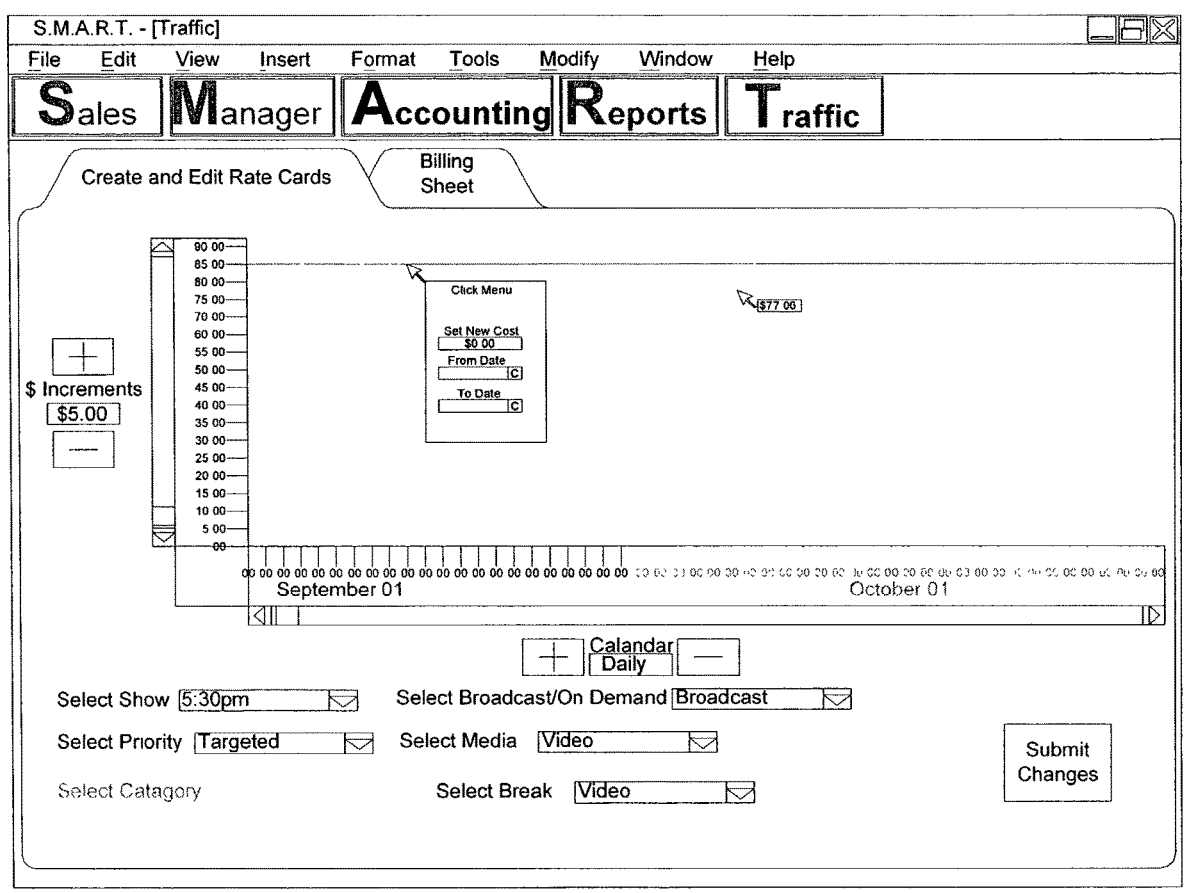
FIG. 18 illustrates an accounting GUI according to an embodiment of the present invention.
Figure 22:
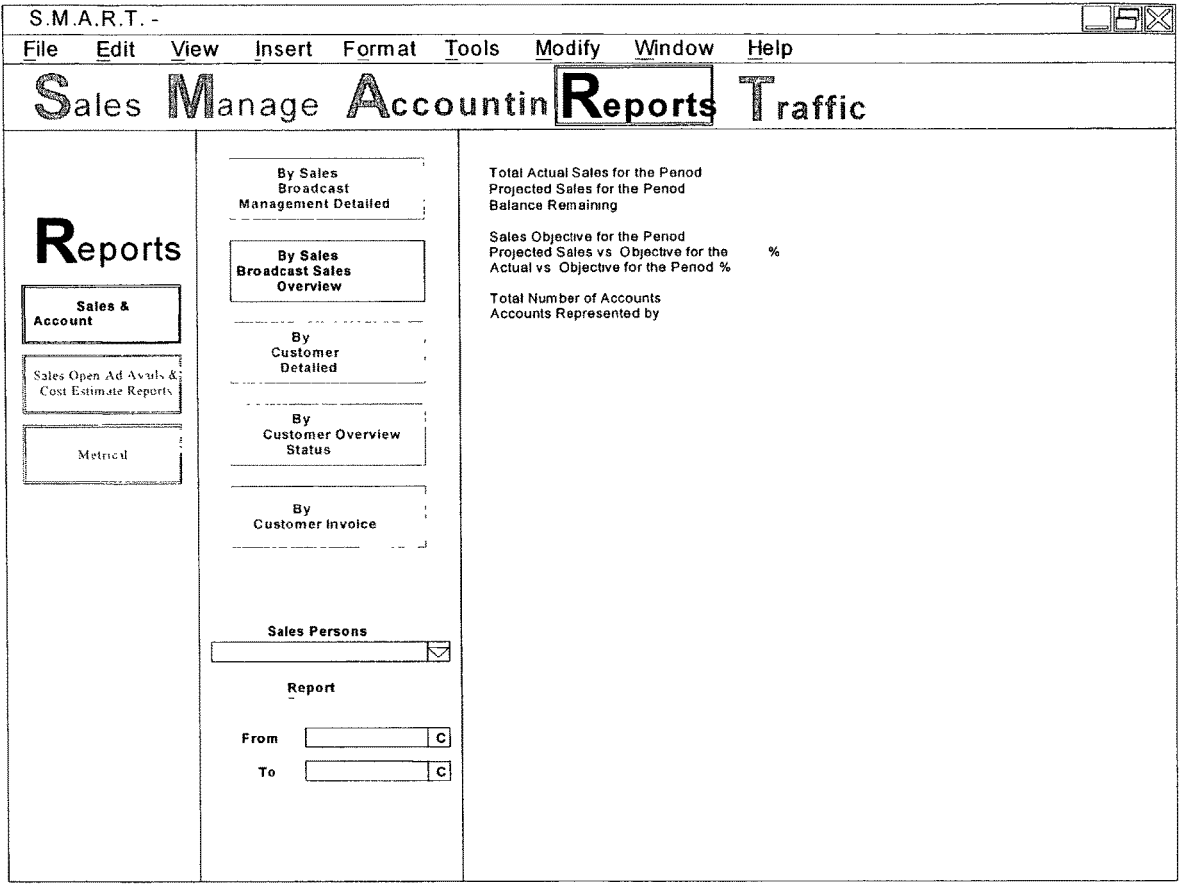
FIG. 22 illustrates a reports GUI according to another embodiment of the present invention.
Figure 23:
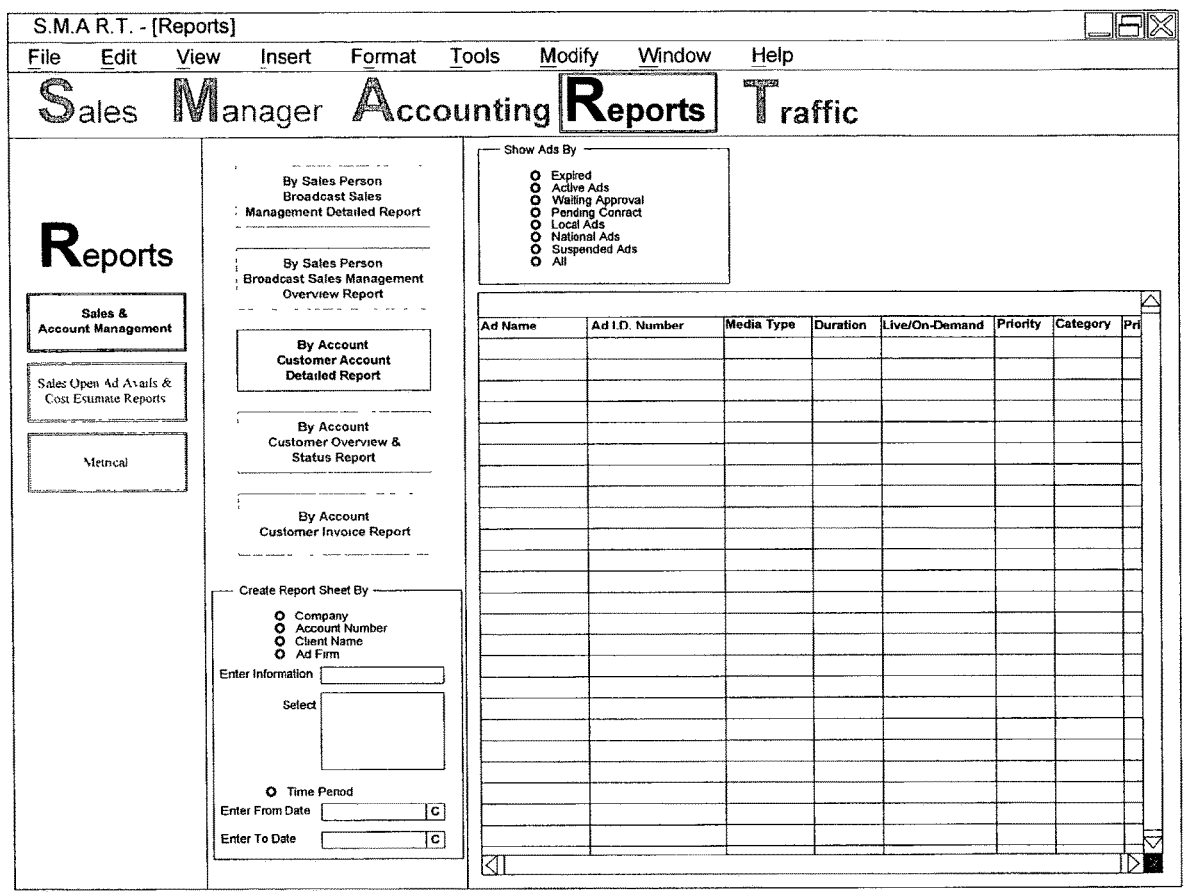
FIG. 23 illustrates a reports GUI according to another embodiment of the present invention.
Figure 25:
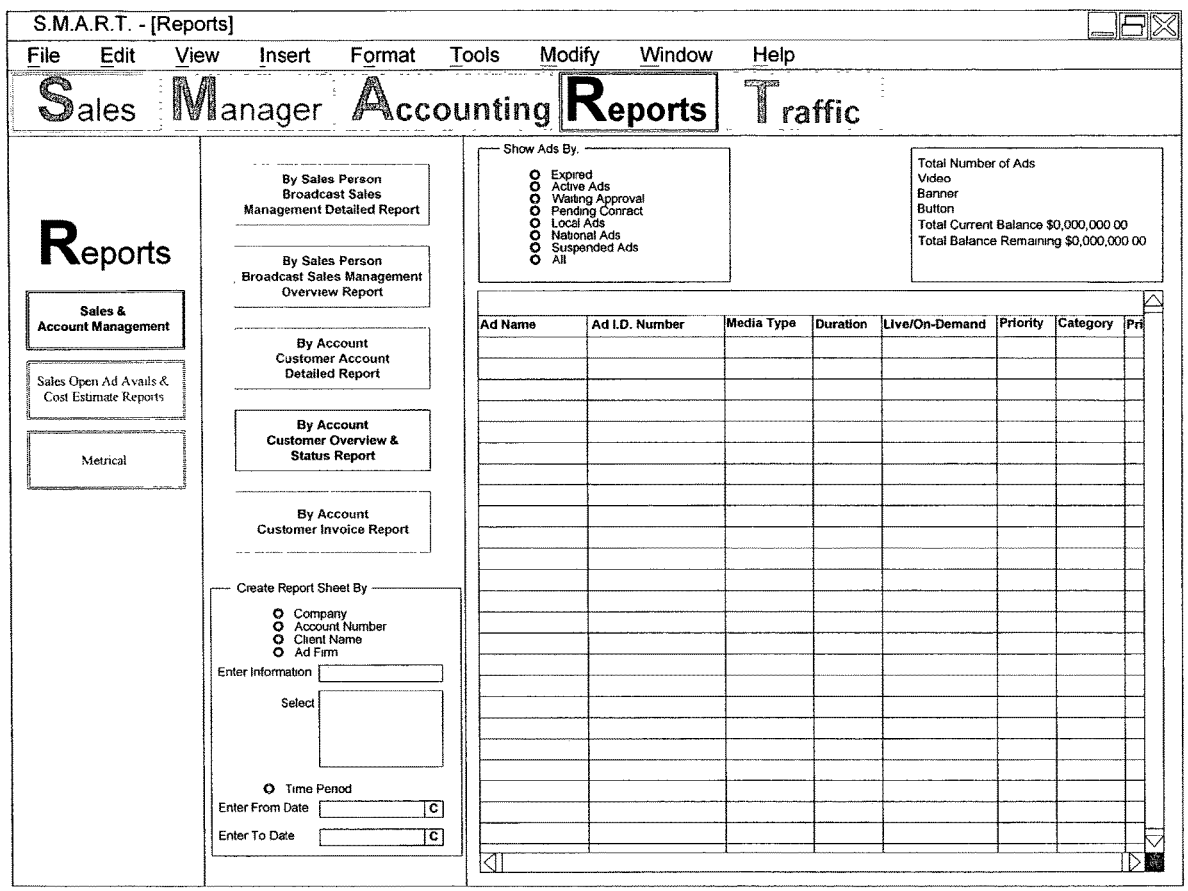
FIG. 25 illustrates a reports GUI according to another embodiment of the present invention.
Figure 37:
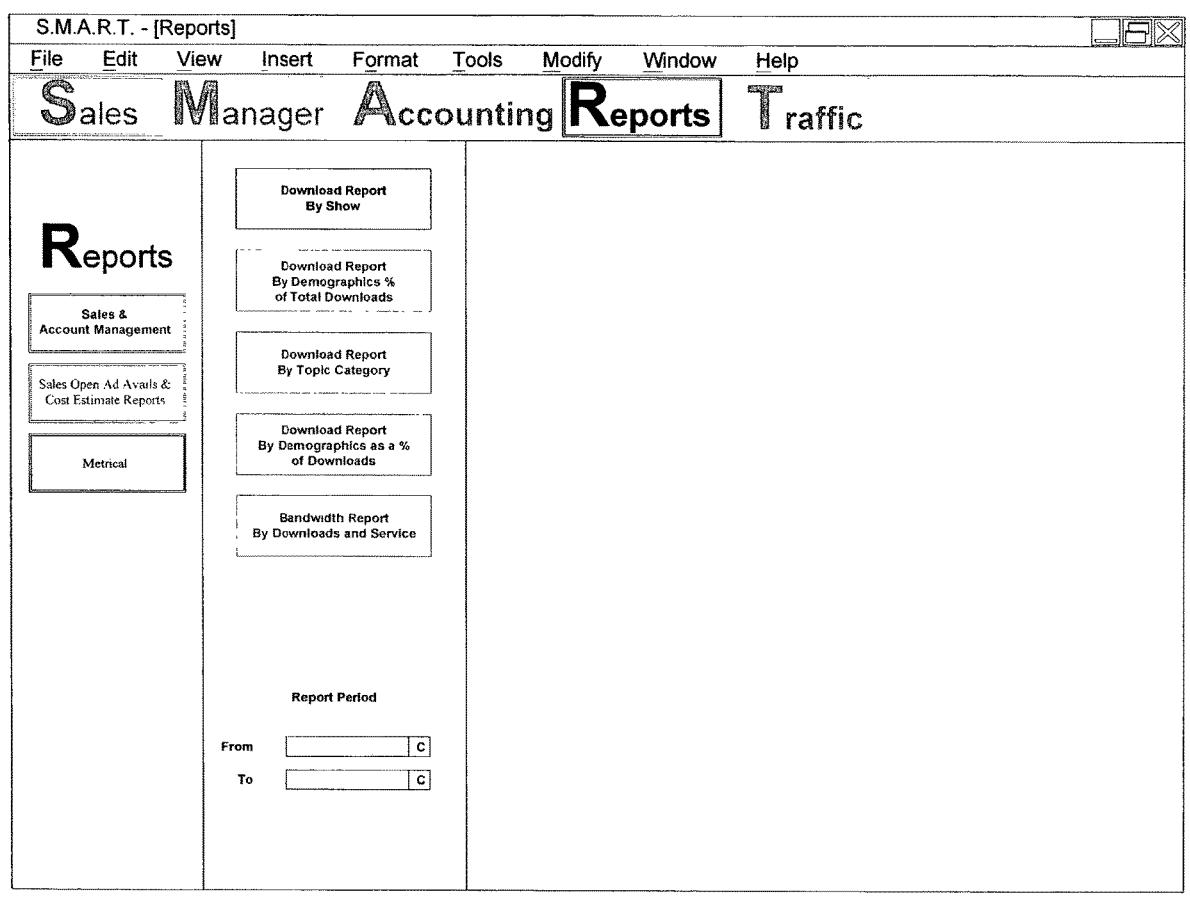
FIG. 37 illustrates a reports GUI according to another embodiment of the present invention.

FIG. 18 illustrates an accounting GUI 1800 for developing and maintaining pricing structures for advertisements, according to an embodiment of the present invention. A price structure can be assigned to an individual or group of shows as well as segments of a show. Accounting GUI 1800 enables dynamic adjustments to be made to ad pricing for live shows based on the value of a particular show and segments within.

In an embodiment, accounting module 206 can be configured to search and compile rate cards per newscast, ratings updates, price changes, available advertising slots, and like parameters.

In an embodiment, accounting module 206 monitors the expiration date, hit limit, budget parameters, or a combination of the aforementioned for an advertisement. As discussed, a sponsor can stipulate whether the duration for an advertisement is limited or unlimited. The sponsor can also specify a maximum hit target. Once an advertisement has reached its hit limit or expiration date, accounting module 206 would block the advertisement from further service. If a hit limit and expiration date both are specified, accounting module 206 can cease the advertisement service upon the occurrence of the first event or both events as requested by the sponsor. As such, accounting module 206 is able to suspend or close customer accounts (and therefore control costs to the customer), and calculate the amounts due.

Figure 19:
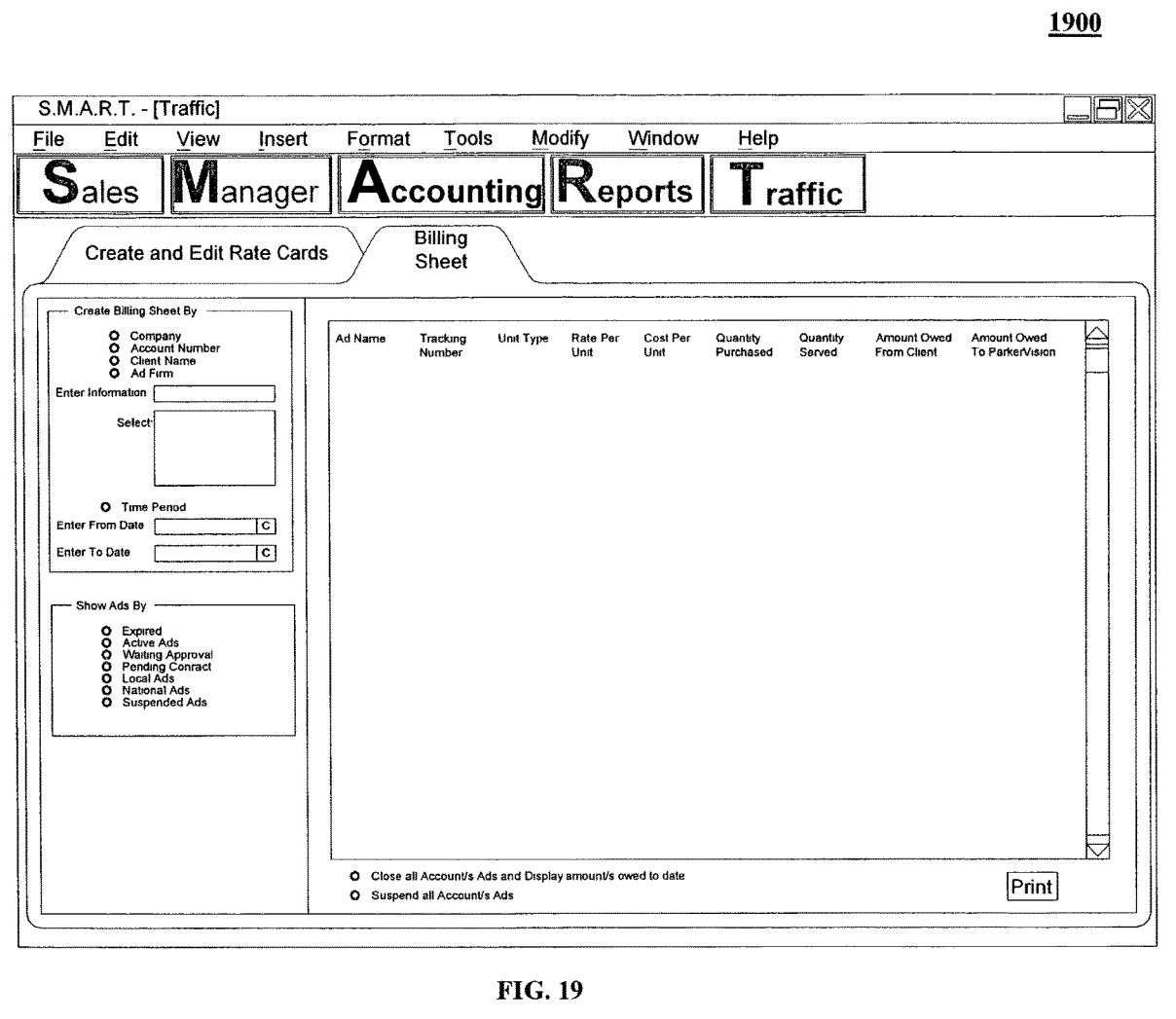

In an embodiment, accounting module 206 can be configured to log, read, archive, or format data for customized reports by specific advertisement, advertisement firm, advertised customer, and exposure comparisons against selected advertisements, topics, show schedules, and the like. FIG. 19 illustrates an accounting GUI 1900 for report polling of an advertisement campaign, according to an embodiment of the present invention. The report polling function of accounting module 206 is not used to generate invoices. Invoice reporting is implemented by reports module 208. However, accounting module 206 can compile an accounting report to show amounts owed by various criteria (e.g., company, account number, agency, time period, etc.). The criteria also include advertisement status (e.g., expired, active, suspended, waiting approval, pending contract), source (including local advertisements, national advertisements, etc.), or the like. In embodiments, the accounting reports can be fed into a proprietary billing and accounting system.

IX. Reports Module

Reports module 208 supports the other system components (e.g., sales module 202, traffic module 204, manager module 210, and accounting module 206). Reports module 208 gathers data and prepares a metric management report. A metric management report can be produced by period, show, topic, account, or the like. A metric report is prepared to assist sales and programming personnel by providing important data such as, downloads per account, context/category, show (e.g., time of broadcast), advertisement media type (i.e., video, banner, sponsorship, etc.), sales parameters, targeting data, advertisement type (i.e., local, national, promotions, announcements, classified, and the like), consumer demographics, media rotation (e.g., live or on demand), and/or the like.

The metric management reports can be customized by specific advertisement, advertisement agency, and/or advertised customer (i.e., sponsor). The reports can also be customized by exposure comparisons against selected advertisements, topics, categories, and/or show schedules. In an embodiment, the collected data is the advertisement medium that is being served. Examples of advertisement medium include video streaming advertisement, dynamic advertisement, banner advertisement, sponsorship advertisement, and the like. A sponsorship advertisement typically takes form of a banner that is used to sponsor an HTML page or streaming content. A sponsorship advertisement can be a button-like field positioned at the bottom of a data window.

Another type of collected data includes timing, duration, or both of the advertisement that is being served. Duration includes time length (in the case of video, fifteen or thirty-second advertisement spot), number of downloads and page views with respect to other types of advertisements, and the like. Various criteria can be used to monitor the timing. The criteria include topic, show, hour, day, week, month, year, and the like.

Page views and click-throughs represent another type of collected data. Page views refer to the actual number of web pages received by an online user. Click-throughs refer to the online user actually clicking on, for example, a banner advertisement to get more information on the advertised product or acknowledge that the user has considered the advertisement. The data collected in response to page views and click-throughs include statistical data with respect to consumer demographics, linked topic and show metadata, download time of day, medium of advertisement, type of advertisement, and the like.

Reports module 208 also queries, processes, or collects consumer demographic, psychographic or behavioral data. In an embodiment, the data is collected via an online user profile (e.g., age, gender, address and the like). In an embodiment, reports module 208 uses data mining techniques to gather information from third party search engines, inference engines, profiling engines, knowledge management systems, databases, and the like (such as the Acxiom® system developed by Acxiom Corporation, or the PRIZM™ system developed by Claritas™ Inc.).

In an embodiment, reports module 208 interacts with the records of sales module 202 and accounting module 206 to report sales and costs reports. Reports module 208 prepares sales and account management reports that can be filtered per sales representative. Such reports can present actual and/or projected sales, open accounts, closed accounts, historical sales ranking, invoicing, or the like.

Reports module 208 can also prepare sales open advertising avails and cost estimate reports. Such reports can present unsold spots or avails, or display examples of differing cost estimates for advertisements based on the price structure set in accounting module 206.

In an embodiment, reports module 208 queries sales module 202 to prepare a sales report identifying open spots or avails that can be sold. The sales report can be filtered by time period or like criteria. The sales report can also include sales fulfillment and pricing statistics by account, show, topic, content medium, targeting, advertisement duration (e.g., days, months and year), and the like. In an embodiment, reports module 208 interacts with sales module 206 and accounting module 206 to prepare a rate card report that specifies the available pricing schemes for selling advertisement space.

Figure 7:
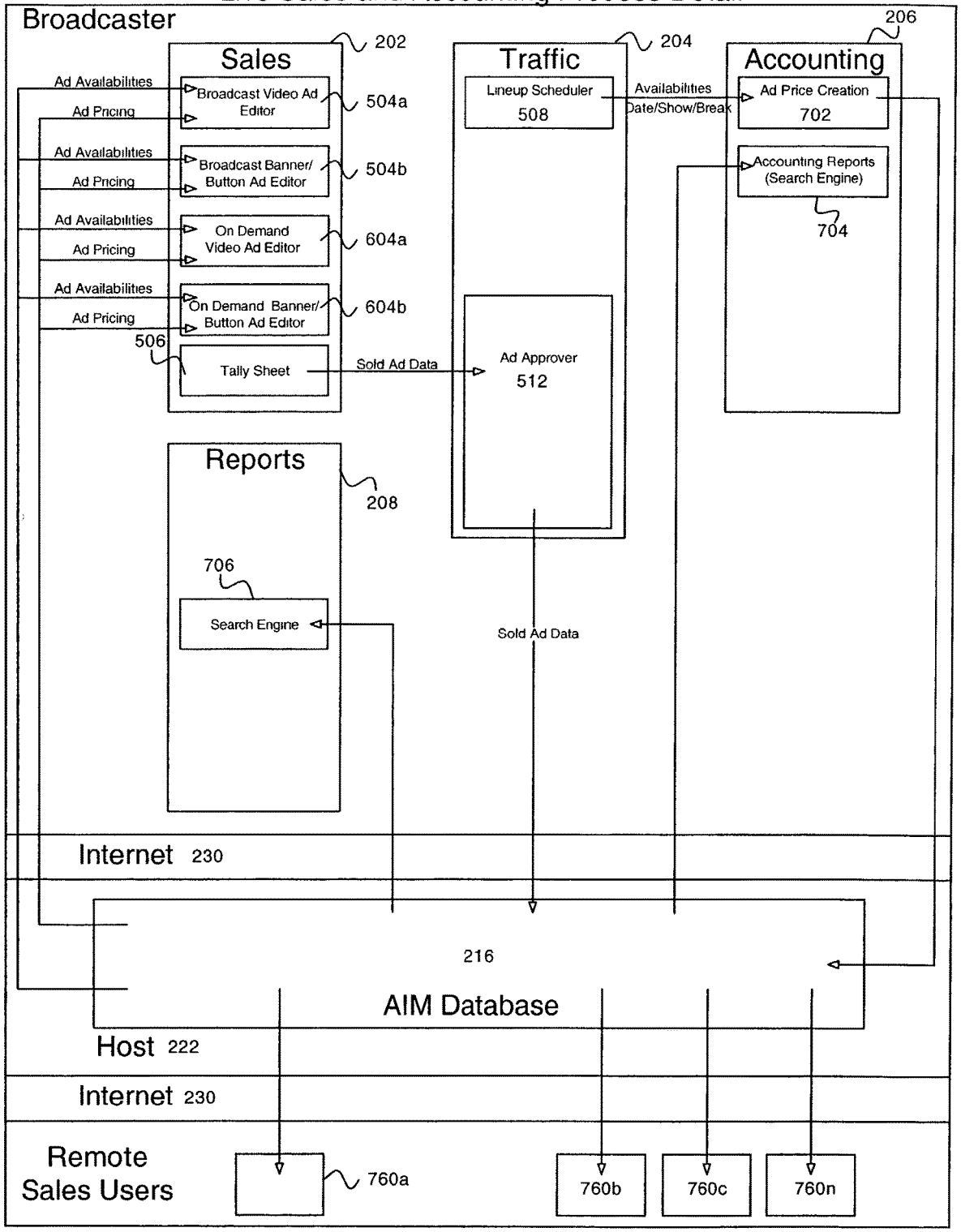
FIG. 7 illustrates an advertisement management system for sales, accounting, trafficking and reporting according to an embodiment of the present invention.

An exemplary system illustrating the interaction among reports module 208, accounting module 206 and other system components are shown in FIG. 7. Accounting module 206 includes Ad price creation application 702. Ad price creation 702 queries AIM database 216 for information used to establish the price structure for linear and non-linear advertising. The price structure is stored in AIM database 216. For "live" and "as live" rotations, Ad price creation application 702 associates the availabilities data (i.e., lineup schedule) from lineup scheduler 508 with the price structure, and stores the availabilities and associated price data in AIM database 216.

Accounting module 206 also includes an accounting reports engine 704 for querying AIM database 216 to support the pricing, collections and account monitoring, and recording-keeping functionalities, as described above. Also, as described above, sales module 202 queries AIM database 216 for availabilities and ad pricing data used to support live, as-live, and on-demand sales functions. Ad approver 512 of traffic module 204 updates the records of AIM database 216 upon association and approval of advertisements tallied by tally sheet application 506 of sales module 202.

Reports module 208 includes a reports search engine 706 that queries and processes the records of AIM database 216 to prepare the various reports as described above. FIGS. 21-37 illustrates various GUIs that enable an authorized operator to access reports module 208 to produce reports as described herein. The present invention is not limited to the format and data illustrated in FIGS. 21-37. As would be apparent to one skilled in the relevant art(s) other types of reports and formats can be prepared.

In an embodiment, remote sales users 760a-760n represent affiliate advertising systems 404(a)-404(n), as described above. As such, sales, accounting, and/or traffic personnel and the like from remote locations or affiliate entities are able to synchronize their local operations with AIM database 216 as previously discussed.

X. Manager Module

Manager module 210 oversees and manages the operations of the other system components. Accordingly, manager module 210 implements and enables modification to system policies and rules. Additionally, manager module 210 maintains system and data integrity and controls access to various features, functions, and data. In embodiments, manager module 210 establishes a security protocol (e.g., user authorization, user roles, etc.) to protect system and data integrity while an operator is entering and setting advertisement prices.

For instance, a user profile can be established to grant administrative access to a particular system operator. As such, manager module 210 grants unlimited access to all system components, functions, and data. However, if the user profile designates limited or restricted access at a macro level or a micro level. Manager module 210 defines a user role to limit access to designated components.

Figure 38:
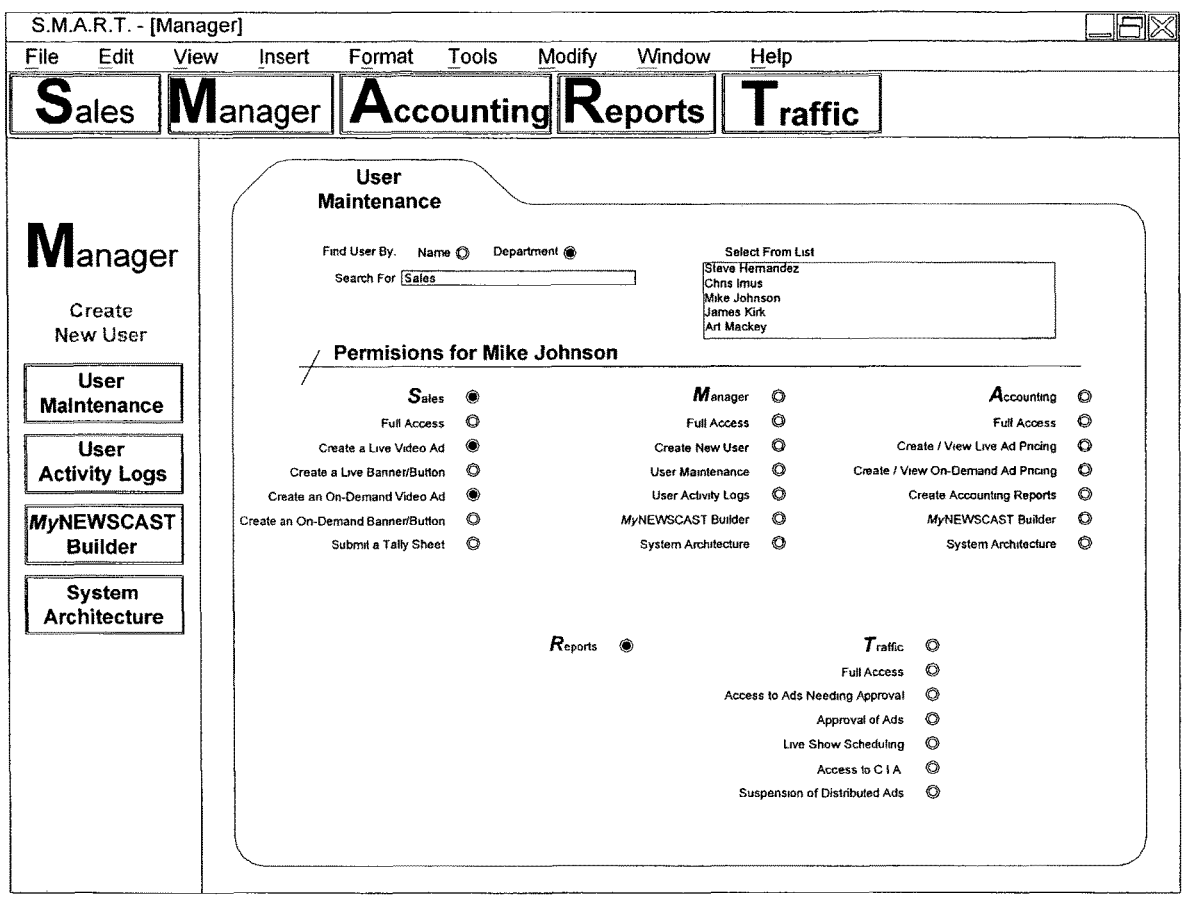
FIG. 38 illustrates a manager GUI according to an embodiment of the present invention.
Figure 40:
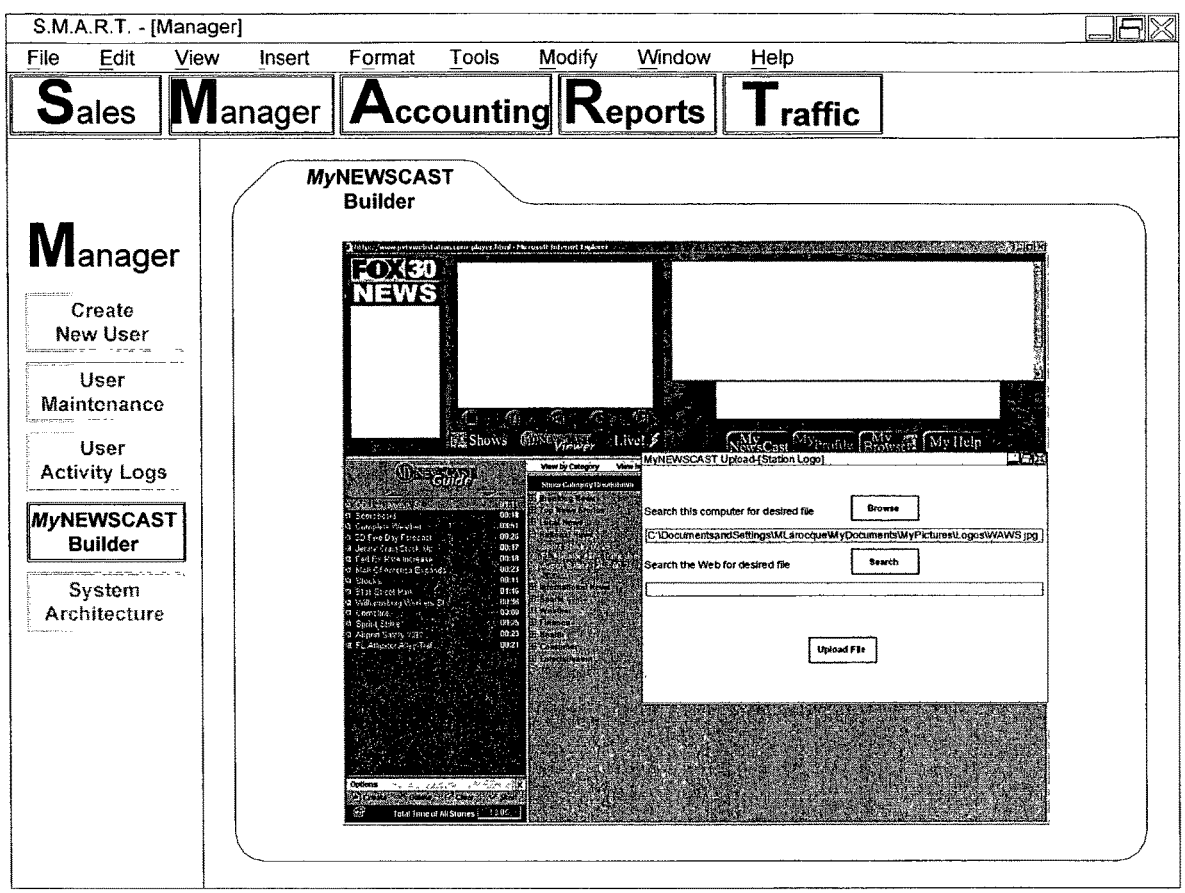
FIG. 40 illustrates a manager GUI according to another embodiment of the present invention.

FIG. 38 illustrates a manager GUI 3800 useful for setting authorization or user roles according to an embodiment of the present invention. For example, a sales representative can be authorized to create new customer accounts via sale module 202 and query price rates from accounting module 206, but can be restricted from being able to change a price rate. Similarly, an accounting representative can be authorized to alter price rates in accounting module 206, but restricted from associating or disassociating a price rate from a customer. Manager module 210 can grant limited access to the reporting functions of reports module 208, approval and preview rights in relations to traffic module 204, or editing rights to the descriptive metadata for media stored in advertisements bank 212. In embodiments, manager module 210 can enable users to alter the branding of media players (such as client display 2000 described with reference to FIG. 20) that are distributed to client-recipients to display the advertisements and linked media productions. FIG. 40 illustrates an embodiment of a manager GUI 4000 that enables authorized operators to change the branding of a media player.

Figure 39:
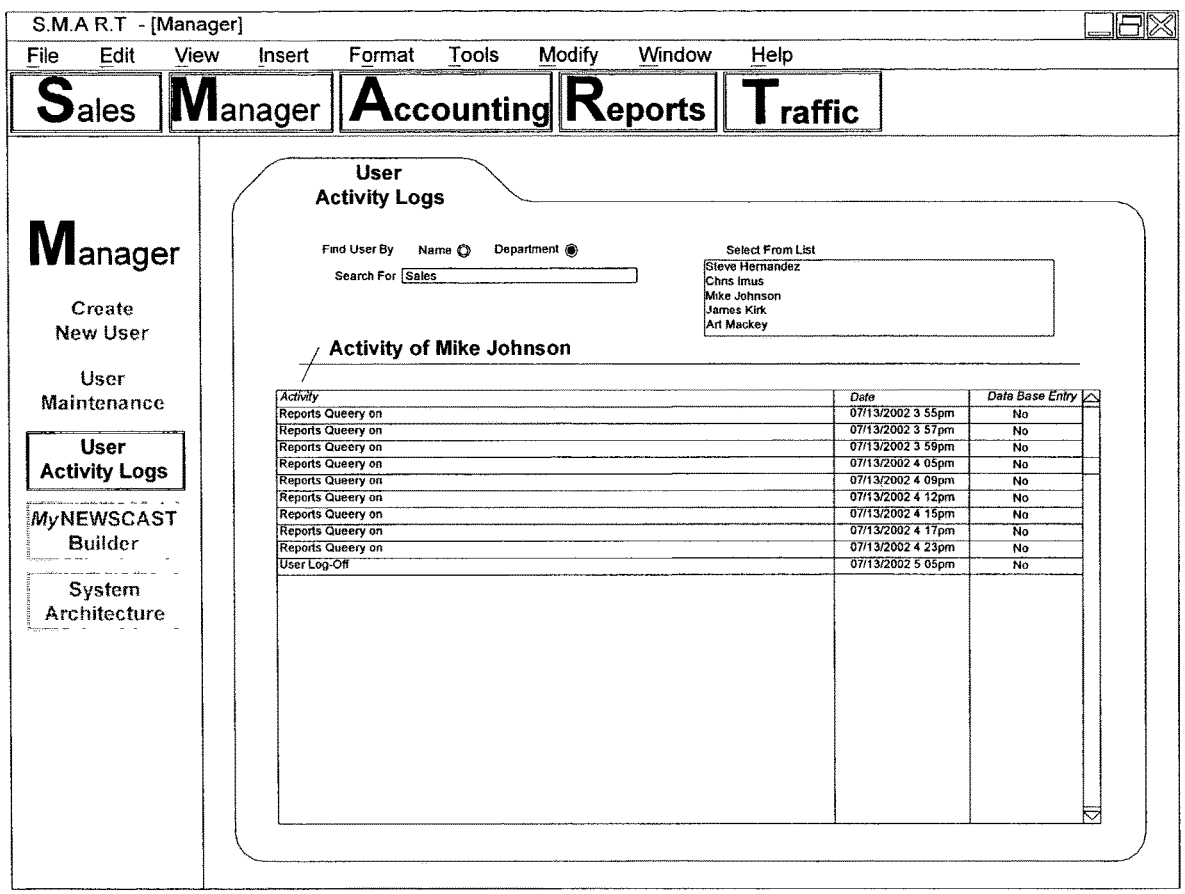
FIG. 39 illustrates a manager GUI according to another embodiment of the present invention.

Manager module 210 also controls user identification and user authentication functions. Passwords, biometrics data, user cards, and/or the like can be stored and verified to secure access to system 200. Manager module 210 can monitor and track each user's access and utilization of system 200. FIG. 39 illustrates an embodiment of a manager GUI 3900 that enables user activity to be monitored and tracked.

Figure 41:
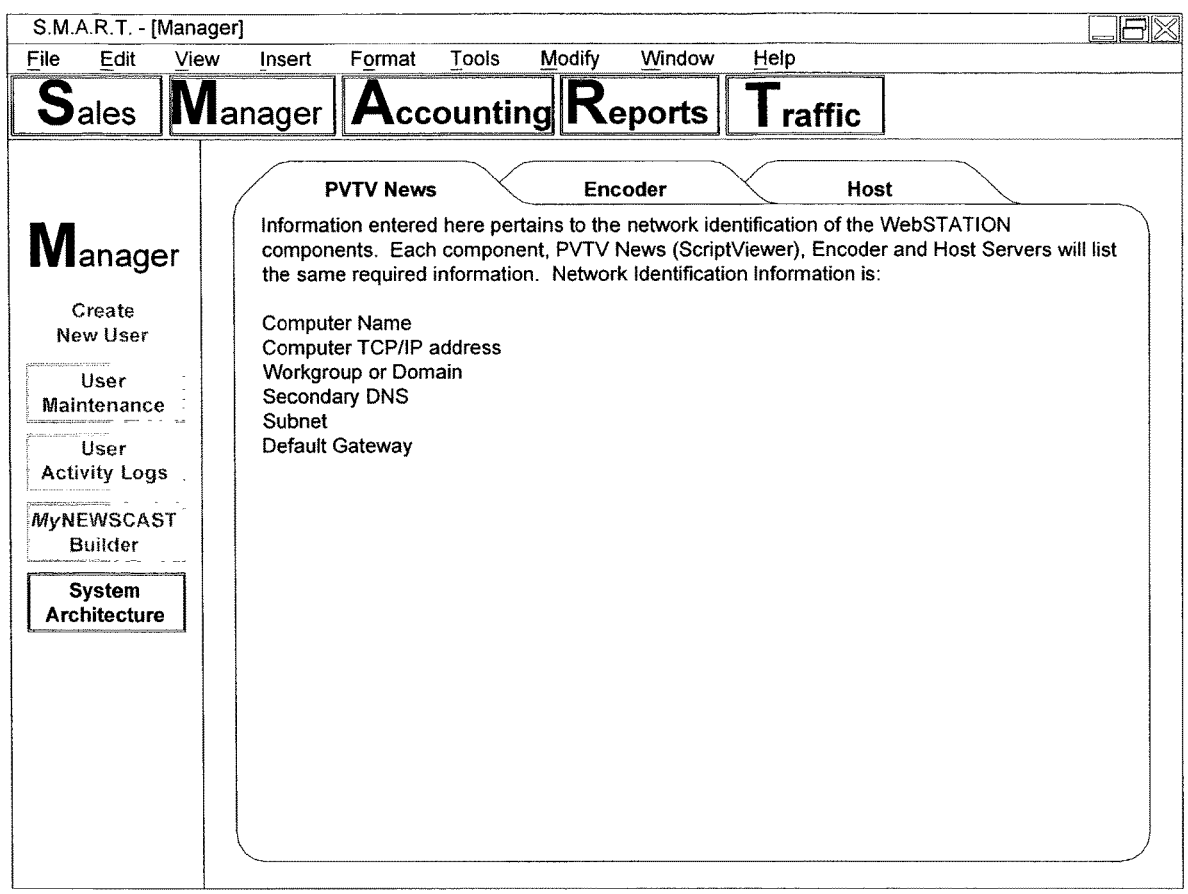
FIG. 41 illustrates a manager GUI according to another embodiment of the present invention.

Manager module 210 maintains the integrity of addresses to the contents of system 200, as well as the data table and file structures of the content. Manager module 201 enables changes to architectural addresses and host server file structure. This includes a computer name, TCP/IP address, workgroup or domain, secondary DNS, subnet, default gateway, and/or the like. FIG. 41 illustrates an embodiment of a manager GUI 4100 that allows an authorized operator to change the architectural addresses and host server file structure.

XI. Exemplary System Implementation

FIGS. 1-43 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 44:
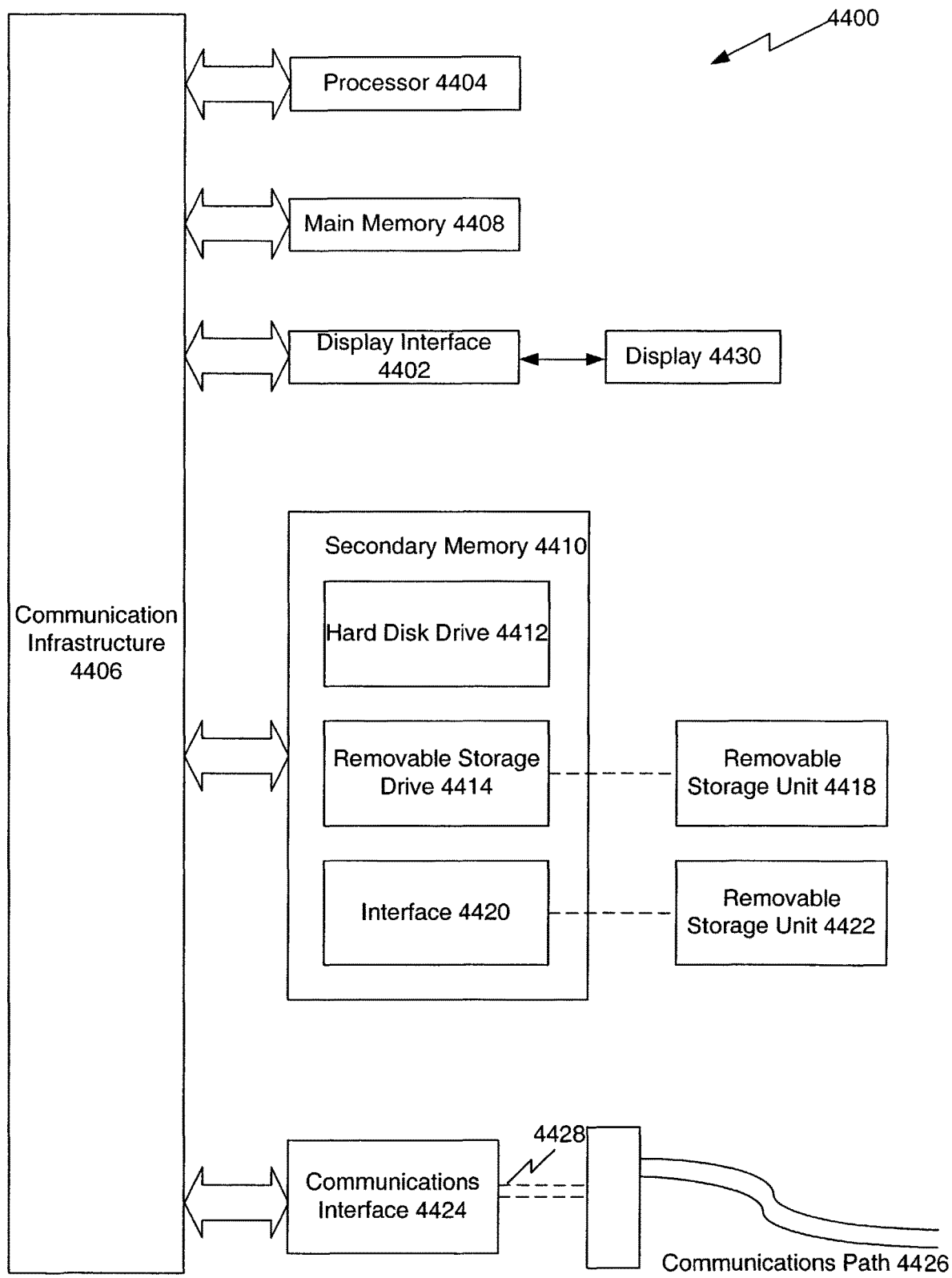
FIG. 44 illustrates an example computer system useful for implementing the present invention.

Additionally, the present invention can be implemented in one or more computer systems or other processing systems, capable of carrying out the functionality described herein. Referring to FIG. 44, an example computer system 4400 useful in implementing the present invention is shown. Various embodiments are described in terms of this exemplary computer system 4400. After reading this description, it will become apparent to a person skilled in the relevant art(s) how to implement the invention using other computer systems and/or computer architectures.

The computer system 4400 includes one or more processors, such as processor 4404. Processor 4404 can be a special purpose or a general purpose digital signal processor. The processor 4404 is connected to a communication infrastructure 4406 (e.g., a communications bus, cross-over bar, or network), such as, for example, communication infrastructure 214 and communication infrastructure 230.

Computer system 4400 can include a display interface 4402 that forwards graphics, text, and other data from the communication infrastructure 4406 (or from a frame buffer not shown) for display on the display unit 4430.

Computer system 4400 also includes a main memory 4408, preferably random access memory (RAM), and can also include a secondary memory 4410. The secondary memory 4410 can include, for example, a hard disk drive 4412 and/or a removable storage drive 4414, representing a floppy disk drive, a magnetic tape drive, an optical disk drive, etc. The removable storage drive 4414 reads from and/or writes to a removable storage unit 4418 in a well-known manner. Removable storage unit 4418, represents a floppy disk, magnetic tape, optical disk, etc. which is read by and written to removable storage drive 4414. As will be appreciated, the removable storage unit 4418 includes a computer usable storage medium having stored therein computer software (e.g., programs or other instructions) and/or data.

In alternative embodiments, secondary memory 4410 includes other similar means for allowing computer programs or other instructions to be loaded into computer system 4400. Such means include, for example, a removable storage unit 4422 and an interface 4420. Examples of such means include a program cartridge and cartridge interface (such as that found in video game devices), a removable memory chip (such as, an EPROM or PROM) and associated socket, and other removable storage units 4422 and interfaces 4420 which allow software and data to be transferred from the removable storage unit 4422 to computer system 4400.

Computer system 4400 can also include a communications interface 4424. Communications interface 4424 allows software and/or data to be transferred between computer system 4400 and external devices. Examples of communications interface 4424 include a modem, a network interface (such as an Ethernet card), a communications port, a PCM-CIA slot and card, etc. Software and data transferred via communications interface 4424 are in the form of signals 4428 which can be electronic, electromagnetic, optical or other signals capable of being received by communications interface 4424. These signals 4428 are provided to communications interface 4424 via a communications path (i.e., channel) 4426. Communications path 4426 carries signals 4428 and can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 4418, removable storage unit 4422, a hard disk installed in hard disk drive 4412, and signals 4428. These computer program products are means for providing software to computer system 4400. The invention, in an embodiment, is directed to such computer program products.

Computer programs (also called computer control logic or computer readable program code) are stored in main memory 4408 and/or secondary memory 4410. Computer programs can also be received via communications interface 4424. Such computer programs, when executed, enable the computer system 4400 to implement the present invention as discussed herein. In particular, the computer programs, when executed, enable the processor 4404 to implement the processes of the present invention, such as the method(s) implemented using system 200, sales module 202, traffic module 204, accounting module 206, reports module 208, manager module 210, advertisements bank 212, and/or other system components of system 200 described above, such as methods 100 and/or 300a-300b, for example. Accordingly, such computer programs represent controllers of the computer system 4400.

In an embodiment where the invention is implemented using software, the software can be stored in a computer program product and loaded into computer system 4400 using removable storage drive 4414, hard drive 4412 or communications interface 4424. The control logic (software), when executed by the processor 4404, causes the processor 4404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

XII. Conclusion

The foregoing description of the specific embodiments will so fully reveal the general nature of the invention that others can, by applying knowledge within the skill of the art (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A system for distributing advertising to multiple viewers not only across a broadcast network of media channels, but also across a non-broadcast, client-server network, comprising:

sales means for selecting at least one advertisement in accordance with a predetermined multi-platform advertising campaign for available viewing by a plurality of viewers not only linearly across a broadcast network of media channels having a first communications protocol, but also non-linearly across a non-broadcast, client-server network having a second communications protocol different from the first communications protocol;

accounting means for setting a price structure for said at least one selected advertisement in accordance with the predetermined multi-platform advertising campaign for available viewing by the plurality of viewers not only linearly across the broadcast network of media channels, but also non-linearly across the non-broadcast, client-server network;

trafficking means for controlling distribution of said at least one selected advertisement for available viewing by the plurality of viewers not only linearly across the broadcast network of media channels, but also non-linearly across the non-broadcast, client-server network;

wherein the trafficking means is configured to generate an availabilities list of available time spots for advertisements to be not only linearly integrated with a video media production to form a first video media-advertisement production combination to be broadcast across the broadcast network of media channels, but also non-linearly integrated with the video media production to form a second video media-advertisement production combination to be displayed across the non-broadcast, client-server network;

wherein the trafficking means is further configured to populate the availabilities list with said at least one selected advertisement in accordance with the predetermined multi-platform advertising campaign for available viewing by the plurality of viewers not only linearly across a broadcast network of media channels, but also non-linearly across a non-broadcast, client-server network;

wherein the trafficking means is further configured to linearly integrate, encode, and link one or more of said at least one selected advertisement with the video media production to form the first video media-advertisement production combination;

wherein the trafficking means is further configured to non-linearly integrate, encode, and link one or more of said at least one selected advertisement with the video media production to form the second video media-advertisement production combination;

wherein the first video media-advertisement production combination comprises a same media content of the video media production as the second video media-advertisement production combination;

wherein the trafficking means includes means for generating production coded metadata when the video media production is generated and encoding the video media production with the production coded metadata to identify the available time spots of the video media production for advertisements to be not only linearly integrated with the video media production to form the first media-advertisement production combination to be broadcast across the broadcast network of media channels, but also non-linearly integrated within the video media production to form the second video media-advertisement production combination to be displayed across the non-broadcast, client-server network;

wherein the production coded metadata comprises a filename identifier, a path to storage location identifier, a path to an auxiliary client-server uniform resource location information storage location identifier, a segment mark identifier that identifies different segments of the video media production, a segment name identifier, a segment content category identifier, and a segment runtime length identifier;

wherein the trafficking means is configured to convert, format, compress, packetize and multiplex the video media production into hypertext markup language so as to form the second video media-advertisement production combination to be displayed across the non-broadcast, client-server network;

wherein the second video media-advertisement production combination comprises an enhanced media production that includes the production coded metadata and the auxiliary client-server uniform resource location information, such that the production coded metadata configures a viewing device that receives the second video media-advertisement production combination across the non-broadcast, client-server network to automatically access the integrated, encoded, and linked one or more selected advertisements using the auxiliary client-server uniform resource location information to be displayed non-linearly with the enhanced media production; and wherein the trafficking means is configured to control distribution of the first and second video media-advertisement production combinations across a distributed and hierarchical network of national and local broadcast and non-broadcast media delivery nodes each configured to control distribution of the first and second video media-advertisement production combinations based on not only a national advertisement campaign, but also based on a local advertisement campaign.

2. The system of claim 1, further comprising:
means for associating said at least one selected advertisement to at least one of a pricing rate, a media rotation schedule, a media priority, a distribution time, a category associated with a media production, a duration for servicing said advertisement, and/or a maximum quantity for distributing said advertisement.

3. The system of claim 1, further comprising security means for establishing a security protocol, said security protocol configurable to govern at least one of user access and user control of at least one system components.

4. The system of claim 1, further comprising logging means for monitoring user activity.

5. The system of claim 1, further comprising addressing means for enabling changes to at least one of architectural addresses and host server file structure.

6. The system of claim 1, further comprising branding means for modifying branding of a player capable of displaying said at least one advertisement.

7. The system of claim 1, wherein said trafficking means comprises: encoding means for encoding said at least one advertisement for distribution.

8. The system of claim 1, wherein said trafficking means comprises: monitoring means for tracking changes in status of said at least one advertisement.

9. The system of claim 1, further comprising: insertion means for embedding said at least one selected advertisement in a media stream at a designated point of insertion.

10. The system of claim 1, wherein the user interface enables the system administrator to review the suitability of said at least one selected advertisement with the content of the media production.

11. The system of claim 1, wherein prior to the selecting of said at least one advertisement, the trafficking means is configured to interact interacts with an advertisement bank storing said at least one selected advertisement, and wherein after the selecting of said at least one advertisement, the at least one selected advertisement is published to an advertisement server.

12. The system of claim 11, wherein after said at least one selected advertisement is published to the advertisement server, said at least one selected advertisement at the advertisement server is integrated with the media production located at a media server.

13. The system of claim 1, further comprising:
presenting said at least one selected advertisement to a system administrator via a user interface for approval prior to distribution of the media production.

14. The system of claim 1, wherein the available time spots comprise both linear spots comprising openings between content segments in a media production and non-linear spots.

15. The system of claim 1, wherein the price structure comprises different pricing associated with the broadcast medium and the internet.

16. The system of claim 15, wherein the price structure is set using a broadcast model based on content or time period and a second model for distribution on the internet predicated on user demand or content criteria associated with the internet.

17. The system of claim 1, further comprising means for allowing a selection of a media priority for said at least one selected advertisement, including an exclusive status.

18. The system of claim 1, further comprising means for allowing a selection of a media priority for said at least one selected advertisement, including a targeted status.

19. The system of claim 1, further comprising means for allowing a selection of a media priority for said at least one selected advertisement, including an exclusive status, a targeted status, and a non-targeted status.

20. The system of claim 19, wherein the availabilities list is populated to insert all exclusive advertisements, thereafter to fill remaining openings with corresponding targeted advertisements, and thereafter to fill remaining openings with non-targeted advertisements.

21. The system of claim 1, further comprising reporting means for producing statistics related to said at least one selected advertisement for available viewing by the plurality of viewers not only linearly across the broadcast network of media channels, but also non-linearly across the non-broadcast, client-server network.

22. The system of claim 1, wherein neither the broadcast network of media channels, nor the non-broadcast, client-server network include a program guide menu that is configured to allow a viewer to select a desired broadcast channel to view media productions.

23. The system of claim 1, further comprising:
means for receiving, at a user interface, an identification of at least one advertisement;
means for presenting, at the user interface, an option for distribution of the at least one advertisement over a broadcast medium and an option for distribution of the at least one advertisement over the internet, wherein the trafficking means generate an availabilities list comprising available time spots for advertisements in a video media production for distribution on the broadcast medium when a user selection is received for the option for distribution of the at least one advertisement over a broadcast medium and comprising available linear avails and non-linear avails for advertisements in the media production for distribution on the internet when a user selection is received for the option for distribution of the at least one advertisement over the internet; and
means for presenting a price structure at the user interface for distributing the at least one advertisement in the corresponding available time spots and avails in the availabilities list at an accounting module in communications with a sales module, wherein the trafficking means populates the availabilities list with said at least one selected advertisement based on a user selection.

24. The system of claim 1, wherein the one or more of the at least one selected advertisement comprises a first selected advertisement format that the trafficking means is configured to linearly integrate, encode, and link with the video media production to form the first video media-advertisement combination and a second selected advertisement format that the trafficking means is configured to non-linearly integrate, encode, and link with the video media production to form the second video media-advertisement production combination.

25. The system of claim 24, wherein the first selected advertisement format is different from the second selected advertisement format.

26. The system of claim 1, wherein the auxiliary client-server uniform resource location information comprises a hyperlink to a website associated with the second video media-advertisement production combination.

27. The system of claim 1, wherein the auxiliary client-server uniform resource location information comprises a hyperlink to a website associated with the second video media-advertisement production combination.

28. The system of claim 1, wherein the non-broadcast media delivery nodes are servers for distribution of the second media-advertisement production combination across a client-server network.

29. A multi-platform advertising and video media production system for managing, integrating, and automating national and local advertising campaigns across not only a broadcast network of media channels, but also a non-broadcast network of client-server websites, comprising:
sales means for gathering data from a local network indicative of open advertisement availabilities insertion of national ads managed by a master network for distribution on a broadcast network of media channels, but also for non-linear integration and for advertisements in a video media production for distribution on a non-broadcast network of client-server websites, and for selecting at least one advertisement for available viewing by a plurality of viewers;
accounting means for setting a price structure for said at least one selected advertisement;
trafficking means for controlling distribution of said at least one selected advertisement for available viewing by the plurality of viewers not only not across the broadcast network of media channels, but also across the non-broadcast network of client-server websites;
wherein the trafficking means is configured to generate an availabilities list of available time spots for advertisements in the video media production to be not only broadcast on the broadcast network of media channels, but also served on the non-broadcast network of client-server websites;

wherein the trafficking means is further configured to populate the availabilities list with said at least one selected advertisement, linearly integrate and encode at least one of the at least one selected advertisement in the video media production to form a first video media-advertisement production combination that is configured to be broadcast across the broadcast network of media channels, and non-linearly integrate and encode at least one of the at least one selected advertisement in the video media production to form a second video media-advertisement production combination that is configured to be served across the non-broadcast, client-server network;

wherein the first video media-advertisement production combination comprises a same media content of the video media production as the second video media-advertisement production combination;

wherein the trafficking means includes means for generating production coded metadata and encoding the video media production with the production coded metadata to identify the available time spots of the video media production for advertisements to be not only linearly integrated with the video media production to form the first media-advertisement production combination to be broadcast across the broadcast network of media channels, but also non-linearly integrated within the video media production to form the second video media-advertisement production combination to be displayed across the non-broadcast, client-server network; and wherein the production coded metadata comprises segment mark identifiers that identify respective segments of the video media production and configures a viewing device that receives the second video media-advertisement production combination across the non-broadcast, client-server network to automatically access the non-linearly integrated and encoded at least one selected advertisements to be displayed non-linearly thereon.

30. The system of claim 29, further comprising:
reporting means for producing statistics related to said at least selected one advertisement for available viewing by the plurality of viewers not only linearly across the broadcast network of media channels, but also non-linearly across the non-broadcast, client-server network.

31. The system of claim 30, wherein the reporting means gathers data from the local network to report ad and statistical information to at least one of national advertising clients, local network owners, and content producers to determine revenue portion of national advertising allotments associated with insertion of national advertisements.

32. The system of claim 29, further comprising: means for presenting the at least one selected advertisement to a system administrator via a user interface for approval prior to distribution of the media production.

33. The system of claim 29, wherein the time available spots comprise both linear spots comprising openings between content segments in a media production and non-linear spots.

34. The system of claim 29, wherein the price structure comprises different pricing associated with the broadcast medium and the internet.

35. The system of claim 29, wherein neither the broadcast network of media channels, nor the non-broadcast, client-server network include a program guide menu that is configured to allow a viewer to select a desired broadcast channel to view media productions.

36. The system of claim 29, wherein the selected advertisement comprises a first selected advertisement format that the trafficking means is configured to linearly integrate, encode, and link with the video media production to form the first video media-advertisement combination and a second selected advertisement format that the trafficking means is configured to non-linearly integrate, encode, and link with the video media production to form the second video media-advertisement production combination.

37. The system of claim 36, wherein the first selected advertisement format is different from the second selected advertisement format.

38. The system of claim 29, wherein the auxiliary client-server uniform resource location information comprises a hyperlink to a website associated with the second video media-advertisement production combination.

39. The system of claim 29, wherein the auxiliary client-server uniform resource location information comprises a hyperlink to a website associated with the second video media-advertisement production combination.

40. The system of claim 29, wherein the production coded metadata further comprises a file name, a path to storage location identifier, a path to an auxiliary client-server uniform resource location information storage location identifier, a segment name identifier, a segment content category identifier and a segment runtime length identifier.

41. The system of claim 29, wherein the trafficking means is configured to convert, format, compress, packetize and multiplex the video media production into hypertext markup language so as to form the second video media-advertisement production combination to be displayed across the non-broadcast, client-server network.

42. The system of claim 41, wherein the second video media-advertisement production combination comprises an enhanced media production that includes the production coded metadata and the auxiliary client-server uniform resource location information.

43. The system of claim 29, wherein the trafficking means is configured to control distribution of the first and second video media-advertisement production combinations across a distributed and hierarchical network of national and local broadcast and non-broadcast media delivery nodes each configured to control distribution of the first and second video media-advertisement production combinations based on not only a national advertisement campaign, but also based on a local advertisement campaign.

44. The system of claim 43, wherein the non-broadcast media delivery nodes are servers for distribution of the second media-advertisement production combination across a client-server network.

45. The system of claim 29, wherein the means for generating production coded metadata produces the coded metadata as the video media production is generated.

46. A media production and advertising management system for distributing advertising to multiple viewers not only across a broadcast network of media channels, but also across a non-broadcast, client-server network, comprising:

trafficking means for controlling distribution of at least one selected advertisement in combination with a media production for available viewing by a plurality of viewers not only linearly across a broadcast network of media channels, but also non-linearly across a non-broadcast, client-server network;

wherein the trafficking means is configured to generate an availabilities list of available time spots for advertisements to be not only linearly integrated with the media production to form a first media-advertisement production combination to be broadcast across the broadcast network of media channels, but also non-linearly integrated within the media production to form a second media-advertisement production combination to be displayed across the non-broadcast, client-server network;

wherein the trafficking means is further configured to populate the availabilities list with the at least one selected advertisement for available viewing by the plurality of viewers not only linearly across the broadcast network of media channels, but also non-linearly across the non-broadcast, client-server network;

wherein the trafficking means is further configured to linearly integrate, encode, and link one or more of said at least one selected advertisement with the media production to form the first media-advertisement production combination;

wherein the trafficking means is further configured to non-linearly integrate, encode, and link one or more of said at least one selected advertisement with the media production to form the second video media-advertisement production combination;

wherein the first video media-advertisement production combination comprises a same media content of the video media production as the second video media-advertisement production combination;

wherein the trafficking means includes means for encoding the media production with the production coded metadata so as to at least partially define the available time spots of a media production for a selected advertisement to be not only linearly integrated with the media production to form the first media-advertisement production combination to be broadcast across the broadcast network of media channels, but also non-linearly integrated within the media production to form the second media-advertisement production combination to be displayed across the non-broadcast, client-server network;

wherein the production coded metadata comprises a segment mark identifier that identifies different segments of a media production so as to at least partially define the available time spots of the media production for a selected advertisement to be not only linearly integrated with the media production to form the first media-advertisement production combination to be broadcast across the broadcast network of media channels, but also non-linearly integrated within the media production to form the second media-advertisement production combination to be displayed across the non-broadcast, client-server network;

wherein the trafficking means is further configured to convert, format, compress, packetize and multiplex the media production into hypertext markup language so as to form the second media-advertisement production combination to be displayed across the non-broadcast, client-server network;

wherein the second media-advertisement production combination comprises an enhanced media production that includes the production coded metadata and auxiliary client-server uniform resource location information, such that the production coded metadata configures a viewing device that receives the second video media-advertisement production combination across the non-broadcast, client-server network to access the non-linearly integrated, encoded, and linked one or more selected advertisements using the auxiliary client-server uniform resource location information to be displayed non-linearly with the enhanced media production, and wherein the trafficking means is configured to control distribution of the first and second media-advertisement production combinations across a distributed and hierarchical network of national and local broadcast and non-broadcast media delivery nodes each configured to control distribution of the first and second media-advertisement production combinations based on not only a national advertisement campaign, but also based on a local advertisement campaign.

47. The system of claim 46, further comprising sales means for selecting at least one advertisement in accordance with a predetermined multi-platform advertising campaign for available viewing by a plurality of viewers not only linearly across a broadcast network of media channels having a first communications protocol, but also non-linearly across a non-broadcast, client-server network having a second communications protocol different from the first communications protocol.

48. The system of claim 47, wherein the first communications protocol comprises a broadcast communications protocol and the second communications protocol comprises an Internet communications protocol.

49. The system of claim 48, wherein the broadcast communication protocol comprises a television broadcast communications protocol and the Internet communications protocol comprises a server-client communication protocol.

50. The system of claim 47, wherein the first communications protocol comprises a broadcast communications protocol and the second communications protocol comprises an standard Internet communications protocol.

51. The system of claim 47, further comprising accounting means for setting a price structure for said at least one selected advertisement in accordance with the predetermined multi-platform advertising campaign for available viewing by the plurality of viewers not only linearly across the broadcast network of media channels, but also non-linearly across the non-broadcast, client-server network.

52. The system of claim 46, wherein the media production is a video media production.

53. The system of claim 46, wherein the trafficking means populates the availabilities list with a selected advertisement in accordance with a predetermined multi-platform advertising campaign.

54. The system of claim 46, wherein the selected advertisement comprises a first selected advertisement format that the trafficking means is configured to linearly integrate, encode, and link with the media production to form the first media-advertisement combination and a second selected advertisement format that the trafficking means is configured to non-linearly integrate, encode, and link with the media production to form the video media-advertisement production combination.

55. The system of claim 54, wherein the first selected advertisement format is different from the second selected advertisement format.

56. The system of claim 46, wherein the auxiliary client-server uniform resource location information comprises a hyperlink to a website associated with the second media-advertisement production combination.

57. The system of claim 46, wherein the auxiliary client-server uniform resource location information comprises a hyperlink to a website associated with the second media-advertisement production combination.

58. The system of claim 46, wherein the production coded metadata further comprises a file name, a path to storage location identifier, a path to an auxiliary client-server uniform resource location information storage location identifier, a segment name identifier, a segment content category identifier and a segment runtime length identifier.

59. The system of claim 46, wherein the trafficking means is configured to convert, format, compress, packetize and multiplex the video media production into hypertext markup language so as to form the second media-advertisement production combination to be displayed across the non-broadcast, client-server network.

60. The system of claim 59, wherein the second video media-advertisement production combination comprises an enhanced media production that includes the production coded metadata and the auxiliary client-server uniform resource location information.

61. The system of claim 46, wherein the trafficking means is configured to control distribution of the first and second media-advertisement production combinations across a distributed and hierarchical network of national and local broadcast and non-broadcast media delivery nodes each configured to control distribution of the first and second video media-advertisement production combinations based on not only a national advertisement campaign, but also based on a local advertisement campaign.

62. The system of claim 61, wherein the non-broadcast media delivery nodes are servers for distribution of the second media-advertisement production combination across a client-server network.

63. The system of claim 46, wherein the trafficking means includes means for generating production encoded metadata when the media production is generated.

\* \* \* \* \*